United States Patent
Kikuchi et al.

(10) Patent No.: US 8,019,183 B2
(45) Date of Patent: Sep. 13, 2011

(54) PRODUCTION APPARATUS FOR INDEX INFORMATION WITH LINK INFORMATION, PRODUCTION APPARATUS FOR IMAGE DATA WITH TAG INFORMATION, PRODUCTION METHOD FOR INDEX INFORMATION WITH LINK INFORMATION, PRODUCTION METHOD FOR IMAGE DATA WITH TAG INFORMATION AND RECORDING MEDIUM

(75) Inventors: Hiroaki Kikuchi, Kanagawa (JP); Hideyuki Imaida, Tokyo (JP)

(73) Assignee: Sony Corporation, Tokyo (JP)

( * ) Notice: Subject to any disclaimer, the term of this patent is extended or adjusted under 35 U.S.C. 154(b) by 1079 days.

(21) Appl. No.: 11/428,711

(22) Filed: Jul. 5, 2006

(65) Prior Publication Data
US 2007/0009100 A1    Jan. 11, 2007

(30) Foreign Application Priority Data
Jul. 6, 2005  (JP) ................................. 2005-198172

(51) Int. Cl.
*G06K 9/54* (2006.01)
(52) U.S. Cl. ........ 382/305; 382/203; 382/223; 382/226; 382/228; 382/107; 348/416.6; 348/169; 348/578; 348/586; 348/584
(58) Field of Classification Search ................. 382/203, 382/223, 226, 228, 305, 103, 107; 345/156; 348/416.6, 169, 578, 586, 584, 626
See application file for complete search history.

(56) References Cited

U.S. PATENT DOCUMENTS

| | | | | |
|---|---|---|---|---|
| 5,534,917 | A * | 7/1996 | MacDougall | 348/169 |
| 5,978,520 | A * | 11/1999 | Maruyama et al. | 382/294 |
| 5,987,509 | A | 11/1999 | Portuesi | |
| 6,184,860 | B1 * | 2/2001 | Yamakawa | 715/823 |
| 6,310,970 | B1 * | 10/2001 | Doll | 382/163 |
| 6,477,269 | B1 * | 11/2002 | Brechner | 382/165 |
| 6,674,129 | B1 * | 1/2004 | Colclaser et al. | 257/355 |
| 6,717,952 | B2 * | 4/2004 | Jones et al. | 370/465 |
| 6,874,129 | B2 * | 3/2005 | Smith | 715/803 |

(Continued)

FOREIGN PATENT DOCUMENTS
JP      6-208500        7/1994
(Continued)

OTHER PUBLICATIONS

Yung et al., "An Effective Video Analysis Method for Detecting Red Light Runners", IEEE Transactions on Vehicular Technology, vol. 50, No. 4, Jul. 2001, pp. 1074-1084.*

*Primary Examiner* — Brian Q Le
*Assistant Examiner* — Mek Bekele
(74) *Attorney, Agent, or Firm* — Oblon, Spivak, McClelland, Maier & Neustadt, L.L.P.

(57) ABSTRACT

Disclosed herein is a production apparatus for index information with link information. The apparatus includes a database in which a corresponding relationship between region identification information applied to a key region which provides a partial region in a main image specified arbitrarily by an operator and link information for accessing to related information of the partial region is listed. The apparatus further includes an information embedding section configured to refer to said database to embed, into index information in which a corresponding relationship between the region identification information applied to the key region and time information is listed, the corresponding link information.

44 Claims, 38 Drawing Sheets

U.S. PATENT DOCUMENTS

| | | | |
|---|---|---|---|
| 7,207,006 B1 * | 4/2007 | Feig et al. | 715/723 |
| 7,272,499 B2 * | 9/2007 | Grenfell et al. | 701/213 |
| 7,284,066 B1 * | 10/2007 | Philyaw et al. | 709/238 |
| 7,421,727 B2 * | 9/2008 | Oya et al. | 725/105 |
| 7,783,076 B2 * | 8/2010 | Tsunashima | 382/103 |
| 7,788,601 B2 * | 8/2010 | Scott | 715/812 |
| 2004/0197081 A1 * | 10/2004 | Ueda et al. | 386/65 |
| 2005/0172215 A1 * | 8/2005 | Squibbs et al. | 715/500 |
| 2005/0198173 A1 * | 9/2005 | Evans | 709/206 |
| 2006/0184418 A1 * | 8/2006 | Connolly et al. | 705/14 |
| 2006/0202995 A1 * | 9/2006 | Nagamine et al. | 345/440 |
| 2007/0014432 A1 * | 1/2007 | Tsunashima | 382/103 |

FOREIGN PATENT DOCUMENTS

| | | | |
|---|---|---|---|
| JP | 9-182037 | | 7/1997 |
| JP | 2002-218433 | * | 8/2002 |
| JP | 2002218433 A | * | 8/2002 |
| JP | 2003-36451 | | 2/2003 |
| JP | 2003036451 A | * | 2/2003 |
| JP | 2003-116095 | * | 4/2003 |
| JP | 2003-116095 A | | 4/2003 |
| JP | 2003116095 A | * | 4/2003 |
| JP | 2003-323439 A | | 11/2003 |

* cited by examiner

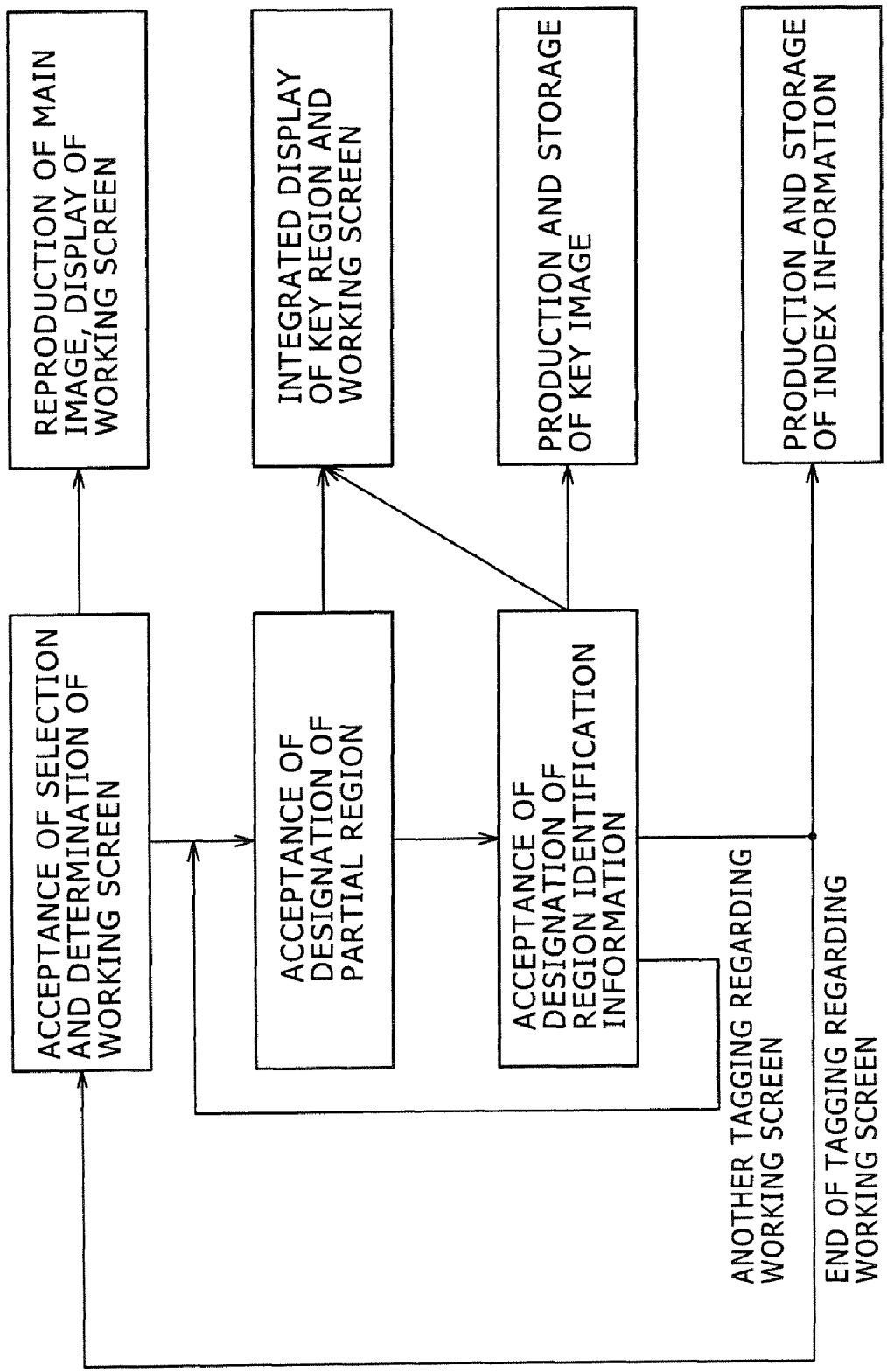

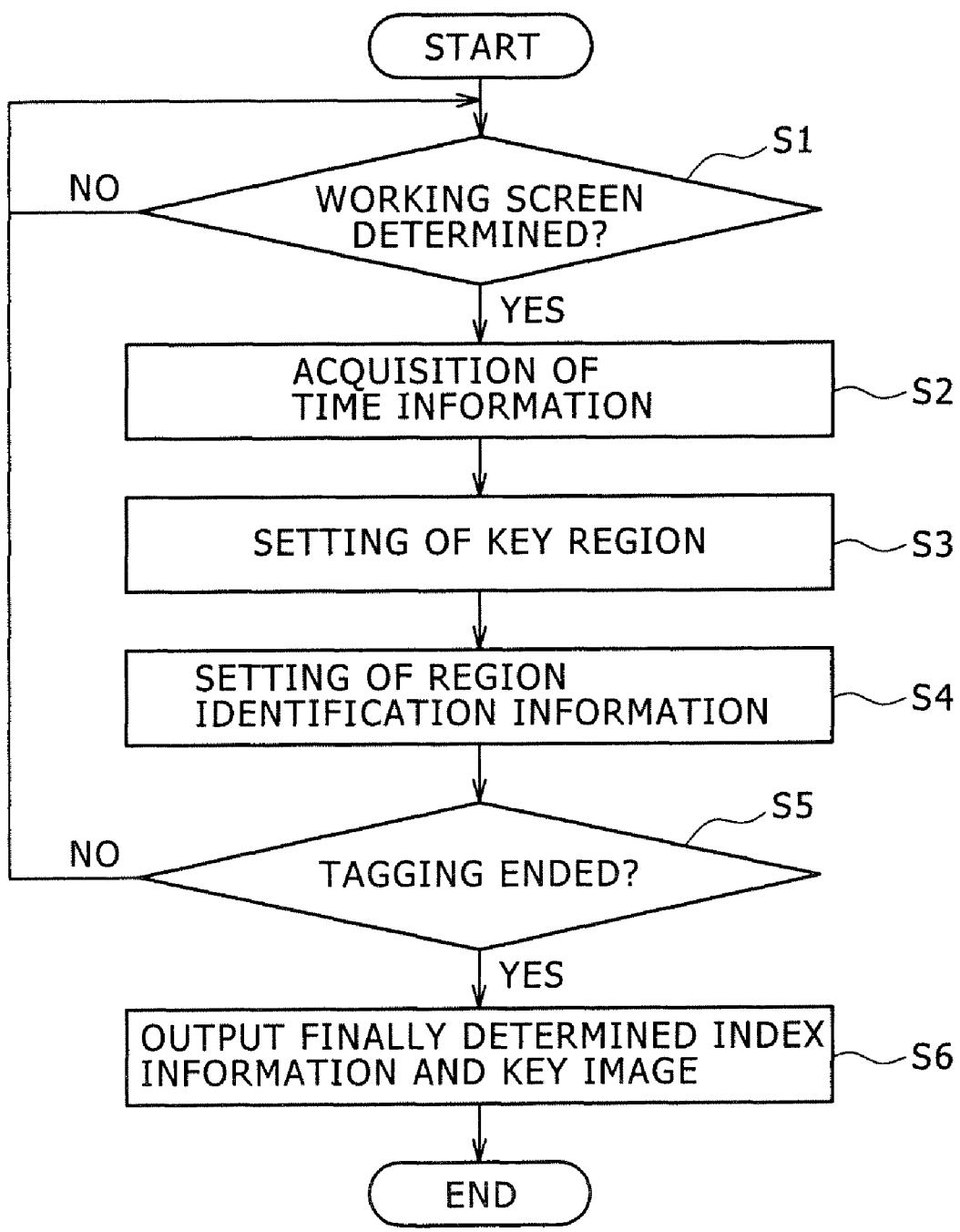

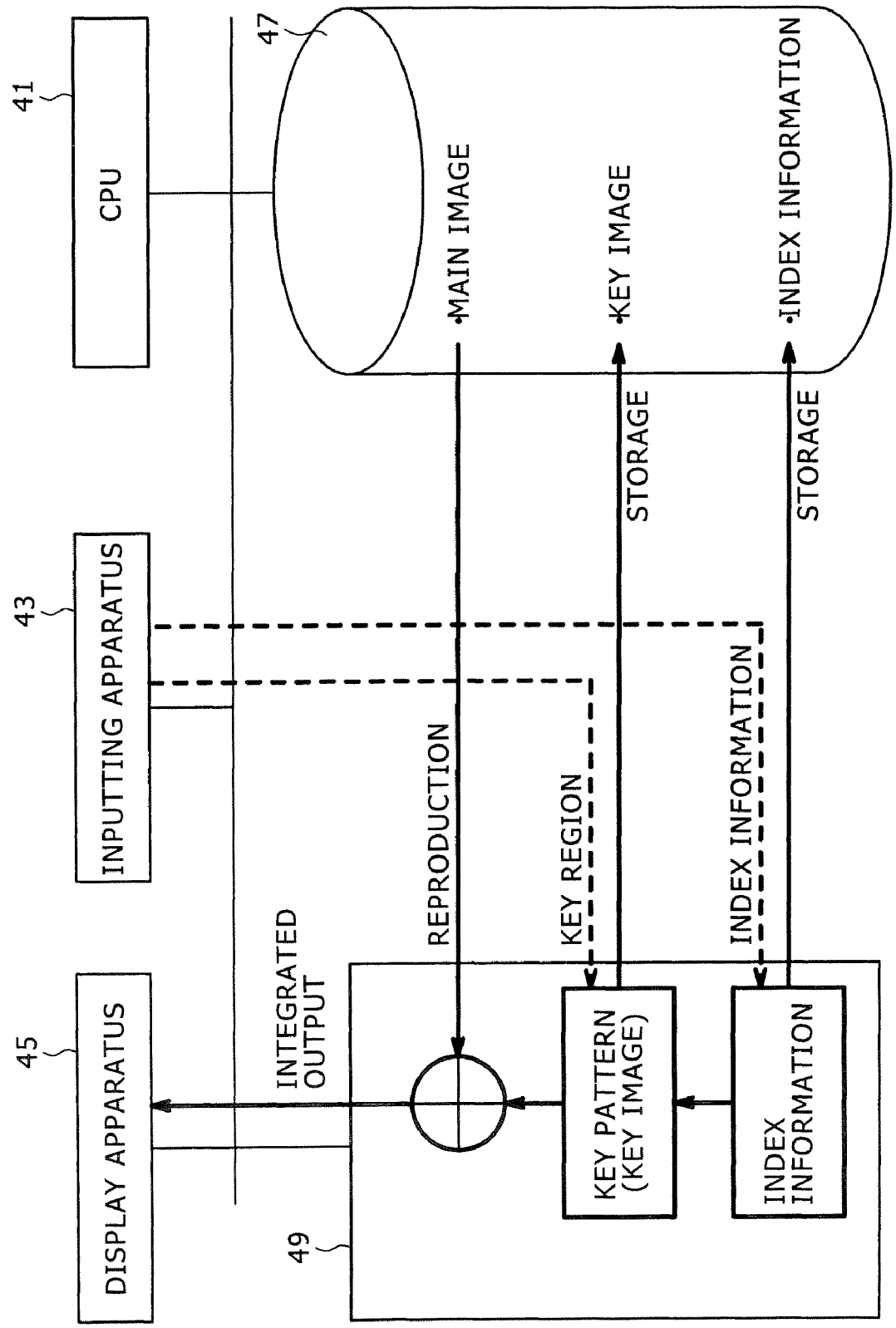

TIME t1

91

TIME t2

93

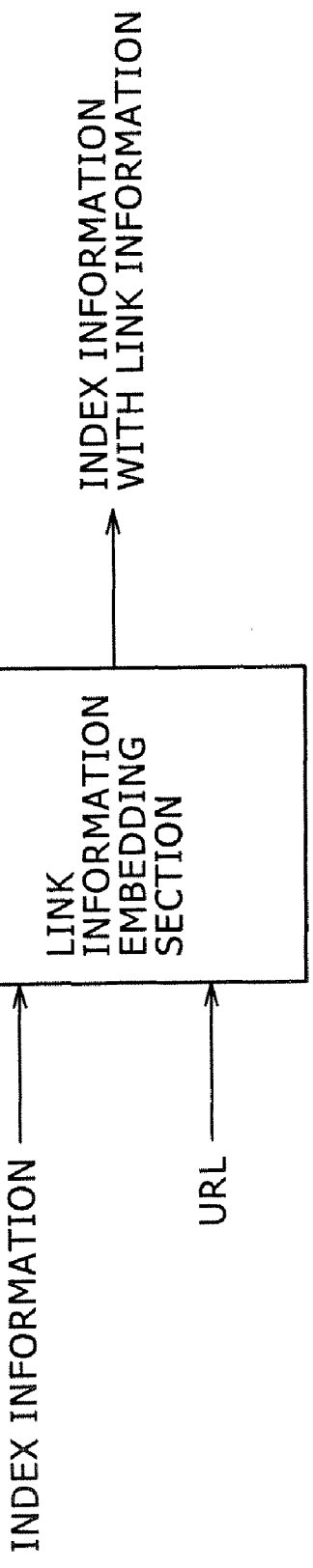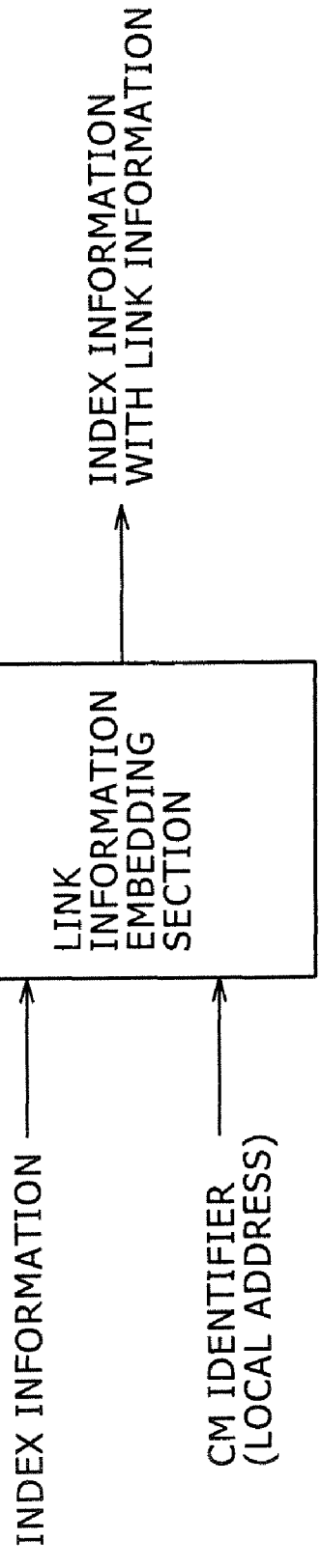

FIG.22

Tc: 00:14:10:00
20: <shoes>http://www.xxx.com/yy/yy
40: <car>http://www.zzz.com/pp/pp tc: 00:15:18:00
40: <car>http://www.zzz.com/pp/pp tc: 00:20:16:00
40: <glass>http://www.ccc.com/ss/ss

- REGION IDENTIFICATION INFORMATION
- OBJECT IDENTIFICATION INFORMATION
- LINK INFORMATION

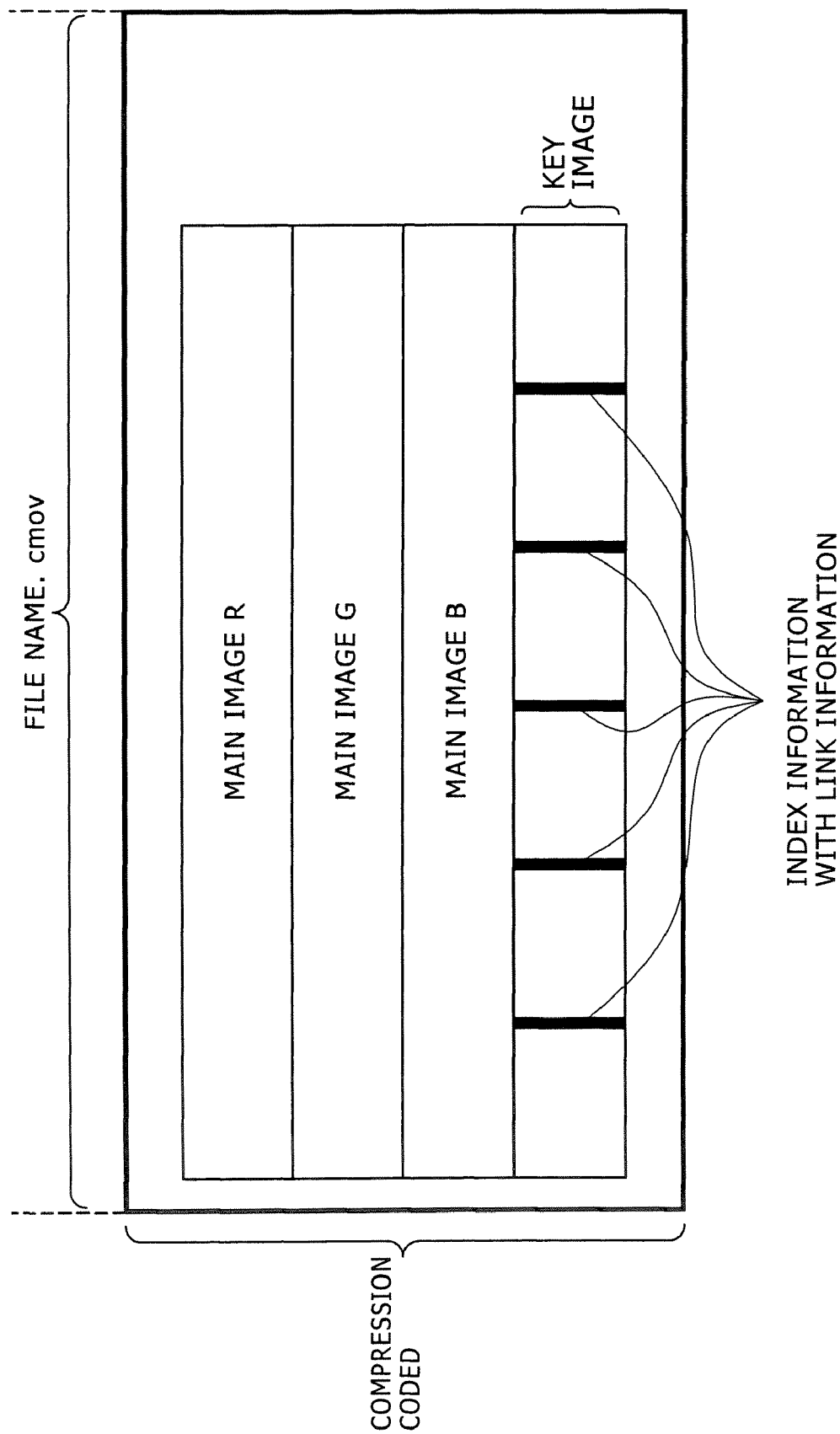

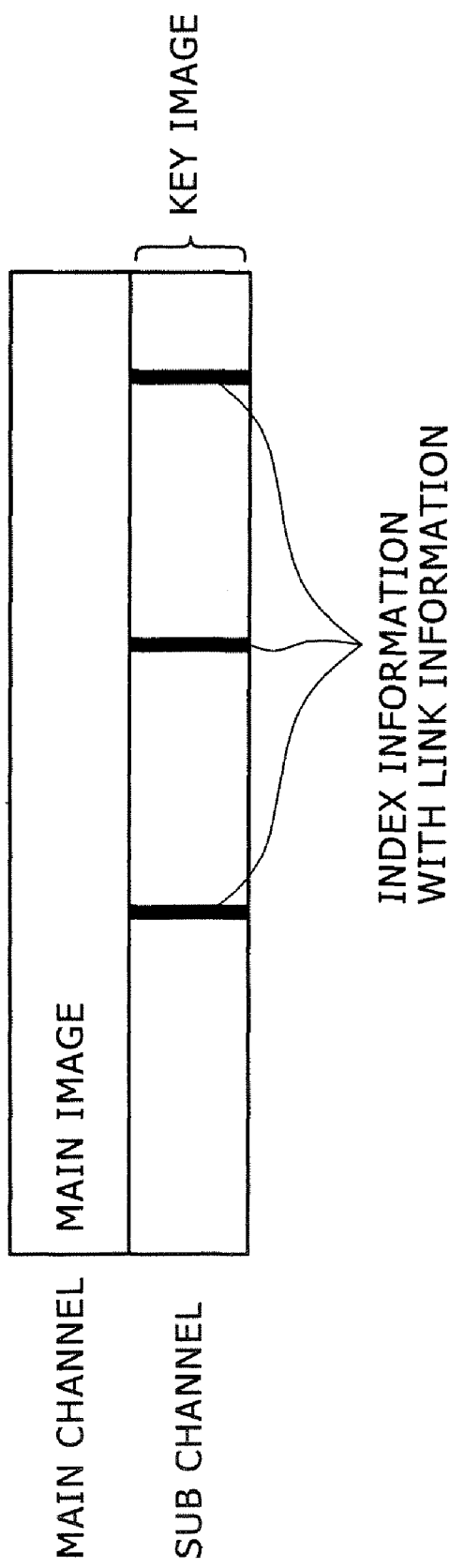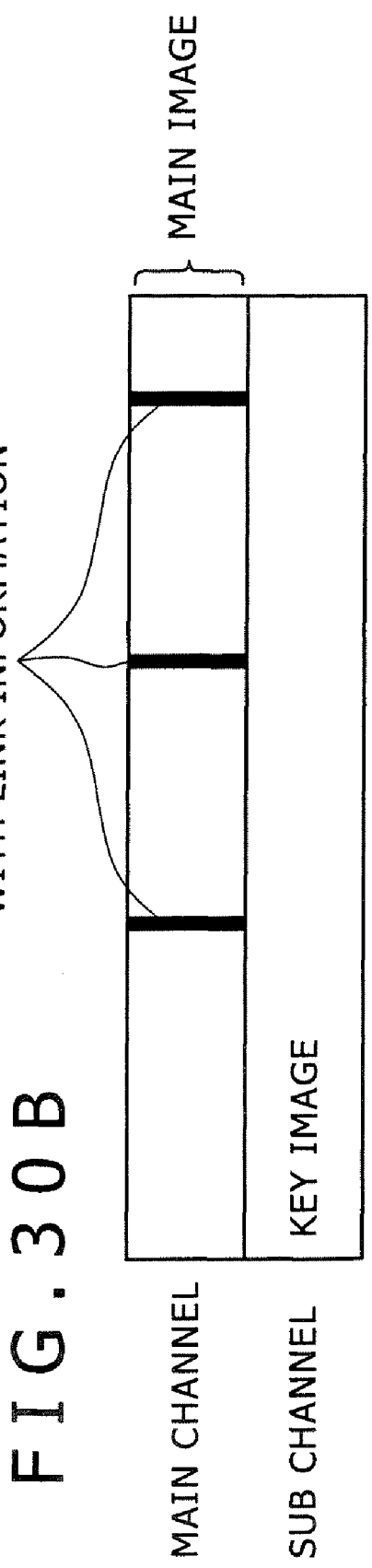

00:14:30:12

171

00:14:30:12

173

173

175

177

175

179

PRODUCTION APPARATUS FOR INDEX INFORMATION WITH LINK INFORMATION, PRODUCTION APPARATUS FOR IMAGE DATA WITH TAG INFORMATION, PRODUCTION METHOD FOR INDEX INFORMATION WITH LINK INFORMATION, PRODUCTION METHOD FOR IMAGE DATA WITH TAG INFORMATION AND RECORDING MEDIUM

CROSS REFERENCES TO RELATED APPLICATIONS

The present invention contains subject matter related to Japanese Patent Application JP 2005-198172, filed in the Japanese Patent Office on Jul. 6, 2005, the entire contents of which being incorporated herein by reference.

BACKGROUND OF THE INVENTION

1. Field of the Invention

This invention relates to an apparatus and method for producing index information with link information wherein link information is embedded in a key region specified arbitrarily by an operator. The present invention further relates to an apparatus and method for producing image data wherein, in response to a click operation of a partial region in which tag information is embedded, information associated with the partial region can be displayed on a screen. The present invention relates also to a recording medium in which a program for implementing the functions mentioned is recorded.

2. Description of Related Art

Together with setup of the communication infrastructures and increase of the recording capacity in recent years, it is demanded to place various services proposed heretofore into practical use. The technique described is disclosed, for example, in Japanese Patent Laid-open No. Hei 7-231308.

SUMMARY OF THE INVENTION

However, a technique has not been established which can apply tag information to a particular partial region in moving pictures through a realistic amount of work.

The inventors of the present invention propose a technique which can apply tag information to a main image through a realistic amount of work.

(A) Index Information with Link Information

First, the inventors of the present invention propose, as an apparatus which produces index information with link information, apparatus which have the following processing functions:

(a) Mode 1

(a1) a database in which a corresponding relationship between region identification information applied to a key region which provides a partial region in a main image specified arbitrarily by an operator and link information for accessing to related information of the partial region is listed; and (a2) a processing function configured to refer to the database to embed, into index information in which a corresponding relationship between the region identification information applied to the key region and time information is listed, the corresponding link information.

(b) Mode 2

(b1) a database in which a corresponding relationship between object identification information applied to a key region which provides a partial region in a main image specified arbitrarily by an operator and link information for accessing to related information of the partial region is listed; and (b2) a processing function configured to refer to the database to embed, into index information in which a corresponding relationship between the object identification information applied to the key region and time information is listed, the corresponding link information.

(B) Image Data with Tag Information

Further, the inventors of the present invention propose, as a production apparatus for image data which can display, in response to a click operation of a particular region in which tag information is embedded, information associated with the particular portion on a screen, apparatus which have the following processing functions:

(a) Mode 1

(a1) a database in which a corresponding relationship between region identification information applied to a key region which provides a partial region in a main image specified arbitrarily by an operator and link information for accessing to related information of the partial region is listed;

(a2) a processing function configured to refer to the database to embed, into index information in which a corresponding relationship between the region identification information applied to the key region and time information is listed, the corresponding link information; and (a3) a processing function configured to output the index information with link information in which the link information is embedded, the main image and a key image to which the region identification information which specifies the key region in combination with the time information is applied in a mutually associated relationship.

(b) Mode 2

(b1) a database in which a corresponding relationship between object identification information applied to a key region which provides a partial region in a main image specified arbitrarily by an operator and link information for accessing to related information of the partial region is listed;

(b2) a processing function configured to refer to the database to embed, into index information in which a corresponding relationship between the object identification information applied to the key region and time information is listed, the corresponding link information; and (b3) a processing function configured to output the index information with link information in which the link information is embedded, the main image and a key image to which the region identification information which specifies the key region in combination with the time information is applied in a mutually associated relationship.

The inventors of the present invention proposes a technique of index information with link information by embedding link information into index information in which a corresponding relationship between region identification information applied to a key region which forms a key image and time information is listed or index information in which a corresponding relationship between object identification information applied to a key region which forms a key image and time information is listed.

As far as the corresponding relationship between the region identification information and the link information or the corresponding relationship between the link information and the object identification information is assured, the coordination between the key region and the link information can be implemented efficiently.

Further, the inventors of the present invention propose a technique of outputting index information with link information, a main image and a key image in a mutually associated relationship. Consequently, the user can cause information associated with a partial region in which tag information is embedded to be displayed only if the viewer clicks the partial region on a screen of a main image.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 7 is a flow diagram illustrating a corresponding relationship between a tagging operation and internal processes executed in response to the tagging operation;

FIG. 8 is a flow chart illustrating an outline of the substance of processing of a program to be installed into a key information inputting apparatus;

FIG. 9 is a block diagram showing an example of a configuration of a nonlinear editing system;

FIGS. 20A and 20B are diagrammatic views showing embedded images of link information in index information;

FIG. 22 is a view illustrating an example of production of index information with link information;

FIGS. 25 to 31B are schematic views illustrating different data output examples;

DETAILED DESCRIPTION OF THE PREFERRED EMBODIMENTS

In the following, a preferred embodiment of the present invention is described in connection with production, distribution and reproduction stages of tag information.

It is to be noted that, to particulars which are not shown in the accompanying drawings or described in the present specification, known techniques in the pertaining technical field are applied.

Further, the embodiment described below is a mere example of the present invention, and the present invention is not limited to the specific embodiment.

A. Tag Information Production Apparatus

In the following, a tag information production apparatus which can produce tag information through a realistic amount of work.

A-1. Linear Editing System

The tag information production apparatus can be implemented as a linear editing system.

a. System Configuration

Figure 1:
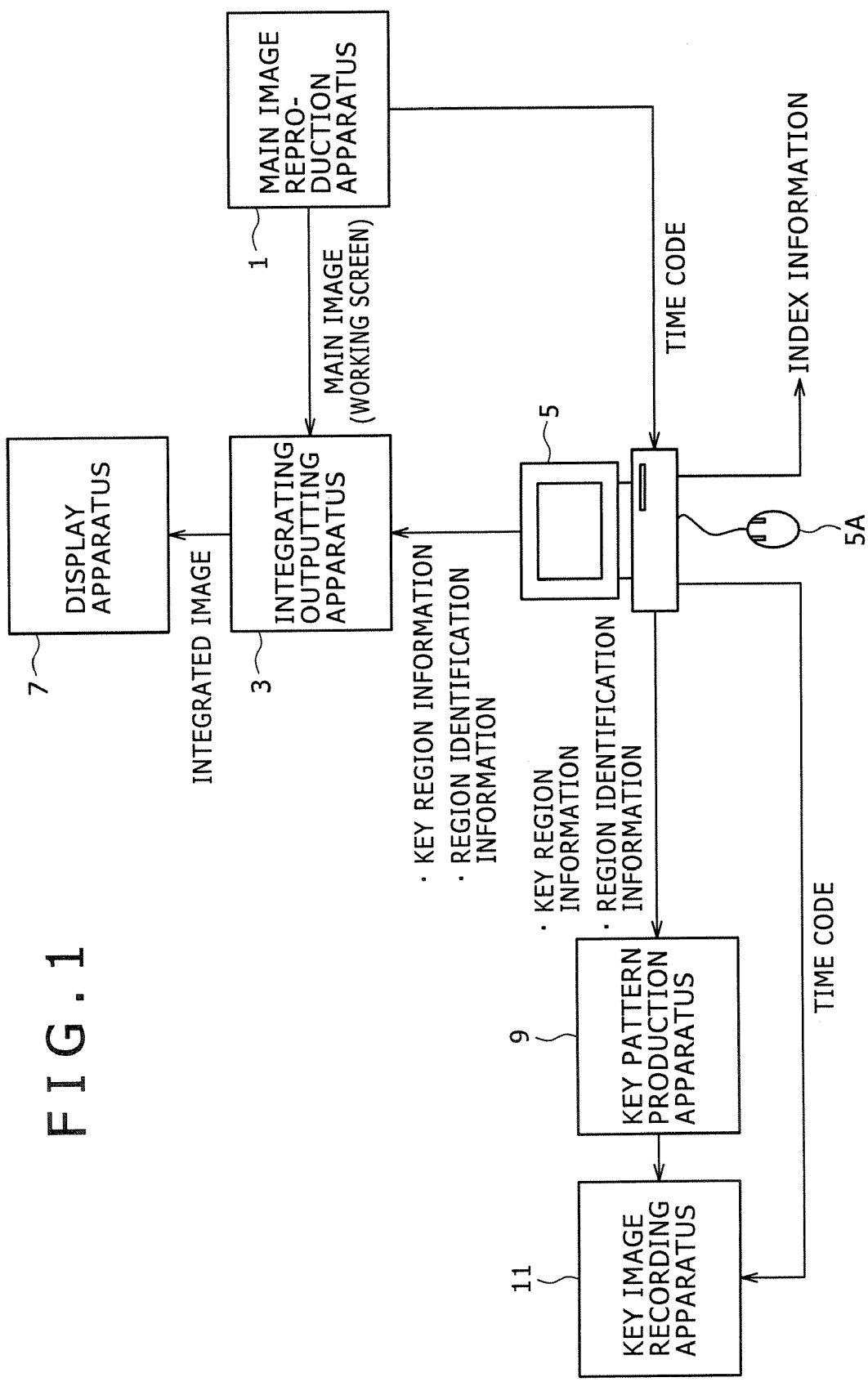
FIG. 1 is a block diagram showing an example of a configuration of a linear editing system.

FIG. 1 shows an example of a configuration of the linear editing system.

Referring to FIG. 1, the linear editing system shown includes a main image reproduction apparatus 1, an integrating outputting apparatus 3, a key information inputting apparatus 5, a display apparatus 7, a key pattern production apparatus 9, and a key image recording apparatus 11.

The main image reproduction apparatus 1 reproduces a main image recorded on a magnetic tape. The main image reproduction apparatus 1 may be formed, for example, from a VTR (Video Tape Recorder). A main image reproduced by the main image reproduction apparatus 1 is outputted to the integrating outputting apparatus 3. A time code reproduced simultaneously is outputted to the key information inputting apparatus 5. It is to be noted that the time code is one of kinds of time information which provides a temporal position of the main image.

The integrating outputting apparatus 3 integrates a key pattern which provides embedding information of tag information with the main image inputted thereto. The integrating outputting apparatus 3 is formed from, for example, a character generator. The key pattern is produced based on key region information supplied from the key information inputting apparatus 5 by the integrating outputting apparatus 3. The key region information is given as information relating to the position of the key pattern within a screen and a selection range. The integrated image is outputted to the display apparatus 7.

Figure 2A:
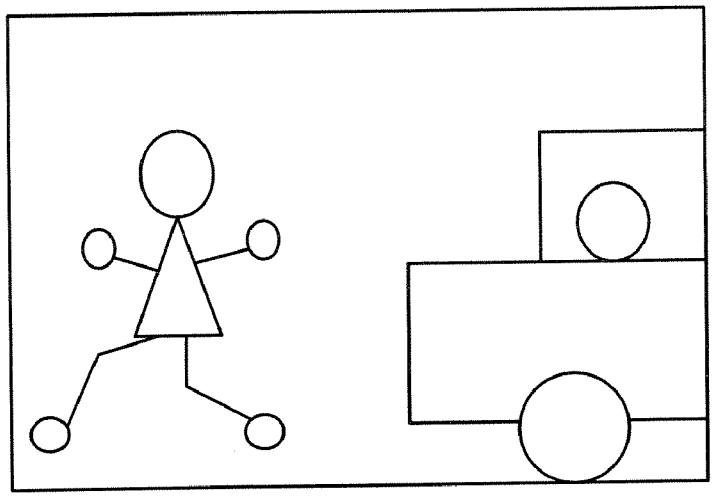
FIGS. 2A to 2C are schematic views showing a corresponding relationship between display examples of a working screen and key images produced.
Figure 2B:
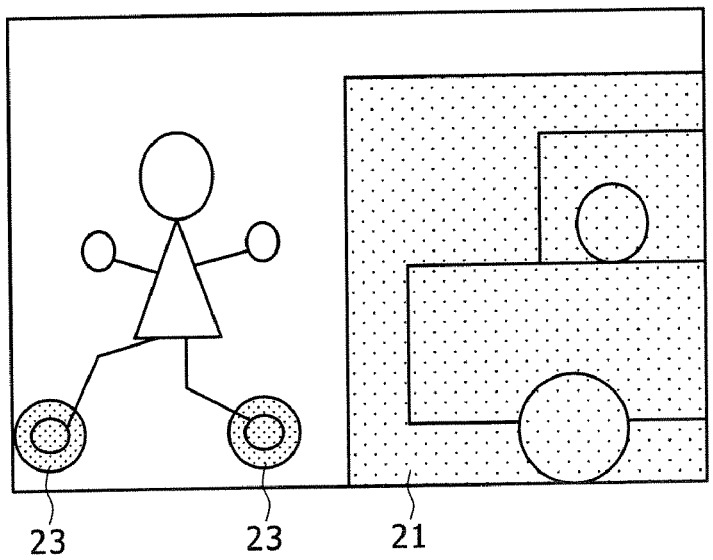
Figure 2C:
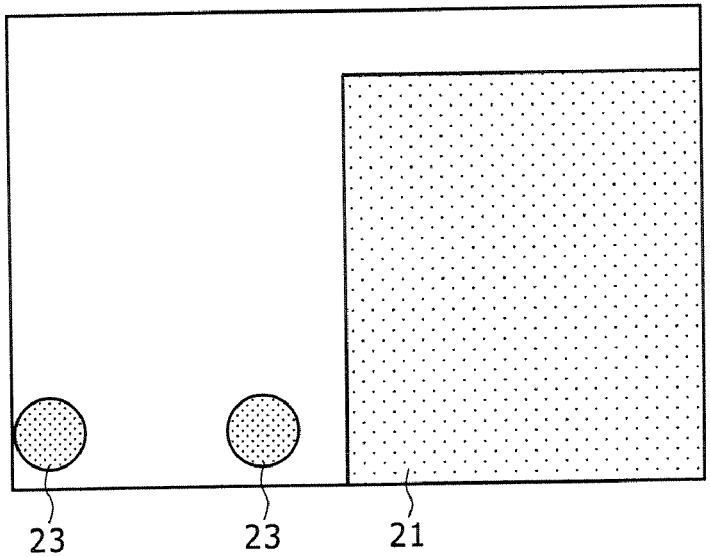

FIGS. 2A to 2C show examples of a display screen of the display apparatus 7. Particularly, FIG. 2A shows an example of a screen (example of a working screen) selected as a tag information embedding screen. The working screen is given as a main image which is outputted when a reproduction action of the main image reproduction apparatus 1 is temporarily stopped.

FIG. 2B shows an example of a working screen where key patterns 21 and 23 produced by the integrating outputting apparatus 3 are integrated with the main image. In the case of the present example, the key pattern 21 has such a position and a range that it surrounds an entire vehicle displayed on the right side on the screen. Meanwhile, the key patterns 23 have such positions and ranges that they individually surround two shoes displayed on the left lower side on the screen.

The shape of a key pattern can be determined by any method such as a method wherein it is automatically selected by the integrating outputting apparatus 3, another method wherein the shape is selected through the key information inputting apparatus 5 or a further method wherein the shape is designated arbitrarily using a draw tool such as, for example, a lasso. In the case of FIGS. 2A to 2C, a square shape and a circular shape are selected through the key information inputting apparatus 5.

The position and the range at and in which each of the key patterns 21 and 23 is to be disposed are determined by the operator through confirmation of the integration screen of the display apparatus 7.

In the following, a position and a range on a screen at and in which an individual key pattern is disposed is referred to as "key region".

The key information inputting apparatus 5 is used to input key information for defining tag information.

In the present specification, the "tag information" signifies information embedded in a partial region designated arbitrarily.

In the present linear editing system, a "key image" and "index information" are produced as the tag information.

Here, the "key image" signifies an image paired with a main image and indicative of an embedded position of the tag information. Meanwhile, the "index information" is information which represents a corresponding relationship between a key region and identification information of the key region with regard to each point of time of the key image.

Meanwhile, the "key information which defines tag information" signifies information necessary for production of key region and index information, for example, identification information of the position, range, time and region and so forth. In the case of the present example, however, the time information is given as a time code from the main image reproduction apparatus 1.

The key information inputting apparatus 5 may be formed, for example, from a video editing machine or a computer. In FIG. 1, it is shown that the key information inputting apparatus 5 is formed from a computer.

The position and the range of a key pattern are inputted through an inputting apparatus 5A which may be a mouse and so forth. Meanwhile, the information for identification of the key pattern is inputted using a key operation of a keyboard, a click operation of the mouse or the like.

It is to be noted that, for the position and the range of a key pattern, a rough position and a rough range of a partial region to be tagged may be given. Accordingly, no strict positioning is required. Therefore, setting of a key region can be implemented within a range of a realistic amount of work. For example, such setting can be implemented by an amount of work similar to that required for insertion of a caption which is a general editing operation.

In the case of the present example, a gray scale value (lightness value) is used as a kind of information for identification of a key pattern. Where a gray scale value is given, even if the luminance of a set portion of a key region varies, the set portion can be confirmed. However, there is the possibility that tag information may undergo a compression process upon distribution thereof. Accordingly, preferably the gray scale value is a value spaced by such a degree that it can be discriminated even after such compression process. For example, a value "20" is inputted for the key pattern 21 corresponding to a vehicle, and another value "40" is inputted for the key patterns 23 which correspond to shoes.

The key information inputting apparatus 5 outputs key region information and region identification information for production of a key image to the key pattern production apparatus 9, and outputs a time code to the key image recording apparatus 11. Further, the key information inputting apparatus 5 outputs index information which is a combination of the key region and the region identification information with time information of a working screen.

The key pattern production apparatus 9 produces a key pattern based on the key region information and the region identification information set for the working screen. The key pattern production apparatus 9 may be formed, for example, from a key generator or a character generator. FIG. 2C shows an example of a screen which includes the key patterns 21 and 23.

It is to be noted that the key pattern production apparatus 9 successively produces the same key pattern until after new key region information and new region identification information are received. This signifies that key information need not be inputted for all frames. From this, the work amount decreases significantly.

However, if the generation position of the key pattern is fixed, then some offset appears between the tag information embedded position and the target object (subject image). Accordingly, the operator would confirm the screen of the display apparatus 7 and suitably modify or re-set the position and the range of the key region.

The key pattern produced by the key pattern production apparatus 9 is supplied together with the time code to the key image recording apparatus 11, by which it is recorded as a key image having a time length equal to that of the main image.

It is to be noted that, since the apparatus is formed as a linear editing system, a magnetic tape is used as a recording medium of the key image recording apparatus 11.

b. Functional Configuration as a Tag Information Production Apparatus

A functional configuration of the linear editing system as a tag information production apparatus is described. It is to be noted that index information described below includes time information, region identification information and object identification information.

Figure 3:
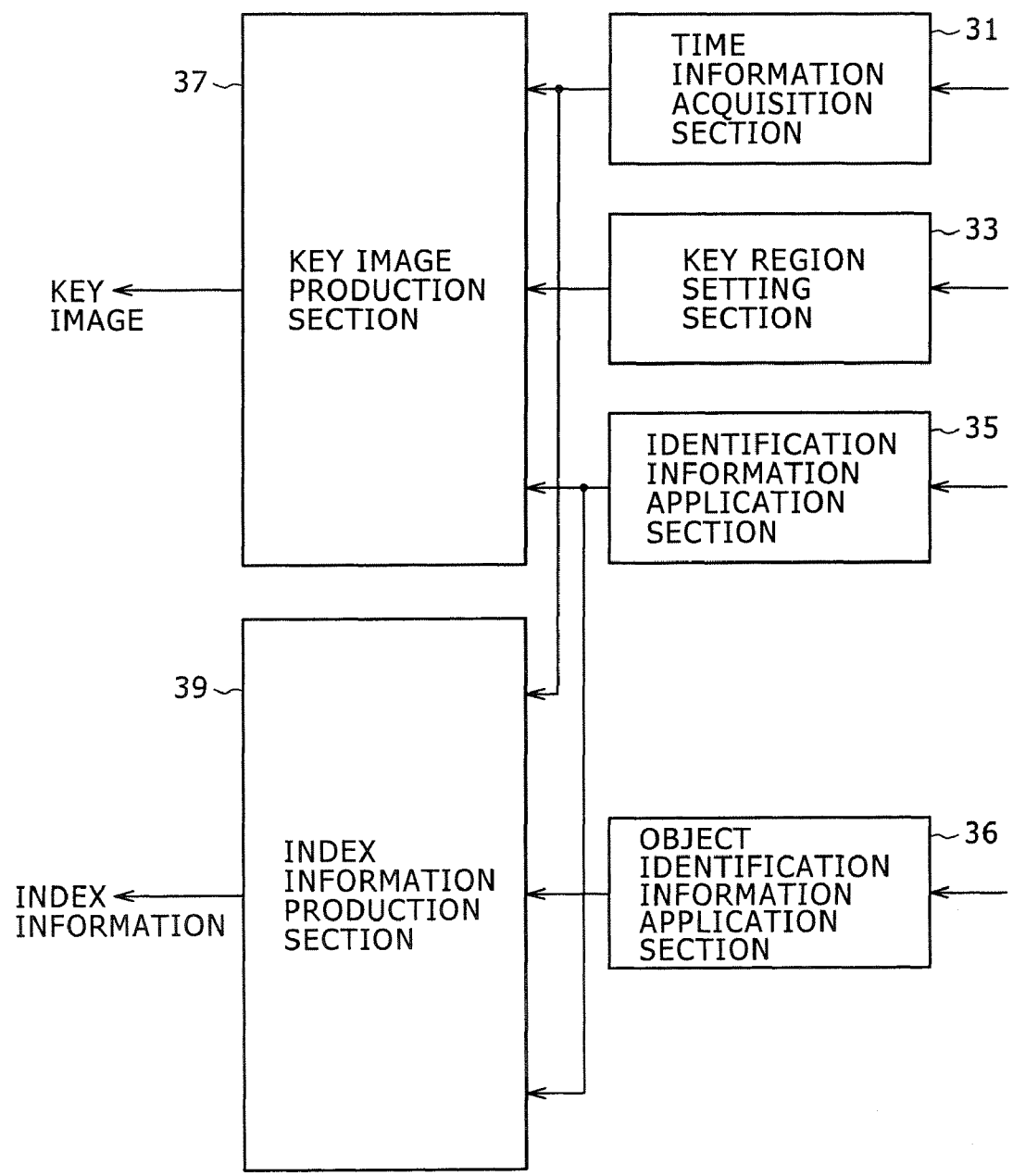
FIG. 3 is a block diagram showing an example of a functional configuration of a tag information production apparatus.

FIG. 3 shows a functional configuration as a tag information production apparatus. Referring to FIG. 3, the tag information production apparatus includes a time information acquisition section 31, a key region setting section 33, an identification information application section 35, an object identification information application section 36, a key image production section 37 and an index information production section 39.

Among the components, the time information acquisition section 31, key region setting section 33, identification information application section 35, object identification information application section 36 and index information production section 39 are implemented through the key information inputting apparatus 5. Meanwhile, the key image production section 37 is implemented through the key pattern production apparatus 9 and the key image recording apparatus 11.

The time information acquisition section 31 implements a processing function of acquiring time information of a main image selected for a working screen.

The key region setting section 33 implements a processing function of setting a key region to a position corresponding to a partial region in a main image specified arbitrarily by the operator.

The identification information application section 35 implements a function of applying, to the set key region, region identification information for allowing discrimination between the key region and a peripheral region.

The object identification information application section 36 implements a function of providing identification information for allowing identification of an object to be specified by the set key region. In the case of the present example, while the region identification information is given as a numerical value, the object identification information is given as a character. Therefore, the confirmation operation can be performed more readily with the object identification information. It is to be noted that also the object identification information may be given as a numerical value.

Figure 4:
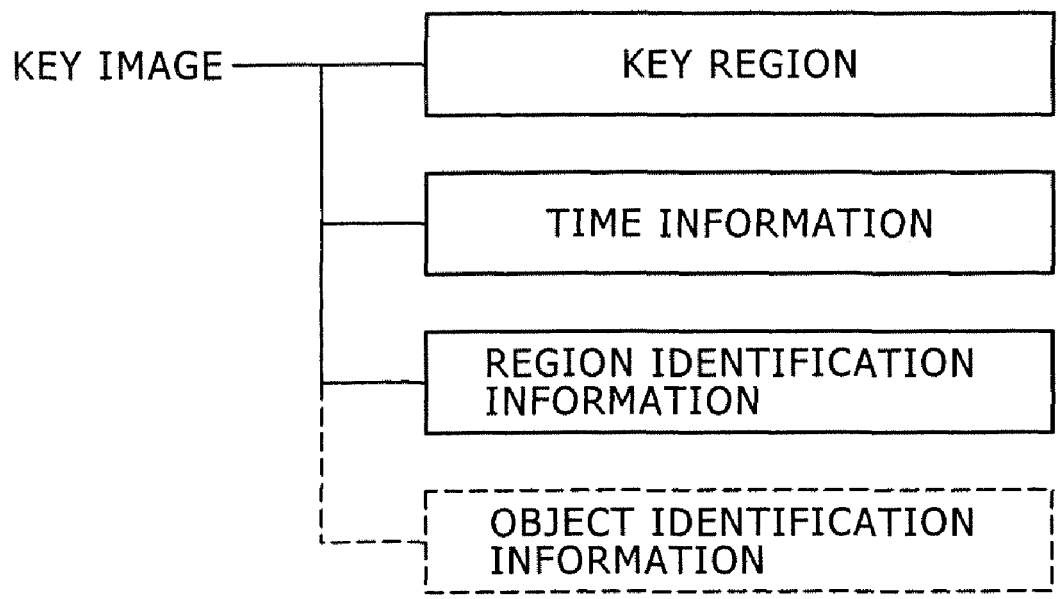
FIG. 4 is a diagrammatic view illustrating a corresponding relationship between a key image and key information which prescribes tag information.

The key image production section 37 is a functional section of implementing a processing function of producing a key image to which time information same as that of the main image is added, and corresponds to a function of producing a key image wherein region identification information is applied to a key region set through the working screen. FIG. 4 illustrates a corresponding relationship between a key image and key information which defines tag information. From FIG. 4, it can be recognized that the key image is produced as an image whose temporal position corresponds in a one-by-one corresponding relationship to a main image.

The index information production section 39 corresponds to a processing function of producing index information which lists corresponding relationships among region identification information, time information and object identification information applied to key regions.

Figure 5:
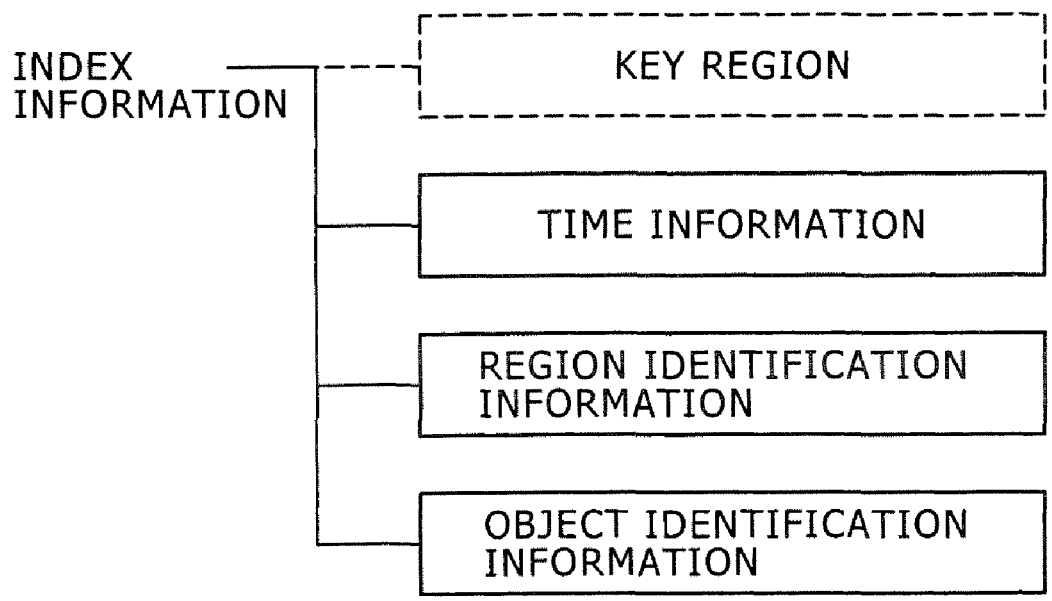
FIG. 5 is a similar view but illustrating a corresponding relationship between index information and key information which defines tag information.

FIG. 5 illustrates a corresponding relationship between index information and key information which defines tag information. As can be seen from FIG. 5, the index information is given as information of the text type or the XML document type wherein time information, region identification information and object identification information are recorded.

Figure 6:
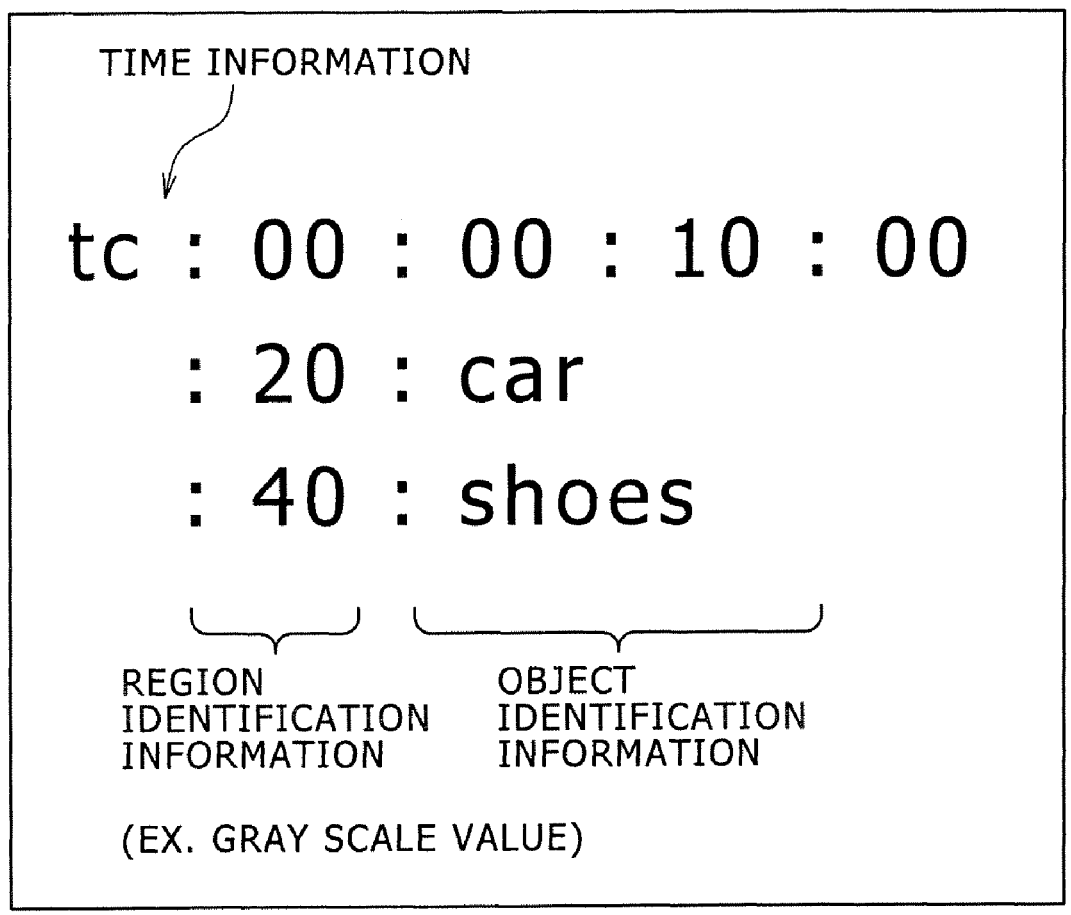
FIG. 6 is a view illustrating an example of index information.

FIG. 6 illustrates an example of index information. The time code is given as "hour: minute: second: frame". Accordingly, FIG. 6 signifies that two pieces of tag information are set later than the "00 hour, 00 minute, 10 second, 00 frame" of a main image.

In other words, FIG. 6 signifies that two pieces of tag information are set using "20" and "40" of gray scale values.

In FIG. 6, also object identification information is recorded so that the operator can confirm with which object (subject image) of a main image each piece of region identification information is coordinated. Where object identification information is inserted, it can be utilized also for confirmation of whether or not region identification and an intended object coincide with each other.

c. Relationship between a Tagging Operation and Internal Processing

FIG. 7 illustrates a corresponding relationship between a tagging operation and internal processes executed in response to the tagging operation. It is to be noted that a tagging operation is inputted through the inputting apparatus 5A of the key information inputting apparatus 5.

Upon acceptance of a selection operation of the working screen, the key information inputting apparatus 5 issues an instruction to reproduce a main image to the main image reproduction apparatus 1. Further, upon acceptance of a determination operation of the working screen, the key information inputting apparatus 5 issues an instruction to temporarily stop a reproduction operation to the main image reproduction apparatus 1.

Further, when an instruction input of a partial region is accepted after the determination of the working screen, the key information inputting apparatus 5 provides key region information to the integrating outputting apparatus 3. At this time, an integrated image of a key pattern with the working screen (still screen of a main image) is displayed on the screen of the display apparatus 7.

Further, when a designation input of region identification information is accepted with regard to a designated partial region, the key information inputting apparatus 5 provides region identification information to the integrating outputting apparatus 3 and outputs the region identification information to the key pattern production apparatus 9. Consequently, a key image is produced. Thereupon, the key information inputting apparatus 5 produces index information based on the region identification information, time information and object identification.

FIG. 8 illustrates the substance of processes of a program to be installed into the key information inputting apparatus 5.

Referring to FIG. 8, the program decides whether or not a working screen is determined (S1). If a working screen is determined, then the program acquires a time code as time information (S2). Then, the program accepts setting of a key region (S3). After a key region is set, the program accepts setting of region identification information to be coordinated with the key region (S4).

Thereafter, the program decides whether or not tagging is ended (S5) and repeats the setting process of a new key region until after such an end is decided.

Then, after the tagging is ended, the program issues an instruction to output the finally determined index information and key image (S6).

The tag information production process is implemented by the key information inputting apparatus 5 executing such a processing program as described above.

d. Effects

By connecting the main image reproduction apparatus 1, integrating outputting apparatus 3, key pattern production apparatus 9 and key image recording apparatus 11 to the key information inputting apparatus 5 having the processing functions described above to construct a linear editing process, the system which can record tag information through a realistic amount of work can be implemented.

In other words, a key region can be set not by inputting of text-based data such as meta data but by simple visual designation of a region. Further, depending upon the substance of a main image, most of the works described above can be automated.

Further, a key region set once continues also with regard to succeeding frames until after a new key region is set with regard to a new selection screen (including also a case wherein the same object is used). Therefore, reduction of the amount of inputting work can be achieved.

Further, since a gray scale value is adopted as region identification information, different key regions can be confirmed simply also visually from a difference in lightness.

Further, since index information which lists corresponding relationships between time information and information of individual key regions is produced automatically, a coordinating operation of information with individual key regions can be carried out efficiently when compared with that by manual inputting.

A-2. Nonlinear Editing System

The tag information production apparatus can be implemented also as a nonlinear editing system.

a. System Configuration

FIG. 9 shows an example of a configuration of the nonlinear editing system. The nonlinear editing system is basically formed from a computer by itself.

Referring to FIG. 9, the nonlinear editing system shown includes a CPU (Central Processing Unit) (processor) 41 an inputting apparatus 43, a display apparatus 45, a hard disk drive apparatus 47 and a main memory 49.

In particular, the main image reproduction apparatus 1 and the key image recording apparatus 11 of the linear editing system in FIG. 1 are substituted by the hard disk drive apparatus 47. Meanwhile, the integrating outputting apparatus 3 and the key pattern production apparatus 9 are implemented through a program executed by the CPU 41 using the main memory 49 as a working area.

Naturally, also the key information inputting apparatus 5 is implemented through a program which is executed by the CPU 41 using the main memory 49 as a working area.

For example, upon determination of a working screen, a main image read out from the hard disk drive apparatus 47 is outputted to the display apparatus 45 through the main memory 49.

Further, upon setting of a key region, a key pattern produced by an operation from the inputting apparatus 43 and a main image are integrated in the main memory 49 and outputted to the display apparatus 45. Thereupon, index information inputted through the inputting apparatus 43 is reflected on the key pattern.

It is to be noted that the key pattern (FIGS. 2C and 4) and the index information (FIG. 5) produced in the main memory 49 are recorded by the hard disk drive apparatus 47.

b. Effects

Also in the case of the nonlinear editing system, similar effects to those of the linear editing system can be implemented. In other words, a system which can record tag information through a realistic amount of work can be implemented.

A-3. Key Region Inputting Auxiliary Function a. Region Extraction in Accordance with a Color Condition In the foregoing description, a key region is set by manual operation.

Here, a technique of setting a region which satisfies a color condition designated in advance by the operator from among partial regions designated within a working screen as a key region is described.

Figure 10A:
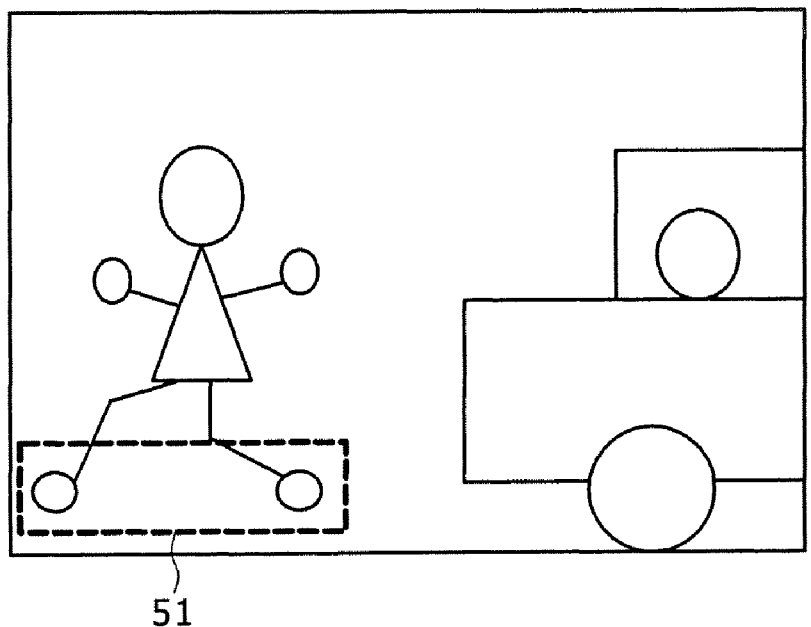
FIGS. 10A and 10B are schematic views showing processing images where shoes of an image of a subject are set as key regions.
Figure 10B:
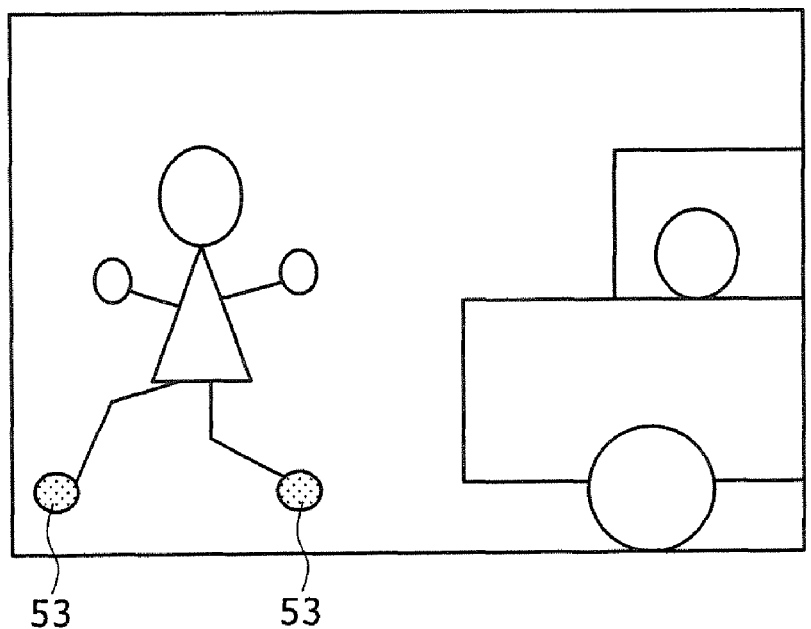

FIGS. 10A and 10B show processing images. In particular, FIGS. 10A and 10B illustrate an example wherein shoes of a subject image are set as key regions. It is to be noted that the shoes of the subject image have a color of red.

In this instance, a wide region 51 including the shoes is designated as seen in FIG. 10A. At this time, if a particular color condition (for example, a red level within a range from a hue value XX to another hue value YY) is determined as an extraction condition of a key region, then only partial regions 53 corresponding to the shoes can be extracted accurately. It is to be noted that registration of an extraction condition may be performed before or after designation of a region.

Figure 11:
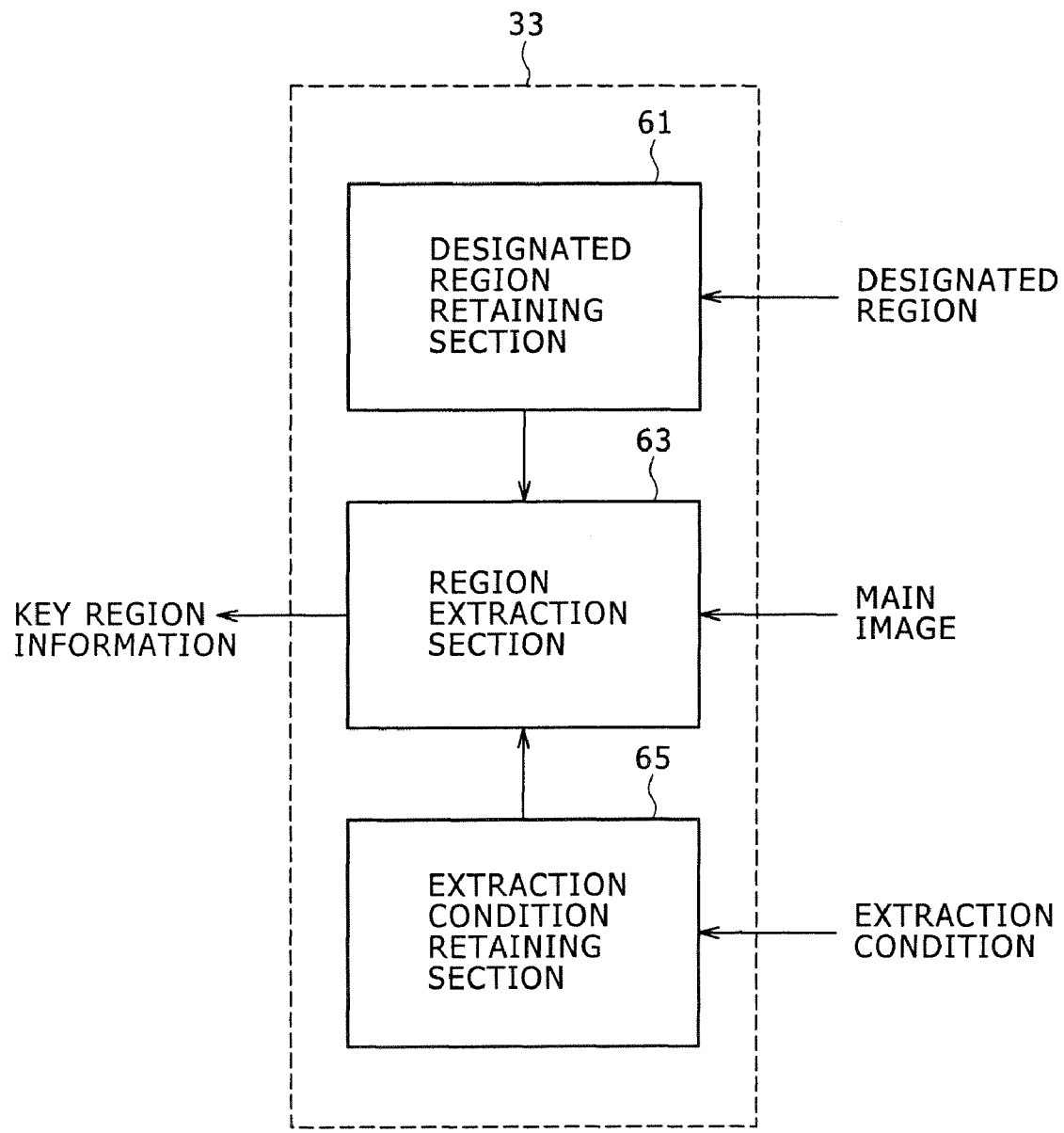
FIG. 11 is a block diagram showing an example of an internal configuration of a key region setting section which implements an automatic extraction function of a key region based on a color condition.

FIG. 11 shows an example of an internal configuration of the key region setting section 33 (FIG. 3) where it implements an automatic extraction function of a key region in accordance with a color condition.

Referring to FIG. 11, the key region setting section 33 includes a designated region retaining section 61, a region extraction section 63 and an extraction condition retaining section 65. From among the components mentioned, the designated region retaining section 61 is a storage region for storing a region 51 designated through the inputting apparatus. In other words, the designated region retaining section 61 is a storage region for retaining a region which provides an extraction processing range.

The region extraction section 63 is a signal processing section which extracts a partial region which satisfies a color condition from within the region 51 designated from within the main image.

The extraction condition retaining section 65 is a storage region for retaining an extraction condition. In the present example, the extraction condition retaining section 65 is used to retain a color condition designated through the inputting apparatus.

This processing function is effective particularly where the difference in hue between a region to be set as a key region and a peripheral region is great.

It is to be noted that the extraction condition may include not only a color condition but also a particular shape or pattern. Also in those cases, simplification of the number of man-hours for inputting can be implemented similarly as in the case of the region extraction based on a color condition.

b. Follow-Up Function of a Key Region Based on a Characteristic Amount

In the foregoing description, a key region is set by manual operation.

Here, a technique of storing a characteristic amount of a set key region and automatically following up the key region in response to movement of a subject in a main image is described.

Figure 12:
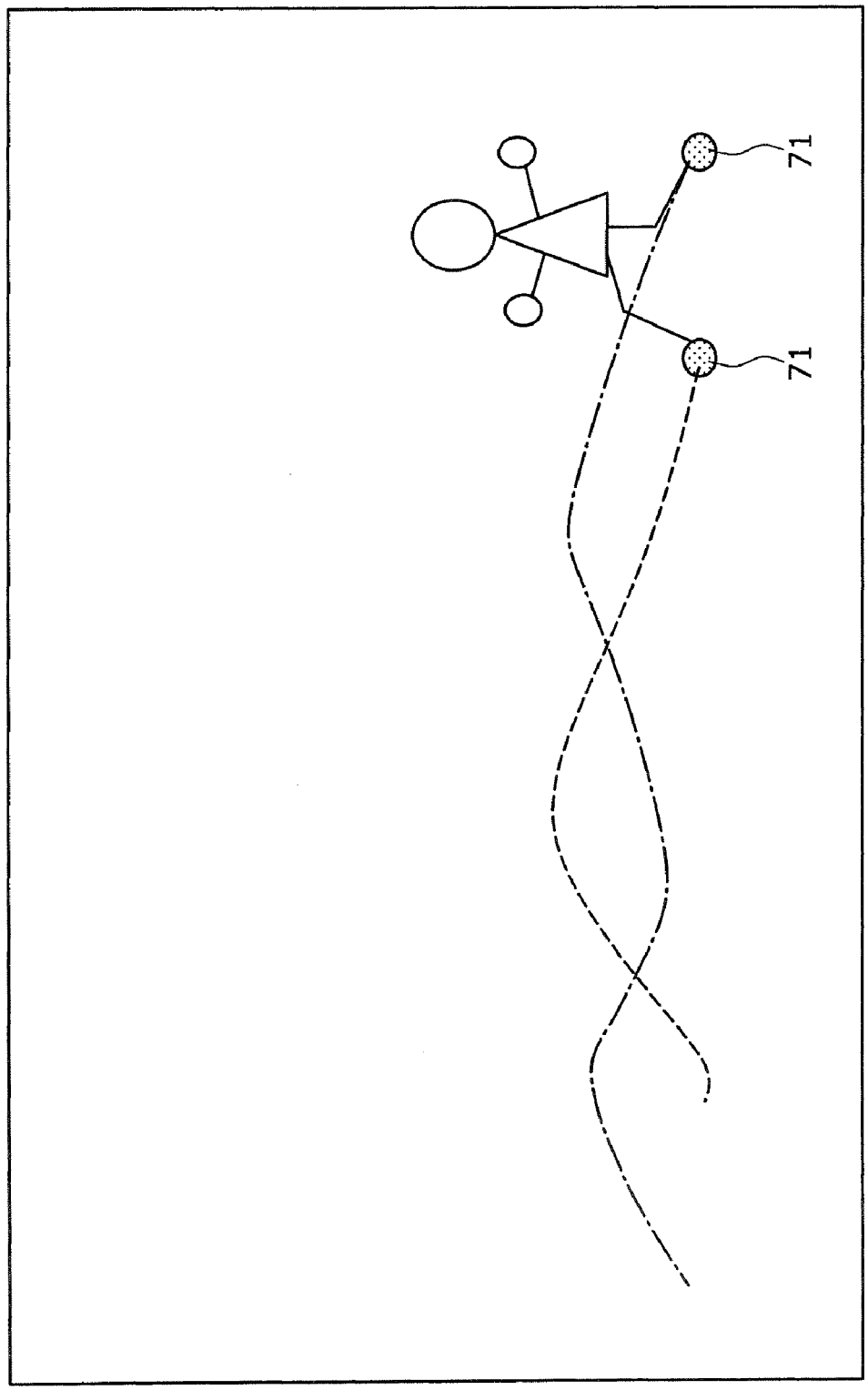
FIG. 12 is a schematic view showing a processing image where a key region is set so as to follow up a characteristic amount of each of the shoes of the image of the subject.

FIG. 12 illustrates a processing image. Also FIG. 12 represents an example wherein shoes of a subject image are set as key regions.

Where the key region follow-up function is adapted, as far as the main image for which the key image is set remains within the screen, also the key region can be moved so as to follow up the movement of the subject image in the main image as seen in FIG. 12.

Where the follow-up function described above is incorporated, the amount of operation of the operator is reduced significantly.

Figure 13:
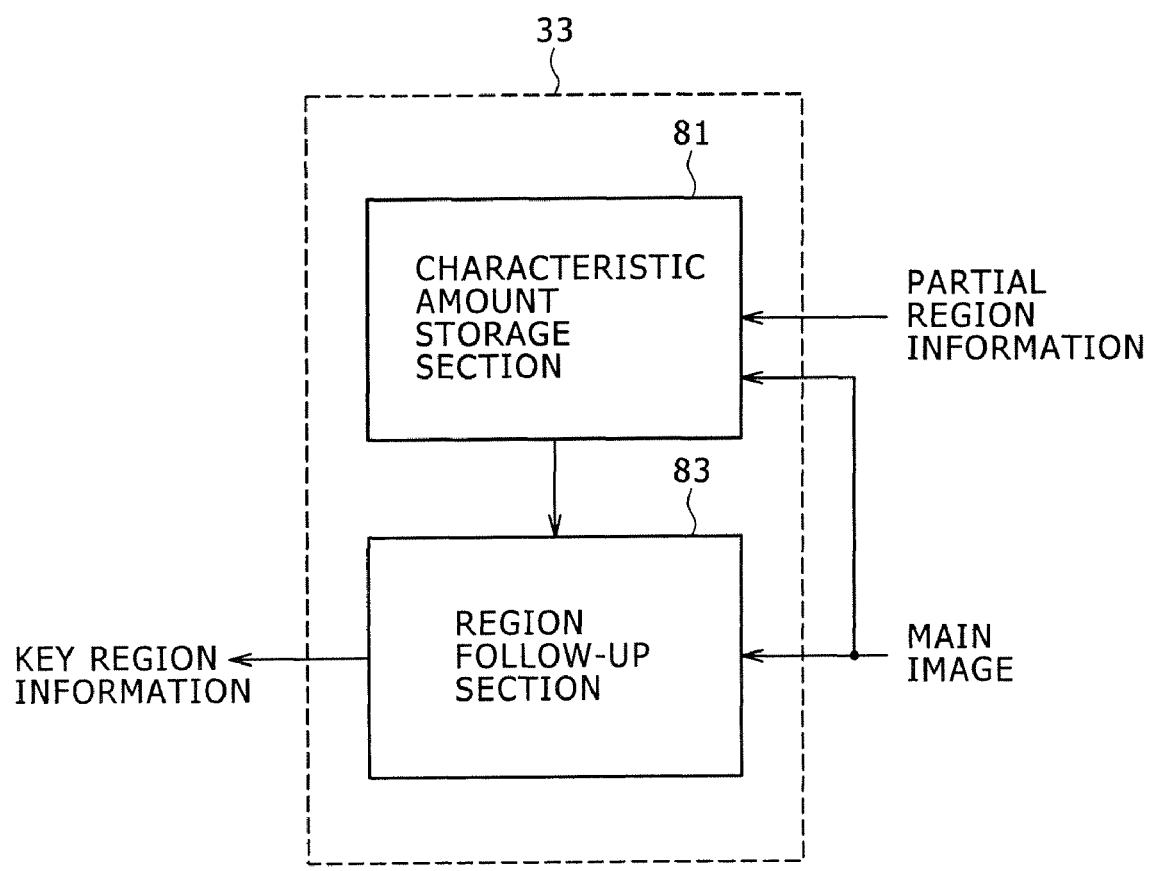
FIG. 13 is a block diagram showing an example of an internal configuration of a key region setting section where it implements an automatic following up function of a key region.

FIG. 13 shows an internal configuration of the key region setting section 33 (FIG. 3) where it implements the automatic follow-up function of a key region.

Referring to FIG. 13, the key region setting section 33 includes a characteristic amount storage section 81 and a region follow-up section 83. The characteristic amount storage section 81 is a storage region for storing characteristic amounts (for example, the hue, lightness, shape and so forth) of a main image corresponding to a key region set through the inputting apparatus.

The region follow-up section 83 is a signal processing section which extracts a partial region which satisfies the stored characteristic amounts from within the main image and outputs the extracted region as key region information. It is to be noted that a known image processing technique is applied to the technique for extracting a partial region.

It is to be noted that, while, in the embodiment, manual inputting of a key region is supposed, alternatively such characteristic amount may be registered in advance independently of a setting operation of a key region such that a partial region which satisfies the characteristic amounts is automatically extracted from a main image and set to a key region.

For the characteristic amounts, for example, a particular color range, a combination of particular colors, a particular symbol or shape or a particular character string may be used.

Use of the function described allows automation of considerable part of tag information application operation.

Besides, it is possible to automatically apply tag information to some live broadcasting program. For example, if a characteristic of an advertising billboard in a live relay program of sports is registered in advance, then the advertising billboard appearing on the screen can be automatically set as a key region. In other words, it is technically possible to automatically embed tag information in the advertising billboard.

For example, where the advertising billboard has a red color, if a color range of red is designated as a characteristic amount, then a partial region of red in the screen can be set as a key region. It is to be noted that, depending upon the image pickup angle, there is the possibility that another partial region which satisfies the characteristic amount other than an advertising billboard such as a player or a spectator may be extracted. In this instance, the operator may click the advertising billboard so that any other region is excepted from a setting object as a key region.

Alternatively, for example, where an advertising billboard includes yellow characters on the blue background, if this color pattern is designated as a characteristic amount, then a partial region which includes a similar color pattern can be set as a key region.

Further, for example, if a shape of an advertising billboard or a special symbol representing an advertising billboard is set as a characteristic mount, then a partial region which includes a similar shape or symbol can be set as a key region.

Further, for example, if a character string representative of the name of an enterprise or a commodity appearing on an advertising billboard is designated as a characteristic point, then a partial region which includes a similar character string can be set as a key region. In this instance, a character recognition technique may be used in combination.

c. Follow-Up Function of a Key Region by an Interpolation Process

In the foregoing description, the automatic follow-up function of a key region based on a characteristic amount is described.

Here, a technique of automatically setting, when a locus of movement of a subject image set as a key region from a certain working screen (start point) to another working screen (end point) is estimated, a key region position between the two screens by interpolation arithmetic operation using position information of the key region set on the two screens is described.

Figure 14A:
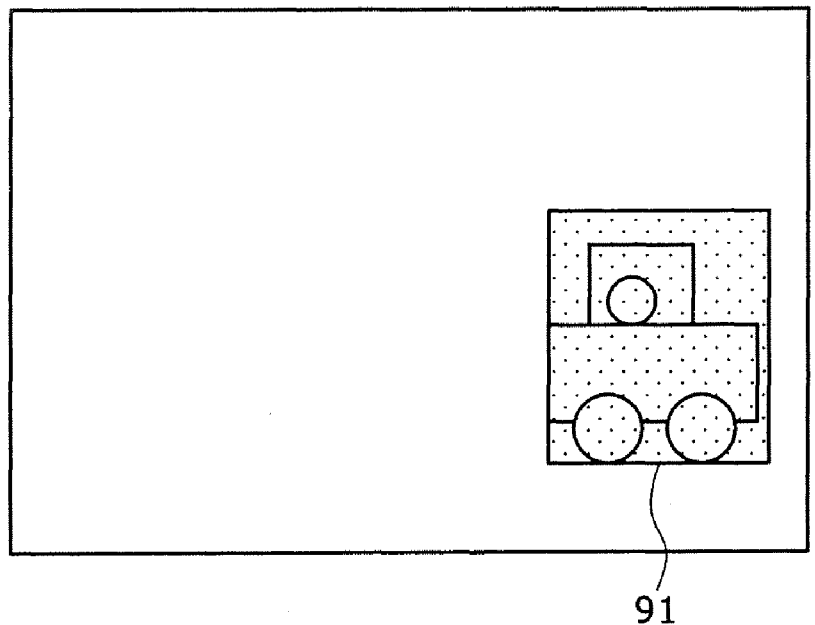
FIGS. 14A and 14B are schematic views illustrating a positional relationship between a key region set on a working screen selected at a start point and a key region set on another working screen selected at an end point.
Figure 14B:
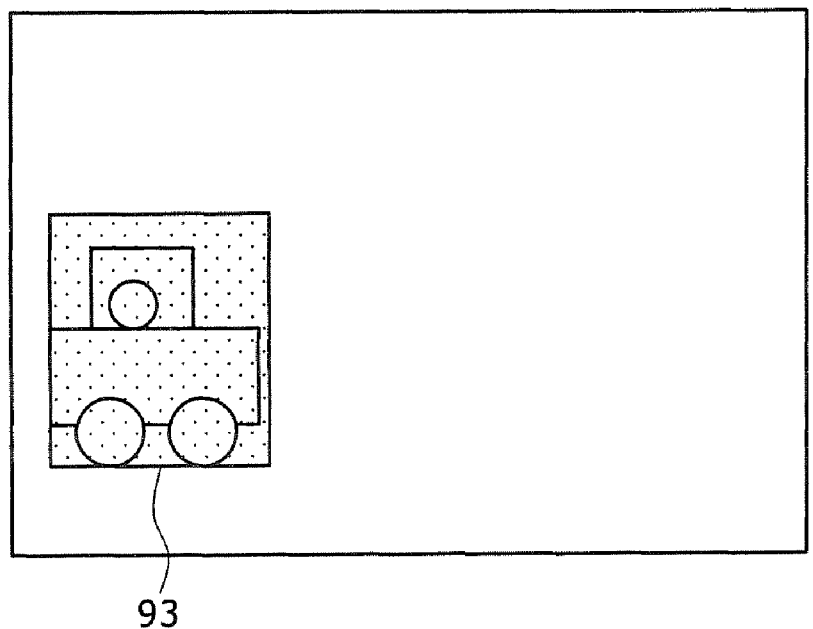

FIGS. 14A and 14B illustrate a processing image. Also FIGS. 14A and 14B illustrate examples wherein a vehicle of a subject image is set as a key region.

In particular, FIG. 14A illustrates a state wherein a key region is set to a partial region 91 at which a vehicle is positioned on a working screen selected as a start point.

FIG. 14B illustrates another state wherein a key region is set to a partial region 93 at which the vehicle is positioned on a working screen selected as an end point.

Figure 15:
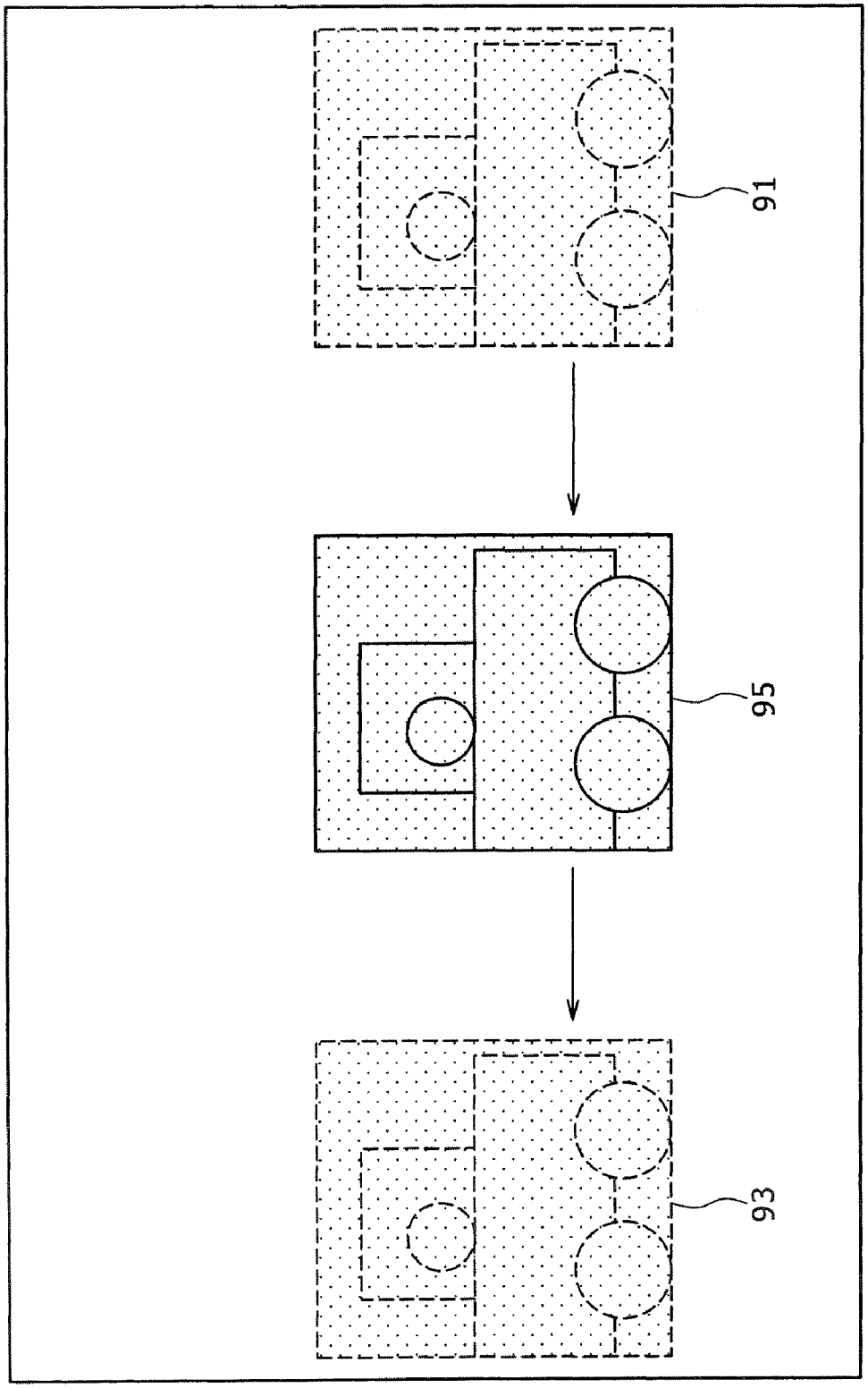
FIG. 15 is a schematic view showing a locus where the shoes of the subject image move linearly between the two different points of time.

FIG. 15 shows a locus where the vehicle of the subject image moves linearly between the two points of time. In this instance, it is estimated that, at an arbitrary point of time between the two points of time, the vehicle of an object of tagging is positioned at a partial region 95 taking an acceleration upon movement into consideration.

Accordingly, if a technique for automatically setting an estimated partial region as a key region is adopted, then considerably accurate region designation can be anticipated through a small amount of work.

Further, the amount of arithmetic operation is reduced when compared with that in the follow-up process based on a characteristic amount described hereinabove.

Figure 16:
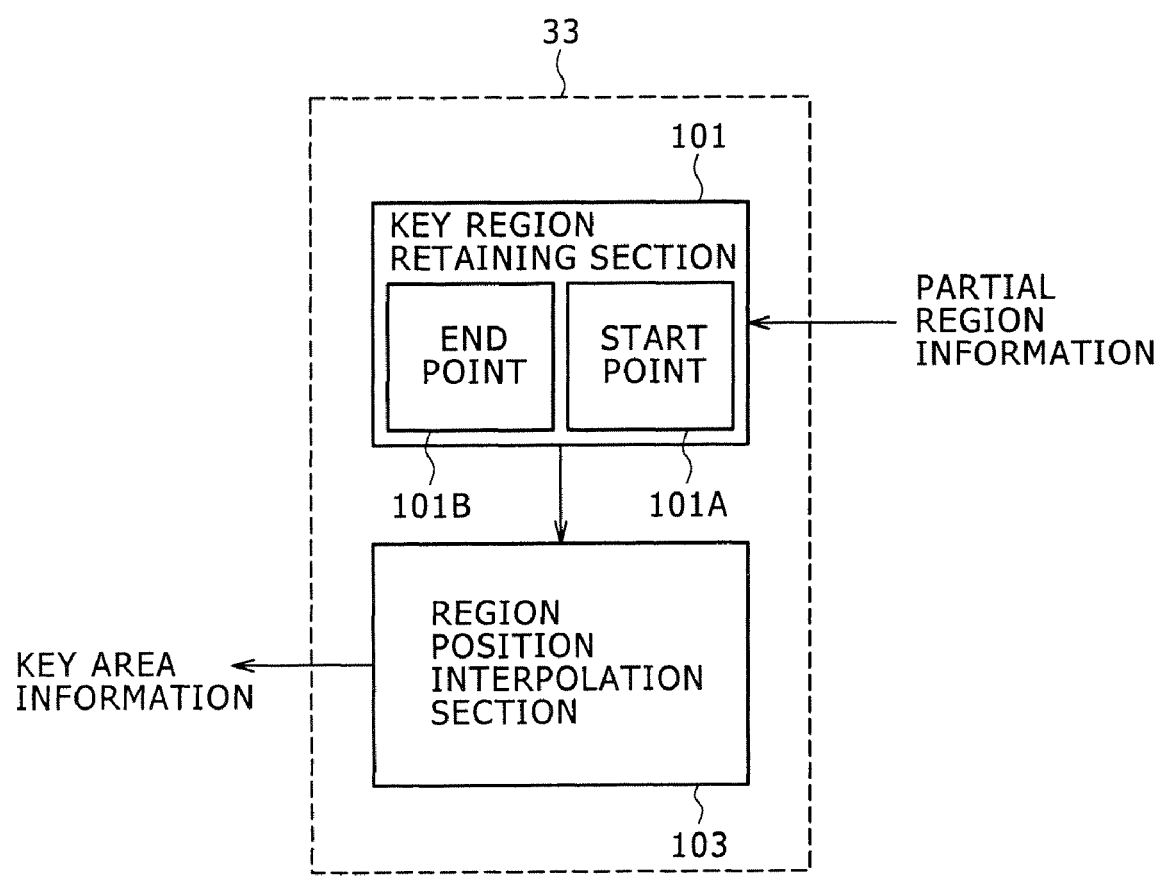
FIG. 16 is a block diagram showing another example of an internal configuration of the key region setting section where it implements an automatic following up function of a key region.

FIG. 16 shows an example of an internal configuration of the key region setting section 33 (FIG. 3) where it implements an automatic follow-up function of a key region.

Referring to FIG. 16, the key region setting section 33 includes a key region retaining section 101 and a region position interpolation section 103. The key region retaining section 101 is a storage region having a region 101A for storing the position of a key region set on a working screen set as a start point and another region 101B for storing the position of a key region set on a working screen set as an end point.

The region position interpolation section 103 is a signal processing section which interpolates the position of the key region between the position of the key region at the start point and the position of the key region at the end point in response to the temporal position between the two points.

Where the acceleration or the locus upon movement can be referred to, the region position interpolation section 103 refers to the information to determine the position of the key region.

In the case of FIG. 15, however, since the vehicle moves linearly, a position determined based on a ratio in time between the two points is estimated as the position of the key region.

A-4. Modifications

Here, modifications to the linear editing system and the nonlinear editing system are described.

In the foregoing description, upon setting of a key region, a position and a range are inputted as key region information.

However, only a position may be inputted while it is assumed that the key region has a fixed configuration (fixed range).

Figure 17A:
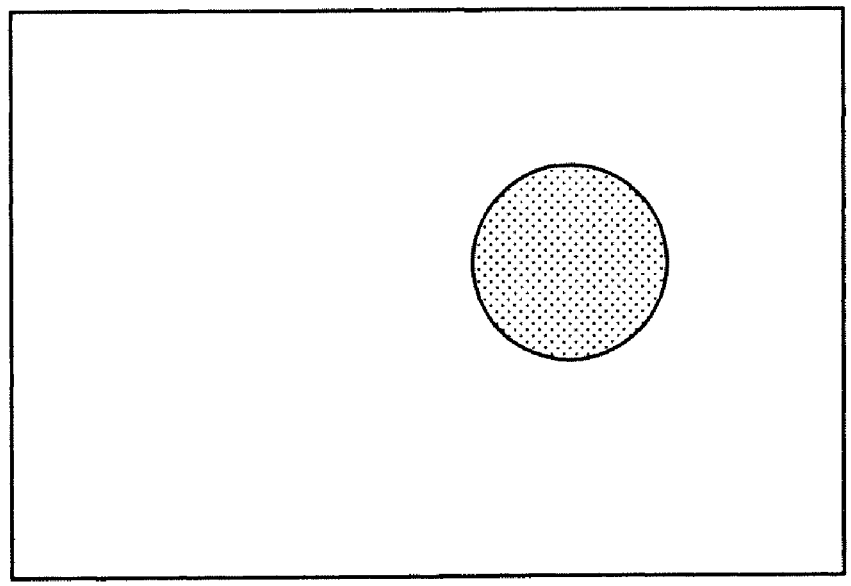
FIGS. 17A, 17B, 18A and 18B are schematic views showing examples of the shape of a key region prepared in fixed shapes.
Figure 17B:
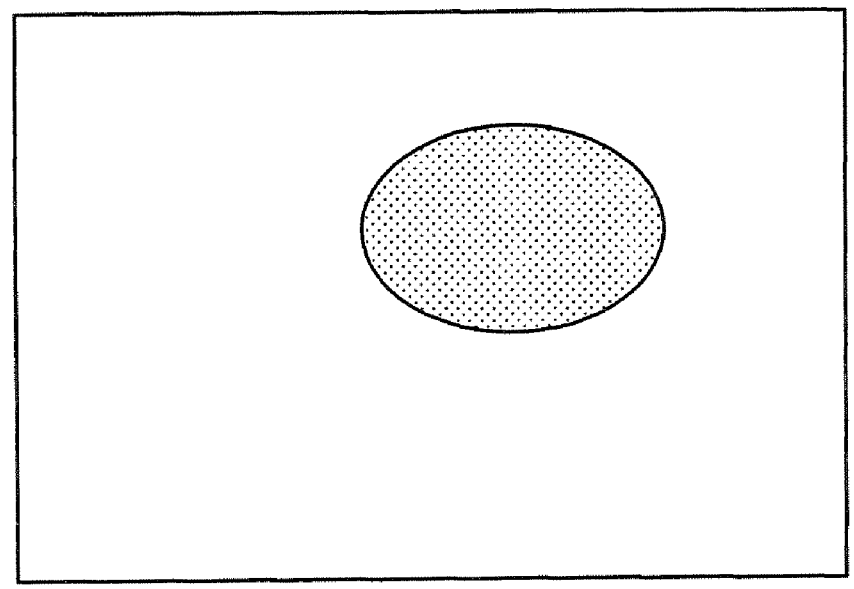

Meanwhile, the key region may have a circular shape as seen in FIG. 17A or may have an elliptic shape as seen in FIG.

Figure 18A:
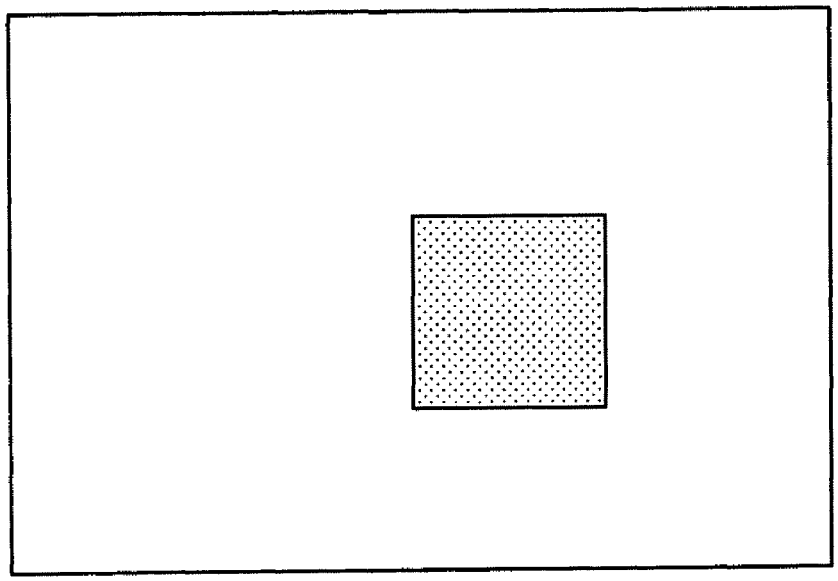
Figure 18B:
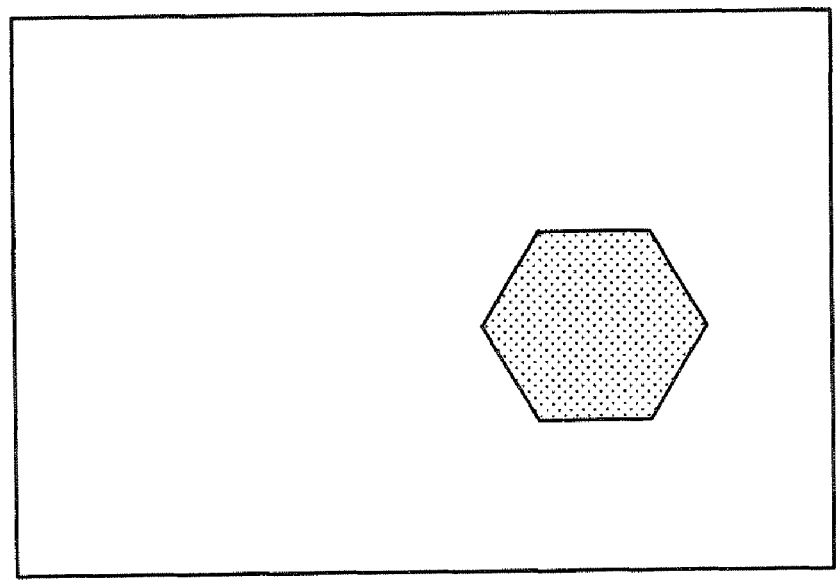

17B. Further, the key region may have a square shape as seen in FIG. 18A or may have such a polygonal shape as shown in FIG. 18B or any other polygonal shape. Further, the key region may have any arbitrary configuration. Such patterns for a key region as described above are preferably used selectively by a key operation.

It is to be noted that preferably a function that the configuration of a key region automatically varies as time passes can be selected. For example, where a certain key region at a start point is designated as a circular region and the certain region at an end point is designated as an elliptic shape, a morph function of deforming the configuration of the key region at intermediate points little by little from the circular configuration to the elliptic configuration is applied. The morph function is a known function.

Further, while, in the foregoing description, a time code is used as time information representing the reproduction position of a main image and a key image, also it is possible to use the frame number.

Figure 19A:
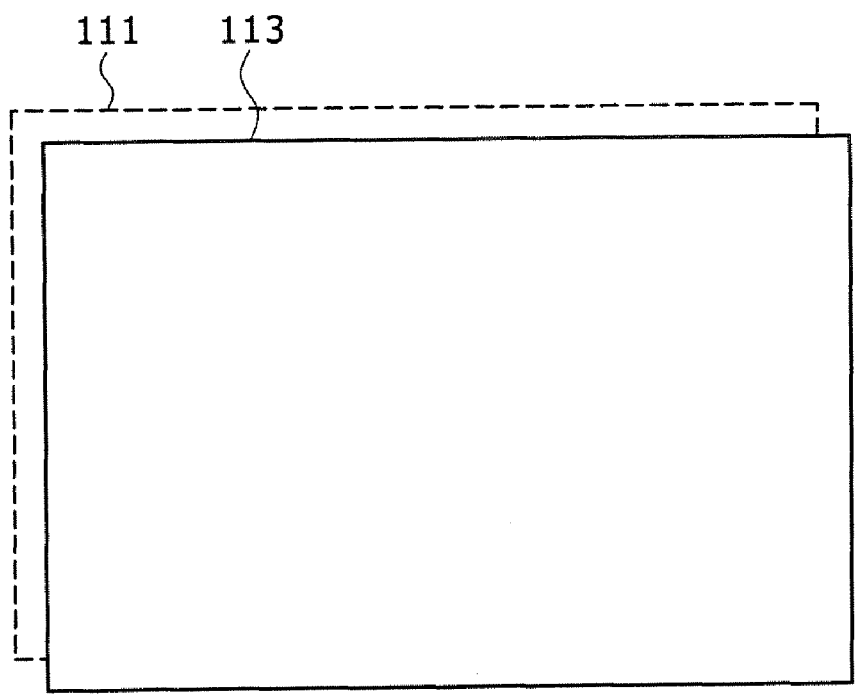
FIGS. 19A and 19B are schematic views illustrating a relationship between the size of a main image and the size of a key image.
Figure 19B:
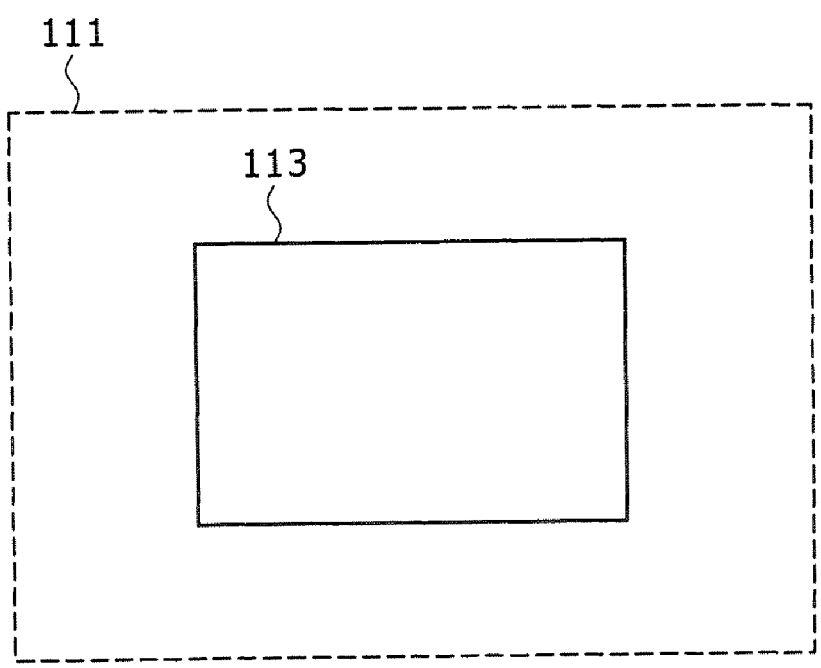

Further, while, in the foregoing description, the size of a main image 111 and the size of a key image 113 are equal as seen in FIG. 19A, the size of the key image 113 may be set to a fraction of the size of the main image 111 as seen in FIG. 19B. For example, the size of the key image 113 may be one half (½) or one fourth (¼) the size of the main image 111.

For example, where the size of the main image is 1,920× 1,080 and the size of the key image is 960×540, the size of the key image is one half that of the main image in both of the horizontal and vertical directions. Accordingly, the position (x, y)=(10, 20) on the key image is given as the position (5, 10) on the key image.

The positional relationship between the key image and the main image is confirmed already upon setting of the key region. Therefore, there is no problem even if the size of the key image is smaller.

Rather, reduction in size of the key image can reduce the data size.

Further, while, in the foregoing description, a gray scale value (lightness value) is used as region identification information to be coordinated with a key region, a hue value may be used instead.

For example, even where a hue value corresponding to red, blue, yellow or green is used, it can be utilized for identification of a region without any trouble. In addition, also where a plurality of key regions are visually confirmed on a screen, they can be confirmed readily depending upon the difference in color.

Further, while, in the foregoing description, a "shoe", a "vehicle", an "advertising billboard" or the like is used as an example of a subject image which is an embedding object of tag information (setting object of a key region), a person such as a performer or a player, an animal or a living thing or the like appearing in a main image may be used as an embedding object of tag information (setting object of a key region).

B. Production Apparatus for Index Information with Link Information and Production Apparatus of Image Data with Tag Information B-1. Production Apparatus for Index Information with Link Information Here, an apparatus for applying link information to index information produced formerly is described. In other words, a production apparatus for index information with link information is described.

If index information produced as described above is used, then a key region in the same screen set with regard to a main image can be identified. However, at this stage, information of an object of a service cannot be provided to the viewer.

Thus, the inventors of the present invention applies link information to the index information produced formerly.

FIGS. 20A and 20B show embedded images of ink information.

In particular, FIG. 20A illustrates an embedded image of link information where a URL (Uniform Resource Locator) is embedded by a link information embedding section 121.

FIG. 20B illustrating another embedded image of link information where a commercial message (CM) identifier (local address) is embedded by the link information embedding section 121. It is to be noted that also it is technically possible to embed a CM itself as link information.

Where link information is embedded in index information in this manner, coordination between a partial region in which the tag information is embedded and the URL or the CM concludes.

Figure 21:
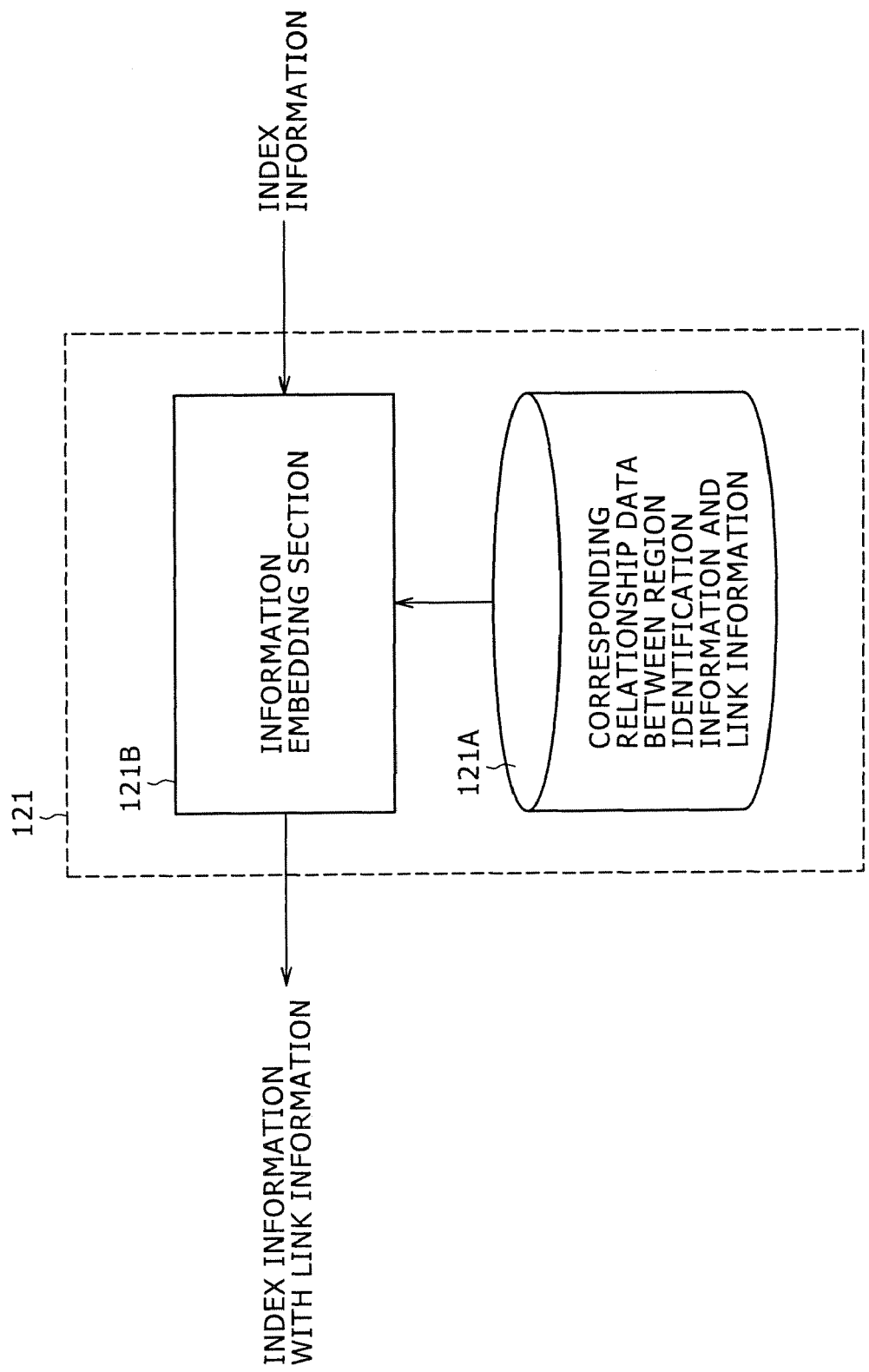
FIG. 21 is a diagrammatic view showing an example of an internal configuration of a link information embedding section.

FIG. 21 shows an example of an internal configuration of the link information embedding section 121. Referring to FIG. 21, the link information embedding section 121 includes a database 121A and an information embedding section 121B.

The database 121A is a region which stores corresponding relationships between region identification information applied to key region which provides partial regions in a main image specified arbitrarily by the operator and link information for accessing to related information of the partial regions.

In other words, the database 121A is a region which stores corresponding relationships between object identification information and link information or corresponding relationships between region identification information and link information. It is to be noted that the corresponding relationships are registered in advance. Alternatively, a corresponding relationship may be inputted by manual operation every time.

The information embedding section 121B is a signal processing section which refers to the database to embed, in index information which lists corresponding relationships between region identification information and time information applied to key regions, corresponding link information.

FIG. 22 illustrates an example of production of index information with link information. More particularly, FIG. 22 illustrates an example wherein a URL is embedded as link information.

In the case of FIG. 22, two pieces of tag information are set for "00 hour: 14 minute: 10 second; 00 frame". One of the two pieces of tag information is region identification information "20" which corresponds to one shoe, and the other is region identification information "40" which corresponds to one vehicle.

In the case of the present example, with the region identification information "20", "http://www.xxx.com/yy/yy" is coordinated as link formation to the partial region.

Similarly, with the region identification information "40", "http://www.zzz.com/yy/yy" is coordinated as link formation to the partial region.

By the use of the link information embedding section 121, a coordination work between key regions and link information can be performed efficiently as far as the matching property of corresponding relationships between information for identifying key regions (for example, region identification information or object identification information) and link information are assured.

Further, where a main image and related information to the main image are handled separately from each other in this manner, since maintenance of them can be carried out separately from each other, various advantages can be anticipated.

For example, the maintenance upon change of an address of a related information site such as upon cancellation of a link of a URL is required only for the index information with link information. Therefore, the burden required for maintenance or management can be reduced.

Further, also upon termination of a contract with any advertising customer upon re-distribution (re-broadcasting), it is only necessary to individually delete the pertaining portion from the index information with link information. Therefore, the burden of work decreases.

Further, for example, also when a key region is to be registered additionally, although a tagging operation is required, what is to be updated is only a key image and index information (index information with link information). Therefore, there is no necessity to touch with the main image.

B-2. Production Apparatus for Image Data with Tag Information

If all of index information with link information described above, a main image and a key image become available, then provision of a service intended by the inventors of the present invention is permitted. In other words, it is possible to use a click operation of the viewer who views the main image as a trigger to display related information.

On the other hand, if the images and the information can each be handled by itself, then there is the possibility that only the main image may be recorded or duplicated. Where the link information is a CM, recording or duplication only of the main image signifies loss of an opportunity of advertisement. This, however, obstructs the development of the media industry in which the CM is a major source of income.

Therefore, the inventors of the present invention propose a technique of outputting index information with link information, a main image and a key image in a mutually associated relationship. The technique can thus raise the inevitability that also tag information (index information with link information and a key image) is duplicated or recorded integrally with a main image.

Particularly, if it is required as a condition in duplication or recording of a main image that all of index information with link information, a main image and a key image be available, then also the advertisement opportunity can be assured while free enjoyment is permitted.

Further, even if it is required as a condition to allow a main image to be produced normally that all of index information with link information, a main image and a key image be available, also the advertisement opportunity can be assured while free enjoyment is permitted.

Further, this technique is effective also as a countermeasure of a CM skip where a main image is stored into a hard disk drive apparatus or some other randomly accessible recording medium and enjoyed later. This is because, different from a CM inserted in a gap between main images, the tag information does not make an object of a CM skipping function.

Further, in display of a CM, a click operation of the viewer is required. Therefore, a psychological resistance as in a case wherein such display is popped up freely irrespective of the will of the viewer is not provided to the viewer. Actually, since the viewer clicks a region in which tag information is embedded in a main image as a result that the viewer is interested in the main image, a higher adverting effect than that where the CM is included in a continuously given stream of display can be anticipated.

a. System Configuration

In the following, a production apparatus for image data with tag information is described.

Figure 23:
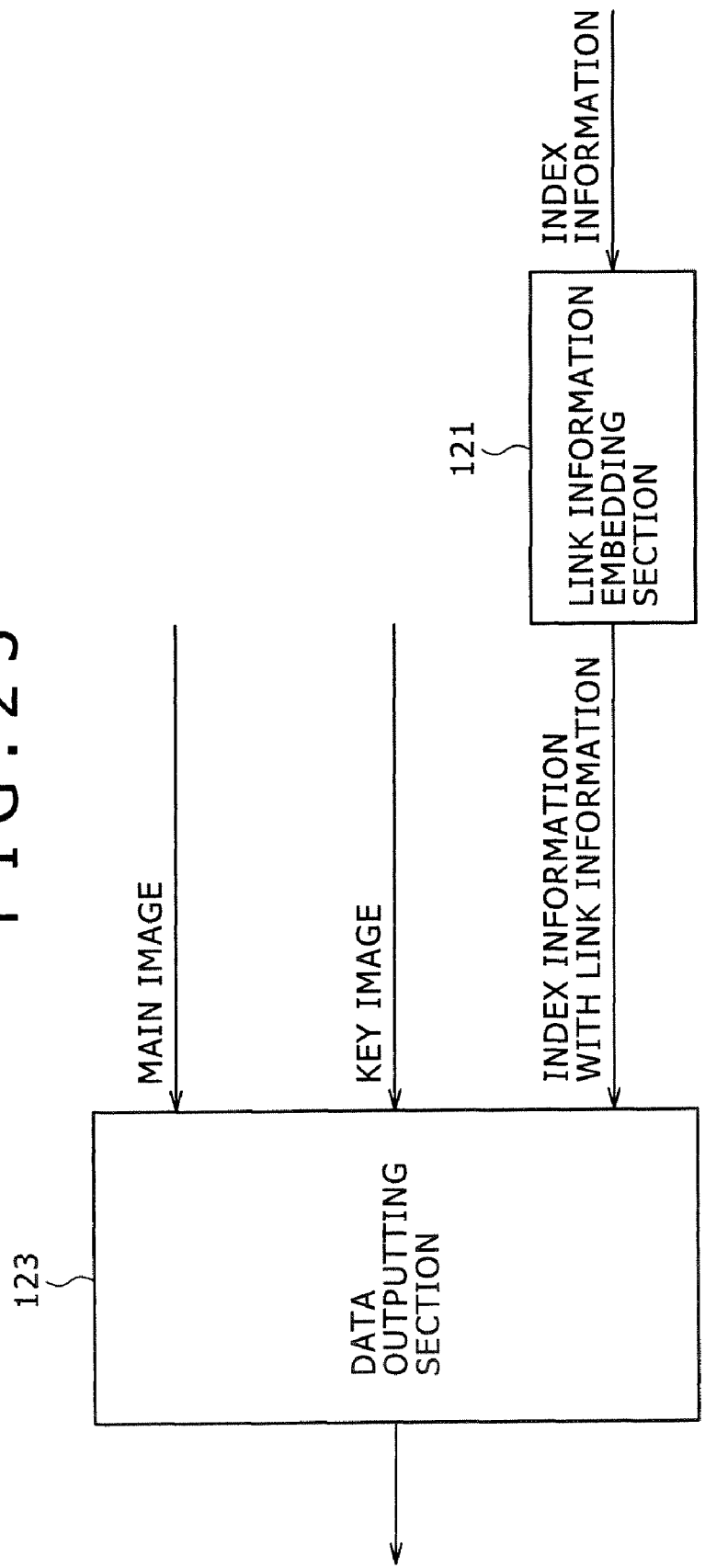
FIG. 23 is a block diagram showing an example of an internal configuration of a production apparatus for image data with tag information.

FIG. 23 shows an example of an internal configuration of the production apparatus for image data with tag information. Referring to FIG. 23, the production apparatus for image data with tag information shown includes a link information embedding section 121 (FIG. 21) and a data outputting section 123.

The data outputting section 123 is a signal processing section which outputs index information with link information, a main image (including a live image) and a key image in a mutually associated relationship with each other.

Figure 24:
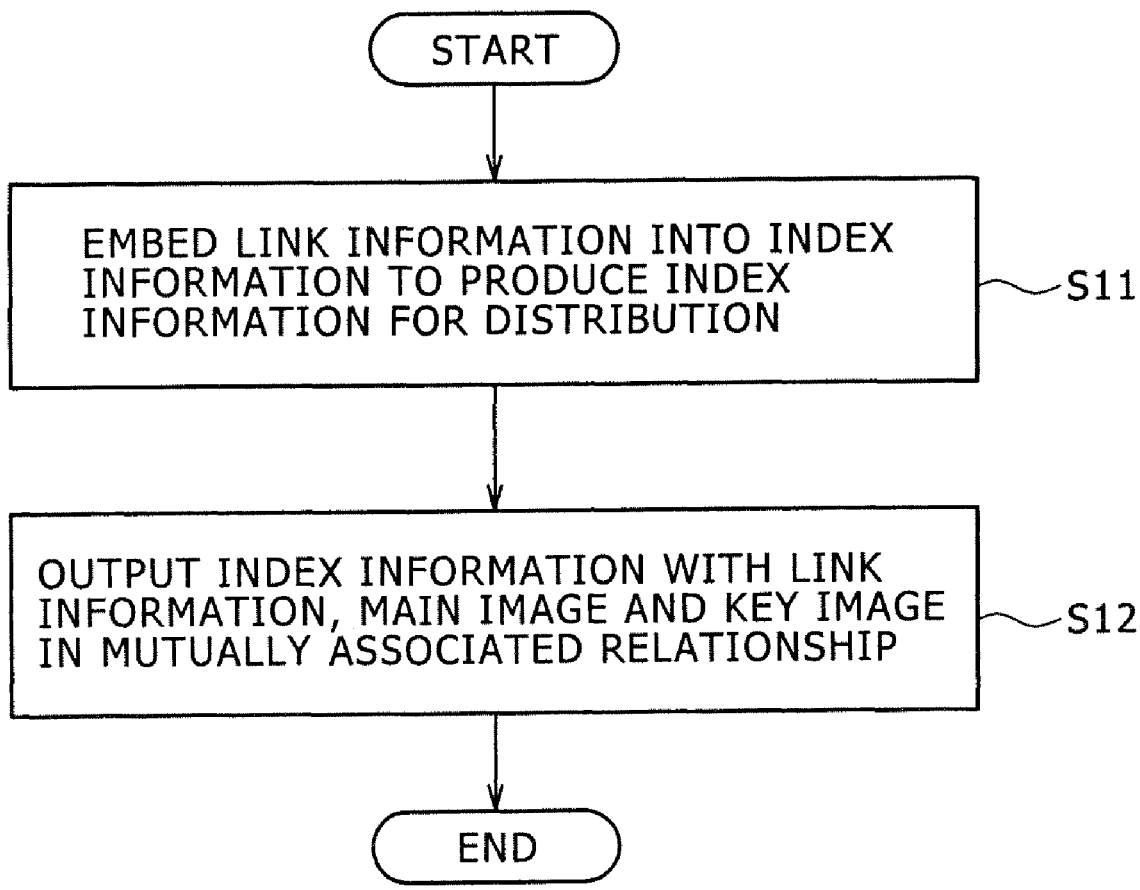
FIG. 24 is a flow chart illustrating an outline of the substance of processing of a program corresponding to the production apparatus for image data with tag information.

It is to be noted that the production apparatus for image data with tag information can be implemented also as a program illustrated in FIG. 24.

In particular, the production apparatus for image data with tag information can be implemented by a process of embedding link information into index information to produce index information with link information (S11) and another process of outputting the index information with link information, a main image and a key image in a mutually associated relationship (S12).

Here, the output destination of the image data with the associated tag information is a transmission line or a recording medium. Where the transmission destination is a transmission line, the form of distribution may be, for example, downloading, streaming or broadcasting.

b. Data Format Upon Outputting

In the following, data output examples of image data with tag information outputted from the data outputting section 123 are described.

b1. Data Output Example 1

Figure 25:
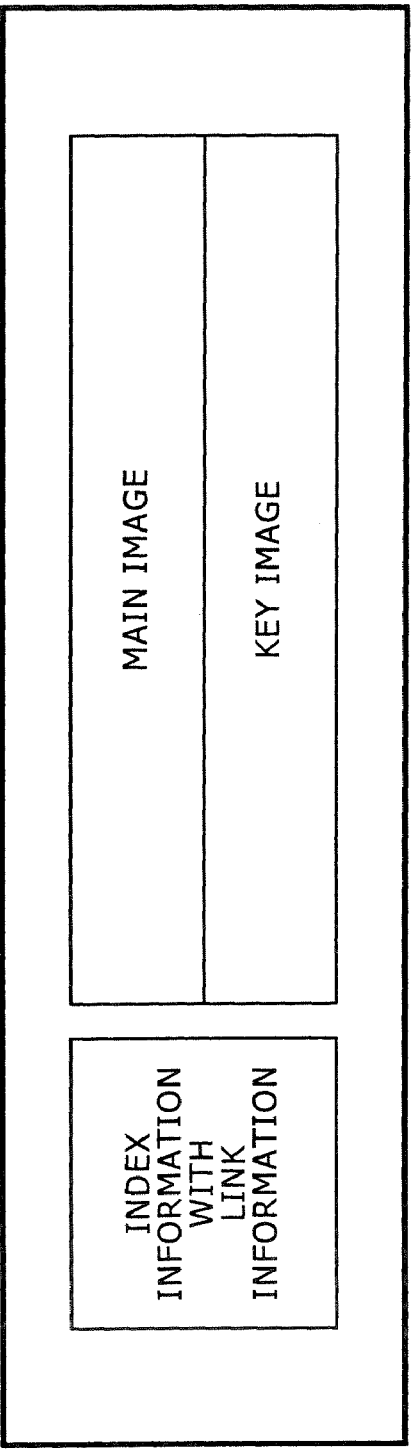

FIG. 25 illustrates one of data output examples. Referring to FIG. 25, in the data output example shown, index information with link information is applied to and integrated with a main image and a key image both in a non-compressed form so that they are treated as a single file. The file produced has a unique extension "cmov" applied thereto. A file in which a main image, a key image and index information with link information are integrated is hereinafter referred to as "cmov file". Naturally, it is possible to apply some other extension. For example, "ocv" (Object Click Video) may be applied.

Where a main image, a key image and index information with link information are integrated as in the present data output example, this is effective to prevent such a situation that only the main image is separated and utilized by itself.

Where image data are treated in the form of a file, the present data output example is suitable for distribution, for example, in the form of streaming, downloading or a recording medium.

b2. Data Output Example 2

Figure 26:
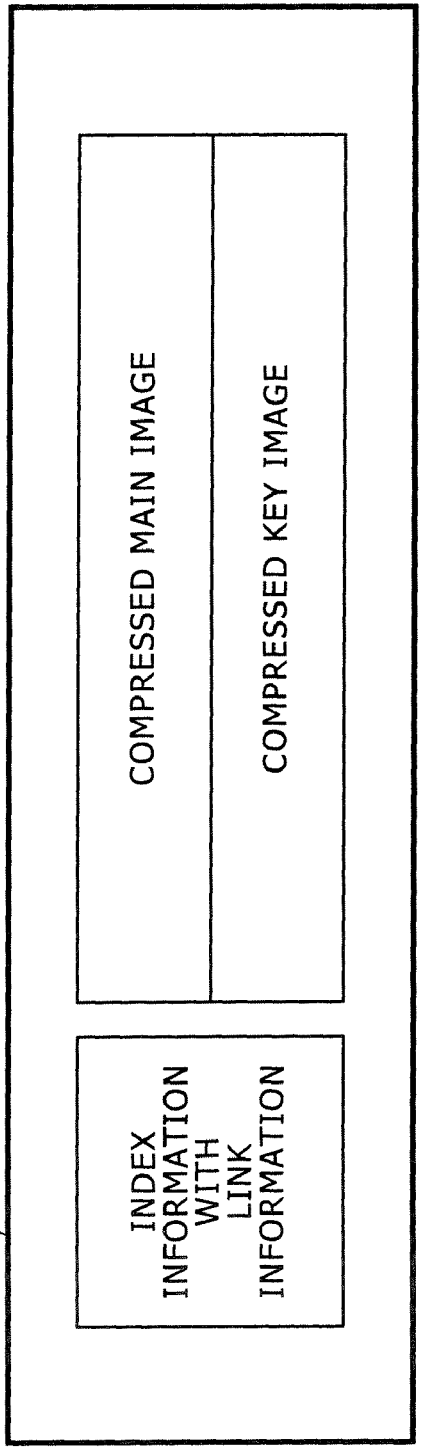

FIG. 26 illustrates another one of data output examples. Referring to FIG. 26, in the data output example shown, index information with link information is applied to and integrated with a main image and a key image both in a compression-coded form so that they are treated as a single file. Also in this instance, the unique extension "cmov" is applied to the produced file.

The compression code system may be any of a reversible compression coding system and an irreversible compression coding system although this applies not only to the present example but also to the other output examples. Generally, for distribution, an irreversible compression coding system having a high compression rate is used. On the other hand, for storage of master data or at an editing stage, a reversible compression coding system is used.

It is to be noted that, though not shown in FIG. 26, a header is applied to the produced file. The header is included in the index information with link information or is prepared separately.

The header describes the position of the index information with link information placed in the file, the top positions of the main image and the key image, the number of frames, the picture size (pixel numbers in the horizontal and vertical directions), the compression system, arrangement information (address offsets) of the index information with link information/main image/key image in the file and so forth.

Also the present data output example is effective to prevent such a situation that only the main image is separated and utilized because the main image, key image and index information with link information are integrated with each other. Further, since the data are in a compression coded form, the data amount is small. Further, also the present data output example is suitable for distribution in the form of, for example, streaming, downloading and a recording medium where the image data are treated in the form of a file.

Further, the present data output example allows only the index information with link information to be read out initially or at an arbitrary timing. Accordingly, it is easy to display a table of related information.

b3. Data Output Example 3

Figure 27:
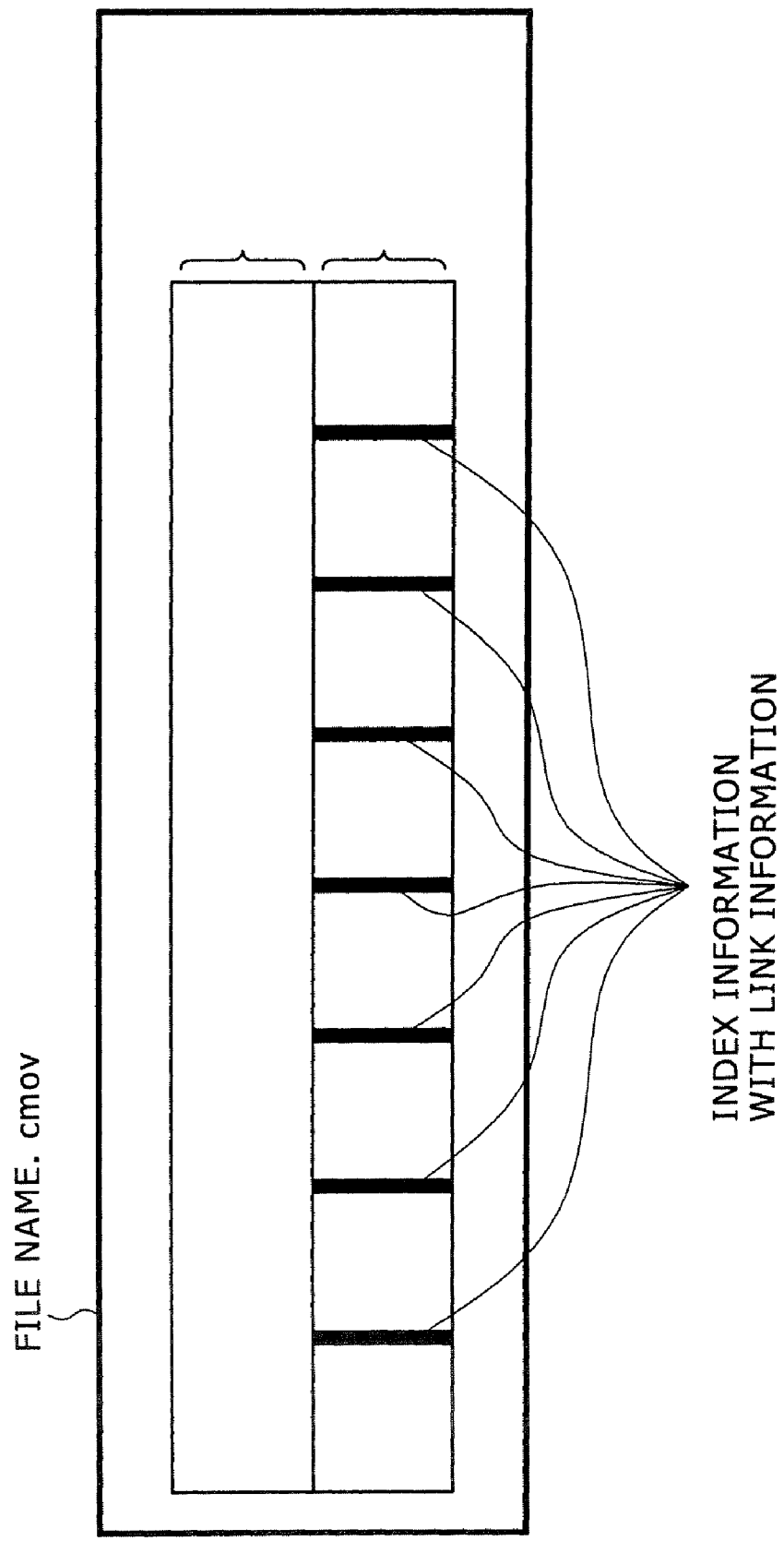

FIG. 27 illustrates a further one of data output examples. Referring to FIG. 27, also in the data output example shown, a main image and a key image are compression coded and integrated with each other so that they are treated as a single file similarly as in the two output examples described hereinabove. Also in this instance, the unique extension "cmov" is applied.

A unique characteristic of the present output example is that index information with link information is placed in a meta data area of the compressed key image. The meta data are data which describe information relating to the main image. The meta data include, for example, a time code, copyright information, information of an image pickup person, characters, an image pickup place and so forth.

Also the present data output example is effective to prevent such a situation that only the main image is separated and utilized because the main image, key image and index information with link information are integrated with each other. Further, since the data are in a compression coded form, the data amount is small. Further, also the present data output example is suitable for distribution in the form of, for example, streaming, downloading and a recording medium where the image data are treated in the form of a file.

It is to be noted that the index information with link information may otherwise be placed in a meta data area of the compressed main image.

Further, in the case of the present data output example, it is necessary for each piece of index information with link information to have only tag information regarding a corresponding scene (time period). Accordingly, it is possible to make the sizes of individual pieces of index information with link information fixed or equal to each other. Therefore, the present data output form is suitable for broadcasting or a content for a long period of time.

b4. Data Output Example 4

Figure 28:
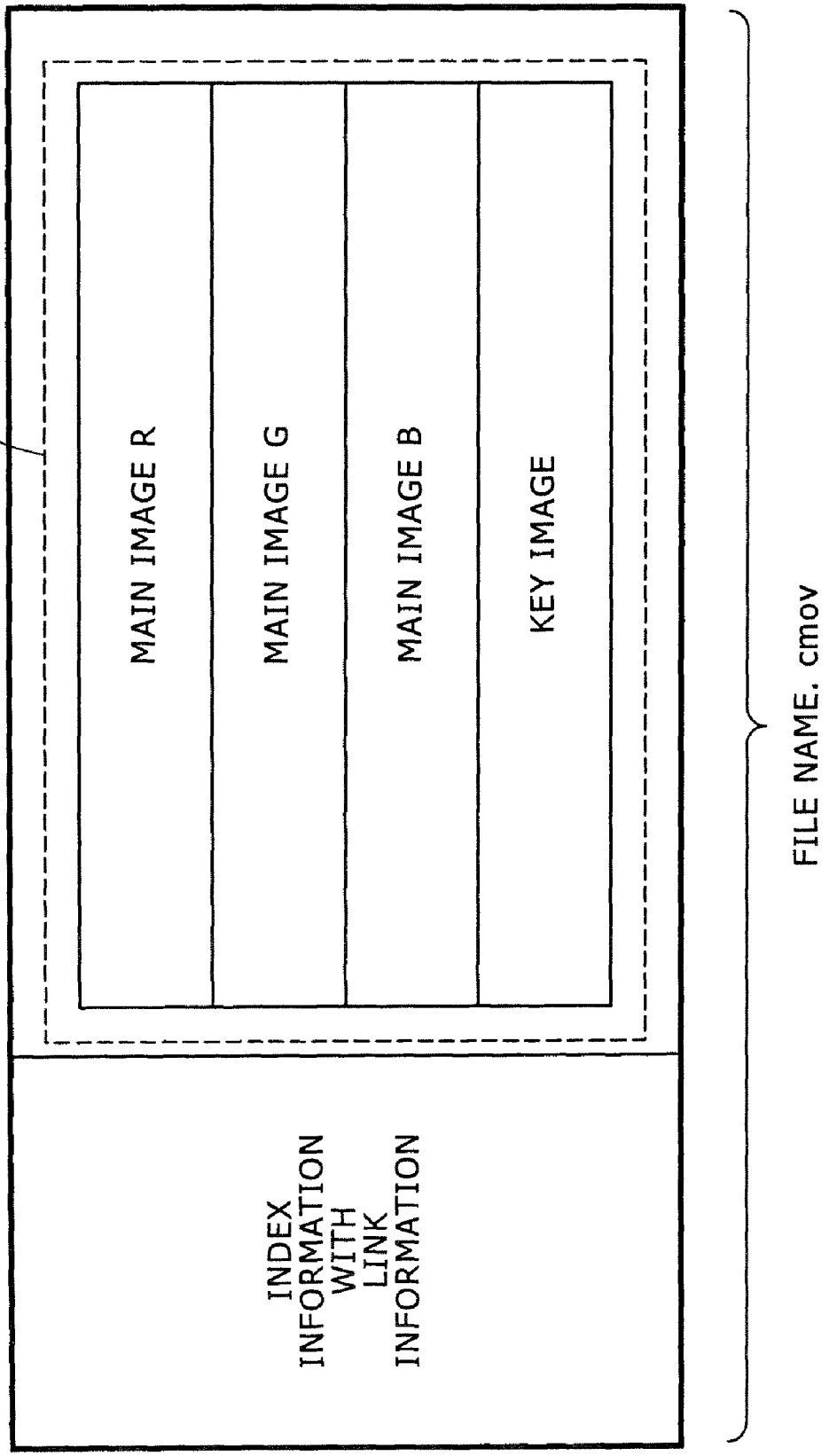

FIG. 28 illustrates a still further one of data output examples. Referring to FIG. 25, image data wherein a main image is allocated to three ones of four data channels and a key image is allocated to the remaining one data channel are compression coded, and index information with link information is applied to form a file.

It is to be noted that FIG. 28 illustrates a data output example wherein three channels for R (red), G (green) and B (blue) are allocated to the three data channels for a main image. Naturally, the three data channels may alternatively be for one luminance data and two color difference data.

Also in this instance, the integrated file has the unique extension "cmov" applied thereto.

Also in the present data output example, a main image, a key image and index information with link information are integrated, and this is effective to prevent such a situation that only the main image is separated and utilized by itself. Further, since the data are in a compression coded form, the data amount is small. Furthermore, where image data are treated in the form of a file, also the present data output example is suitable for distribution, for example, in the form of streaming, downloading or a recording medium.

b5. Data Output Example 5

FIG. 29 illustrates a yet further one of data output examples. Referring to FIG. 29, also in the present data output example, image data wherein a main image is allocated to three ones of four data channels and a key image is allocated to the remaining one data channel are compression coded, and index information with link information is applied to form a file. In particular, the unique extension "cmov" is applied to the integrated file produced.

However, in the present output example, index information with link information is placed in a meta data area of the key image.

Also in the present output example, three channels for R (red), G (green) and B (blue) are allocated to the three data channels for a main image. However, one luminance data and two color difference data may alternatively be applied to the three data channels.

Also the present data output example is effective to prevent such a situation that only the main image is separated and utilized because the main image, key image and index information with link information are integrated with each other. Further, since the data are in a compression coded form, the data amount is small. Further, also the present data output example is suitable for distribution in the form of, for example, streaming, downloading and a recording medium where the image data are treated in the form of a file.

It is to be noted, in the compression coding process for the present output example, a file wherein a key image (one channel) to which index information with link information is applied and a main image (three channels) are integrated may be compression coded. In this instance, a reversible coding system is used for the compression coding. This is effective at an editing stage or for storage as master data.

b6. Data Output Example 6

FIGS. 30A and 30B illustrate yet further ones of data output examples. Referring to FIGS. 30A and 30B, in the data output examples shown, a main image is outputted to a main channel while a key image is outputted to a sub channel. Thereupon, index information with link information is placed in a meta data area of the main image or the key image.

FIG. 30A shows an example wherein index information with link information is placed in the meta data area of the key image (sub channel) while FIG. 30B shows another example wherein index information with link information is placed in the meta data area of the main image (main channel).

The present data output examples are suitable where image data are distributed in a broadcasting form. Where the present data forms are adopted, also in a broadcasting form, a system wherein related information of a partial region specified by the viewer can be displayed on a screen can be implemented. It is to be noted that, upon recording of a main image, if the condition that a sub channel to be paired with the main channel (main image) is recorded is satisfied, then the present data output examples are effective to prevent such a situation that only the main image is separated and utilized.

For example, if a main image is broadcast in either of the present data output forms, such application is possible that, although the main image can be received in a normal manner by an existing tuner, inhibition of copying is effective, or a scramble function becomes effective to inhibit the reception of the main image.

On the other hand, such application can be anticipated with a tuner which is compatible with the present data output forms that, when a key image and index information with link information are received at the same time (where a click function is effective), such limitation as inhibition of copying or a scramble function can be canceled.

Further, upon storage into a hard disk drive apparatus or the like, such application is possible that, where a file is stored in the cmov file format, inhibition of copying, a scramble function or the like for the main image can be canceled.

b7. Data Output Example 7

Figure 31A:
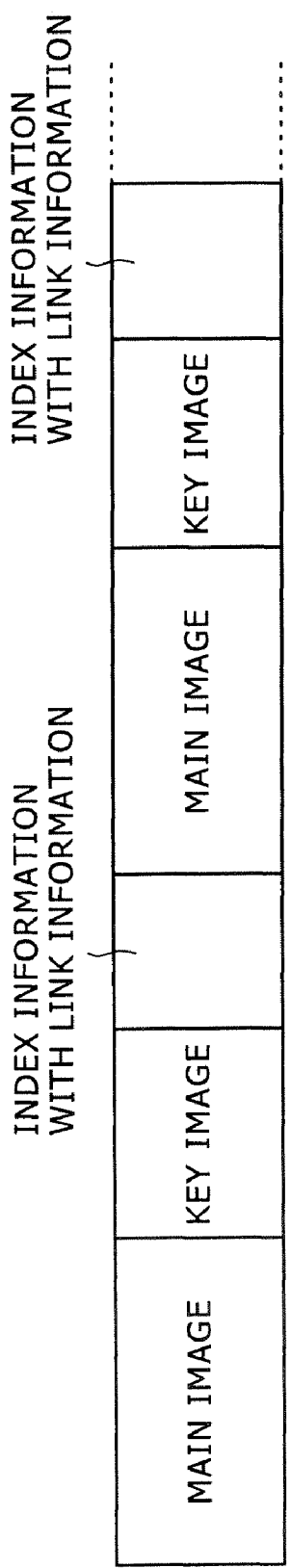

FIG. 31A illustrates a yet further one of data output examples. Referring to FIG. 31A, also the present data output example is suitable for a broadcasting form. However, the present data output example does not use a sub channel. In other words, key image and index information with link information are placed in a meta data area of a main image in the main channel.

Where the present data form is adopted, even in the broadcasting form, a system wherein related information of a partial region specified by the viewer can be displayed on the screen can be implemented. Further, a main image, a key image and index information with link information are integrated with each other, and this is effective to prevent such a situation that only the main image is separated and utilized by itself.

Figure 31B:
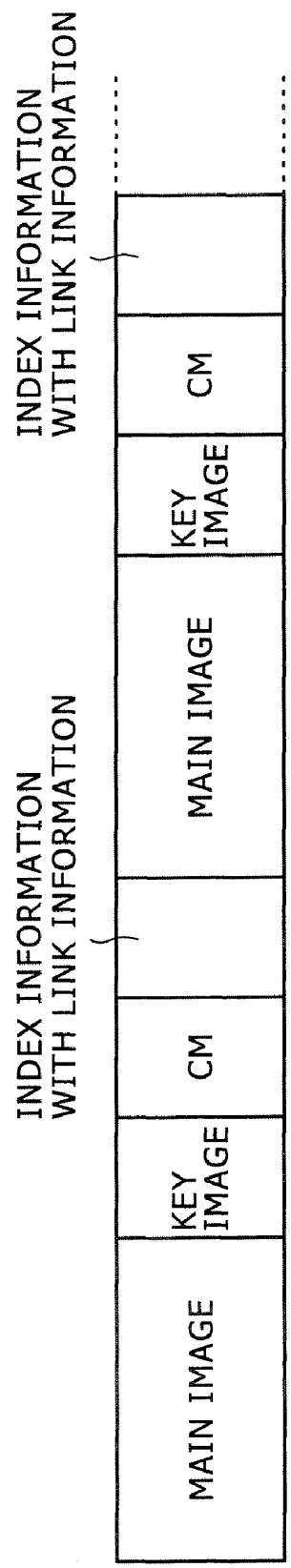

Also it is effective to record related information (for example, a CM) representative of a linking destination of link information in the meta data area together with index information with link information as seen in FIG. 31B.

It is to be noted that the link information is given as information representative of on what numbered page of related information (for example, a CM) the linking destination is or identification information (for example, a number) unique to individual related information.

In this instance, since related information of a linking designation is integrated, there is no necessity to acquire the related information through the Internet. Accordingly, the present data output form is effective where the reproduction apparatus is not connected to the Internet. Also where the reproduction apparatus is connected to the Internet, the present data output form is effective where the communication band is not sufficient or the communication condition is not preferable.

It is to be noted that the method of integrating related information representative of a linking designation of link information with a main image in this manner is effective also to the data output examples of a file of the cmov file format described hereinabove.

C. Tag Information Display Control Apparatus and Information Processing Apparatus (Display Apparatus)

Here, processing action when image data with tag information is reproduced, that is, processing action executed by an information processing apparatus on the viewer side, is described.

It is to be noted that the information processing apparatus may be a tag information display control apparatus or an apparatus of any commodity form only if it can implement equivalent functions to those of the tag information display control apparatus by software.

For example, the information processing apparatus may be a computer, a magnetic disk apparatus, an optical disk player, a set top box, a home server or any other large-capacity storage apparatus, a display apparatus, a game machine, a digital camera, a portable information terminal, a portable telephone set or the like.

Image data with tag information by the image processing apparatus can be reproduced by two reproduction modes.

One of the reproduction modes is reproduction of the accumulation type.

The reproduction of the accumulation type is reproduction which is started in a state wherein entire image data with tag information are stored on a recording medium For example, image data with tag information (cmov file) distributed in a form wherein they are recorded on an optical disk or some other large-capacity medium may be reproduced.

Alternatively, for example, image data with tag information (cmov file) downloaded through the Internet may be reproduced from a local medium.

Upon such reproduction, a main image and a key image are reproduced in synchronism with each other. However, the key image is not displayed on the display screen.

Alternatively, for example, a main image, a key image and index information with link information received in a broadcasting form or a streaming form may be reproduced from a recording medium on which image data with tag information (cmov file) reconstructed from the main image, key image and index information with link information are recoded. It is to be noted that the recording medium may be a portable recording medium or a local medium incorporated in the reproduction apparatus.

Meanwhile, the other reproduction mode is reproduction of the streaming type.

The reproduction of the streaming type is reproduction of a streaming file in the downloaded order.

It is to be noted that, in the reproduction of the streaming type, index information with link information is downloaded first and stored into a main memory. Thereafter, a main image and a key image are downloaded in a reproduction order and stored into the memory, and then the main image and the key image are reproduced in synchronism with each other.

Also in this instance, the key image is not reproduced.

C-1. Image Reproduction System

In the following, an image reproduction system which is used commonly for both of reproduction of the storage type and reproduction of the streaming type is described.

a. Functional Configuration

Figure 32:
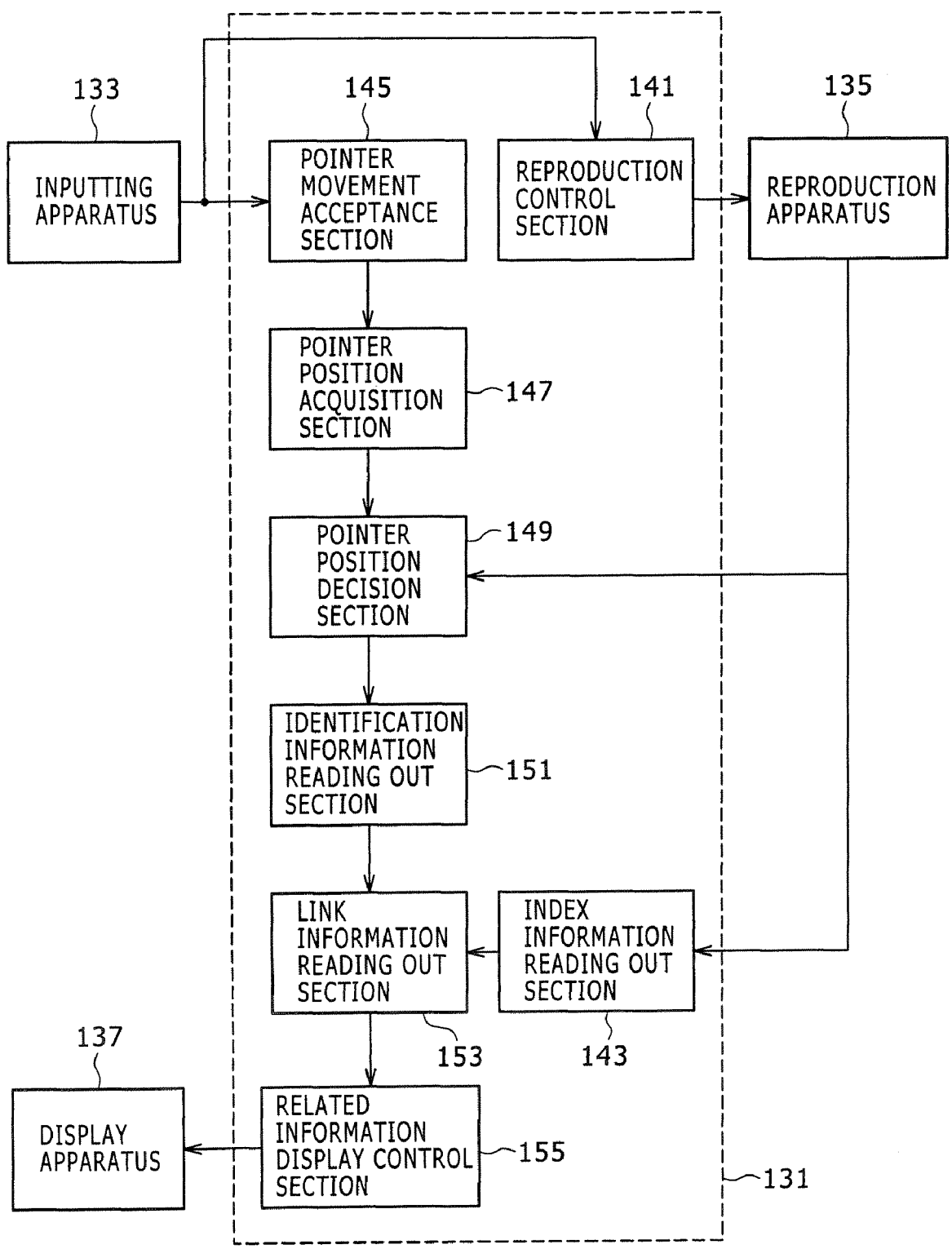
FIG. 32 is a block diagram showing an example of an image reproduction system.

FIG. 32 shows an example of a configuration of the image reproduction system.

Referring to FIG. 32, the image reproduction system shown includes a tag information display control apparatus 131, an inputting apparatus 133, a reproduction apparatus 135, and a display apparatus 137.

First, the components of the image reproduction system other than the tag information display control apparatus 131 are described.

The inputting apparatus 133 is used to input an operation instruction from a viewer who enjoys image data with tag information.

The reproduction apparatus 135 is used to reproduce image data with tag information from a recording region. A reproduction mechanism suitable for the recording medium is used as the reproduction apparatus 135. It is to be noted that a large-capacity recording medium is used for reproduction of the accumulation type while a main memory (semiconductor storage device) is used for reproduction of the streaming type.

The display apparatus 137 displays a main image. Various display devices can be used for the display apparatus 137. For example, a CRT display unit, a flat display unit, or a projection type display apparatus (for example, a liquid crystal panel, or a DMD (registered trademark) device) is used for the display apparatus 137.

The tag information display control apparatus 131 is a control unit which controls the peripheral apparatus described above to control display of a main image and display of related information in a designated region. The tag information display control apparatus 131 can be implemented by any of software and hardware.

Here, a functional configuration of the tag information display control apparatus 131 is described.

The tag information display control apparatus 131 includes a reproduction control section 141, an index information reading out section 143, a pointer movement acceptance section 145, a pointer position acquisition section 147, and a pointer position decision section 149. The tag information display control apparatus 131 further includes an identification information reading out section 151, a link information reading out section 153 and a related information display control section 155.

The reproduction control section 141 is a control apparatus which causes, when a reproduction instruction of a main image is accepted, a key image having time information (for example, a time code) same as that of the main image to be reproduced synchronously. In other words, the reproduction control section 141 controls synchronous reproduction of a main image and a key image.

The index information reading out section 143 is a signal processing apparatus which reads out index information with link information associated with a main image and a key image.

The pointer movement acceptance section 145 is a signal processing apparatus which accepts movement of a pointer within the screen by a viewer of the main image through the inputting apparatus 133.

The pointer position acquisition section 147 is a signal processing apparatus which acquires the position of the pointer in the screen.

The pointer position decision section 149 is a signal processing apparatus which refers to a key image reproduced synchronously with a main image to decide whether or not the pointer position is within the key region. In other words, the pointer position decision section 149 performs a matching decision between a key position having the same temporal position as that of the main image being currently displayed and the pointer.

The identification information reading out section 151 is a signal processing apparatus which reads out region identification information set to a key region when the pointer position is within the key region. For example, where the pointer belongs to a key region corresponding to a shoe, the gray scale value of the key region is read out.

The link information reading out section 153 is a signal processing apparatus which refers to index information with link information based on time information of a key image referred to and region identification information read out to read out link information corresponding to the region identification information.

The related information display control section 155 is a signal processing apparatus which acquires related information from a link destination specified with read out link information and displays the acquired related information.

For example, where the link information is given as a URL, the related information display control section 155 acquires necessary related information from a web site accessed through a communication function not shown and provides the acquired related information to the display apparatus 137.

On the other hand, for example, where the link information is identification information of related information received or stored together with a main image, the related information display control section 155 acquires necessary related information through the reproduction apparatus 135 and provides the acquired related information to the display apparatus 137.

b. Particular Examples

Figure 33:
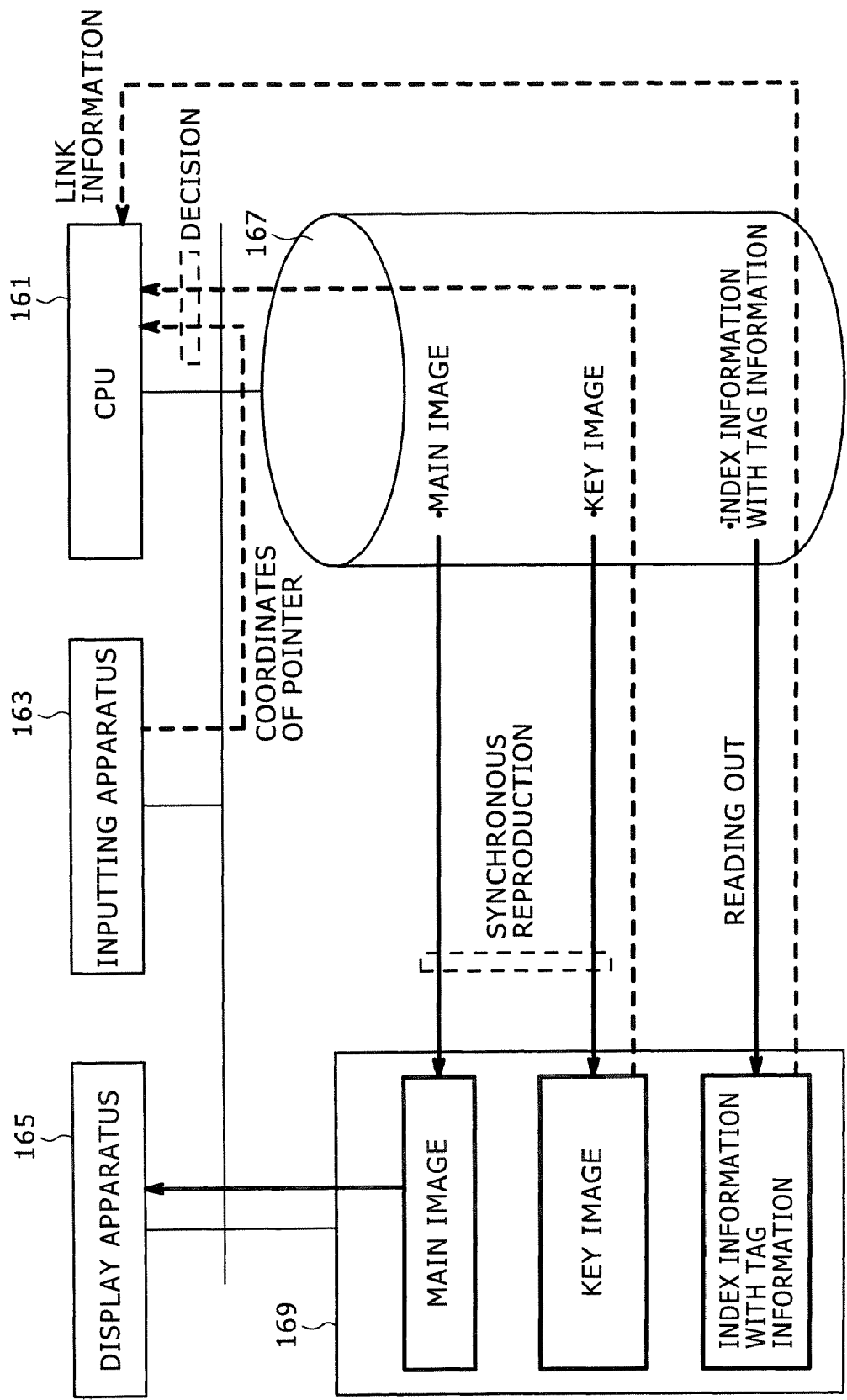
FIG. 33 is a block diagram showing an example of a configuration where the image reproduction system is implemented using a computer.

FIG. 33 shows an example of a configuration where the image reproduction system is implemented from a computer.

Referring to FIG. 33, the image reproduction system shown includes a CPU (processor) 161, an inputting apparatus 163, a display apparatus 165, a hard disk drive apparatus 167 and a main memory 169.

In particular, the processing functions of the tag information display control apparatus 131 shown in FIG. 33 are implemented through a program executed by the CPU 161.

For example, a decision process of deciding whether or not the coordinate position of the pointer designated by the viewer is included in a key region and a reading out process of reading out link information based on region identification information applied to the key region at which the pointer is positioned are executed by the CPU 161.

It is to be noted that the image reproduction system shown in FIG. 33 is configured so as to perform reproduction of the accumulation type. In other words, the image reproduction system is shown configured such that a main image, a key image and index information with tag information are read out from the hard disk drive apparatus 167 to the main memory 169.

Accordingly, where the image reproduction system is configured otherwise so as to perform reproduction of the streaming type, processing advances in a state wherein a main image, a key image and index information with tag information are stored directly in the main memory 169.

C-2. Relationship Between an Operation of a Viewer and an Internal Process

Figure 34:
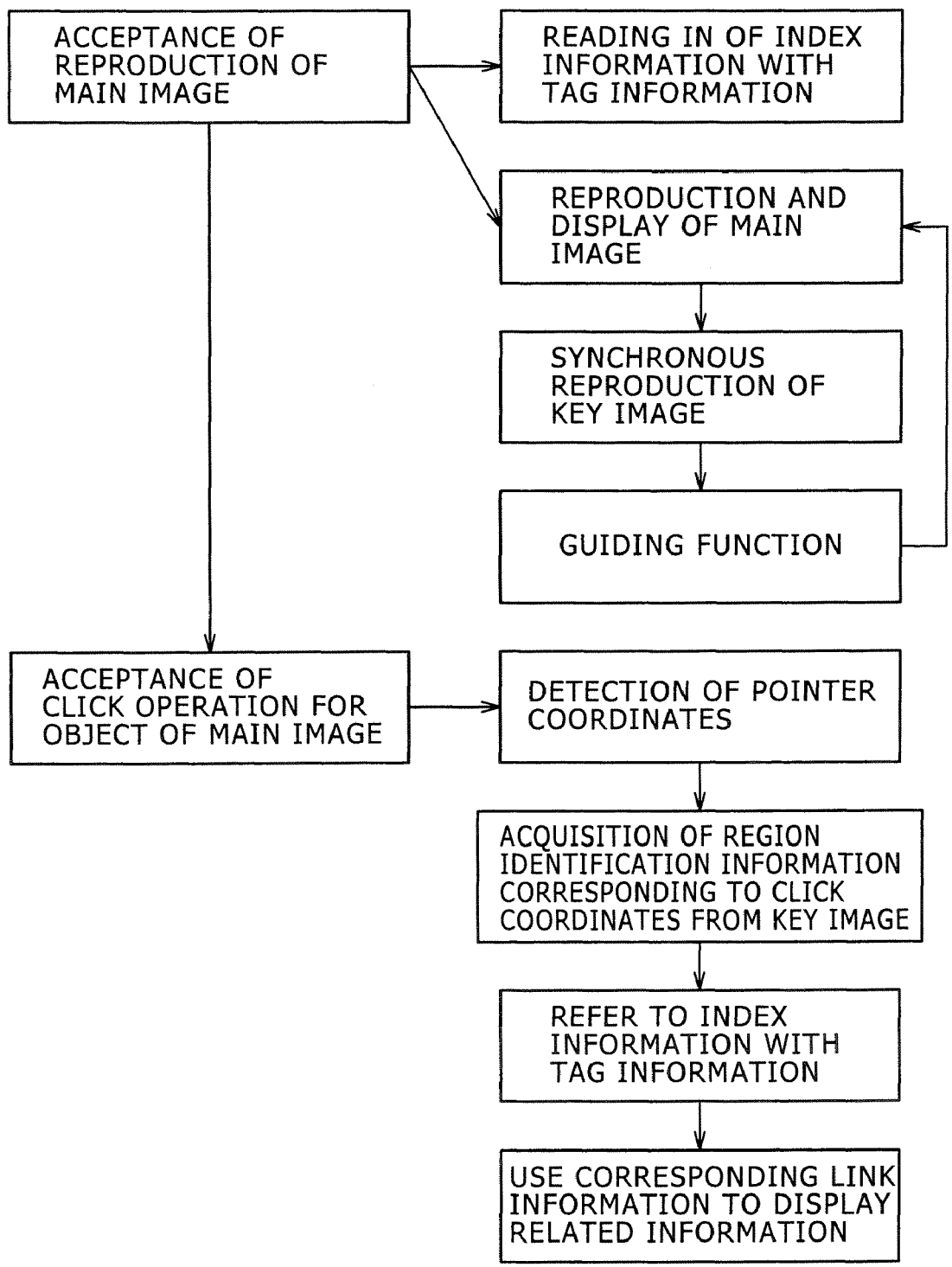
FIG. 34 is a flow diagram illustrating a corresponding relationship between operations of a viewer and internal processes executed in response to the operations.

FIG. 34 illustrates a corresponding relationship between an operation of a viewer and internal processes executed in response to the operation. It is to be noted that an operation of the viewer is inputted through the inputting apparatus 163 (133).

When an operation for reproduction of a main image is accepted, the CPU 161 issues an instruction to read in index information with link information and reproduce (display) a main image. Thereupon, the CPU 161 issues also an instruction to perform synchronous reproduction of a key image. Further, the CPU 161 starts up a guiding function hereinafter described. The guiding function is a function of notifying the viewer of the presence of an embedded key region and assisting an appropriate operation for the key region.

On the other hand, when the CPU 161 accepts a clicking operation of a tagged object (subject image), it detects the click coordinates (acquires the pointer position) and acquires region identification information corresponding to the click coordinates from a key image to which the same time is applied. For example, the CPU 161 acquires a gray scale value.

Thereafter, the CPU 161 refers to index information with tag information coordinated with the same time or a time interval including the time using the region identification information to acquire related information from corresponding link information. The acquired related information is displayed on the screen of the display apparatus 165. The display may be a superimposed display on the main image or may be a child screen display.

Figure 35:
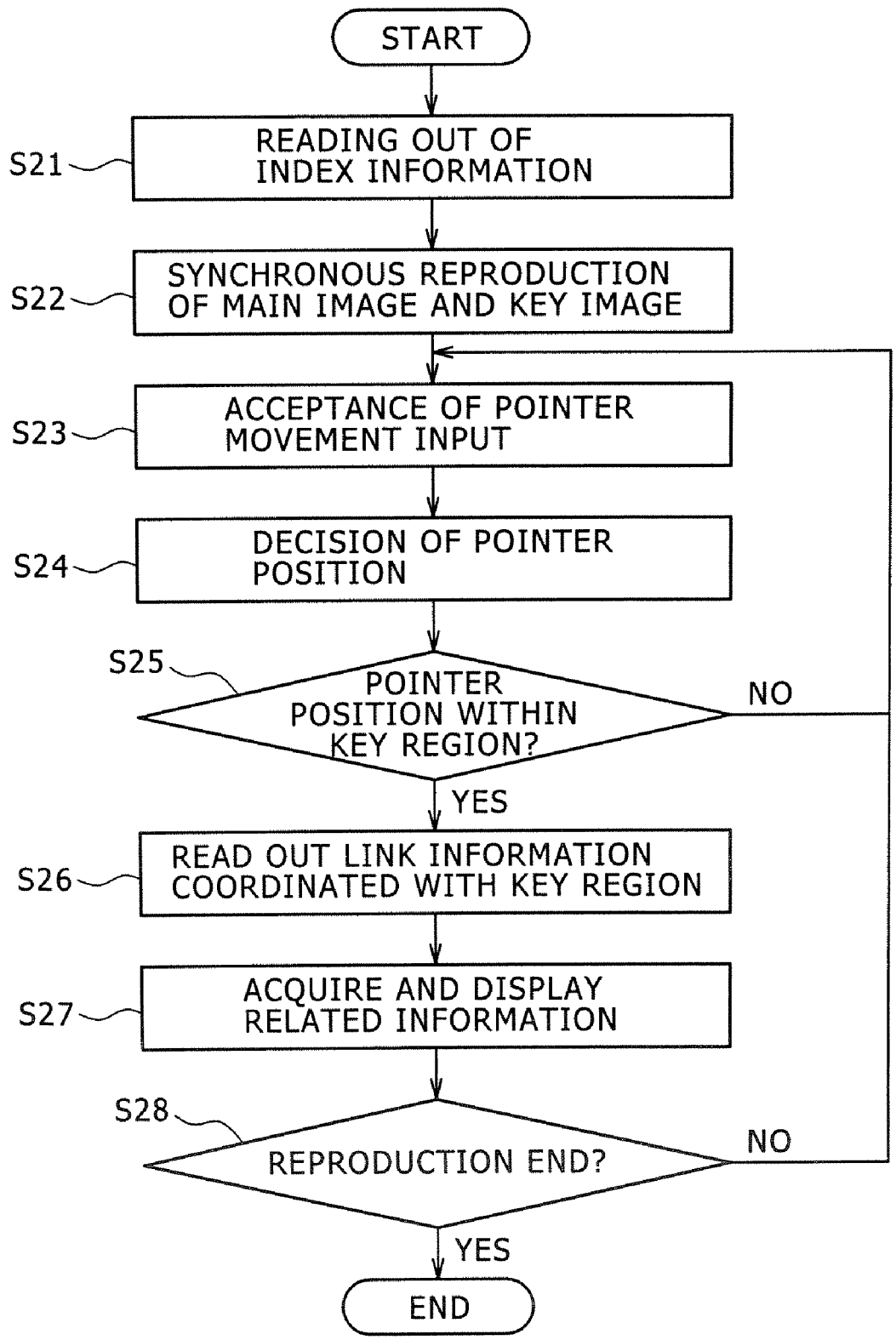
FIG. 35 is a flow chart illustrating an outline of the subject of processing of a program corresponding to a tag information display control function.

FIG. 35 illustrates the substance of processes of a program corresponding to the tag information display control function described above.

Referring to FIG. 35, the program is started with a reading out process of index information with tag information (S21). Then, the program controls synchronous reproduction of a main image and a key image (S22).

Thereafter, the program accepts an input of pointer movement displayed on the screen of the display apparatus 165 and decides the pointer position (S23, S24).

Figure 36A:
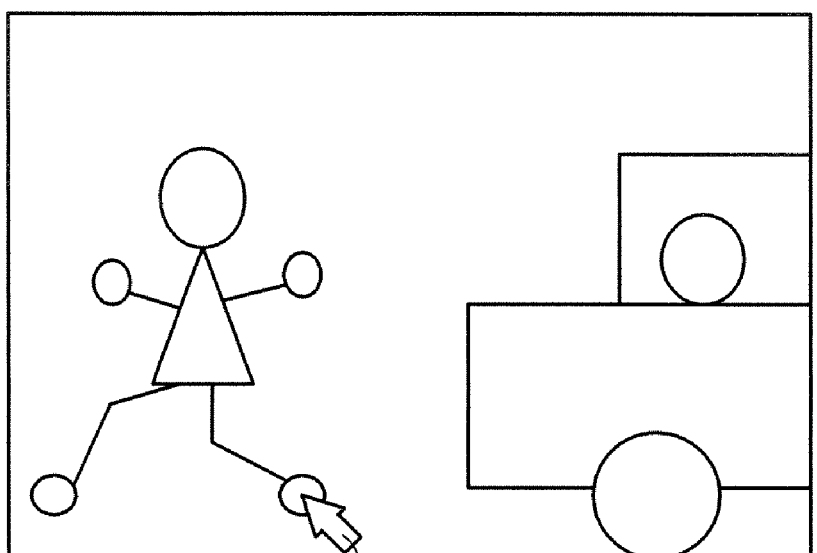
FIGS. 36A and 36B are schematic views illustrating a corresponding relationship of a display of a pointer to a main image and a corresponding key image at a certain point of time.

FIG. 36A shows an example of display of a pointer 171. FIG. 36A, the pointer 171 is positioned at a position of a shoe of a subject image.

Figure 36B:
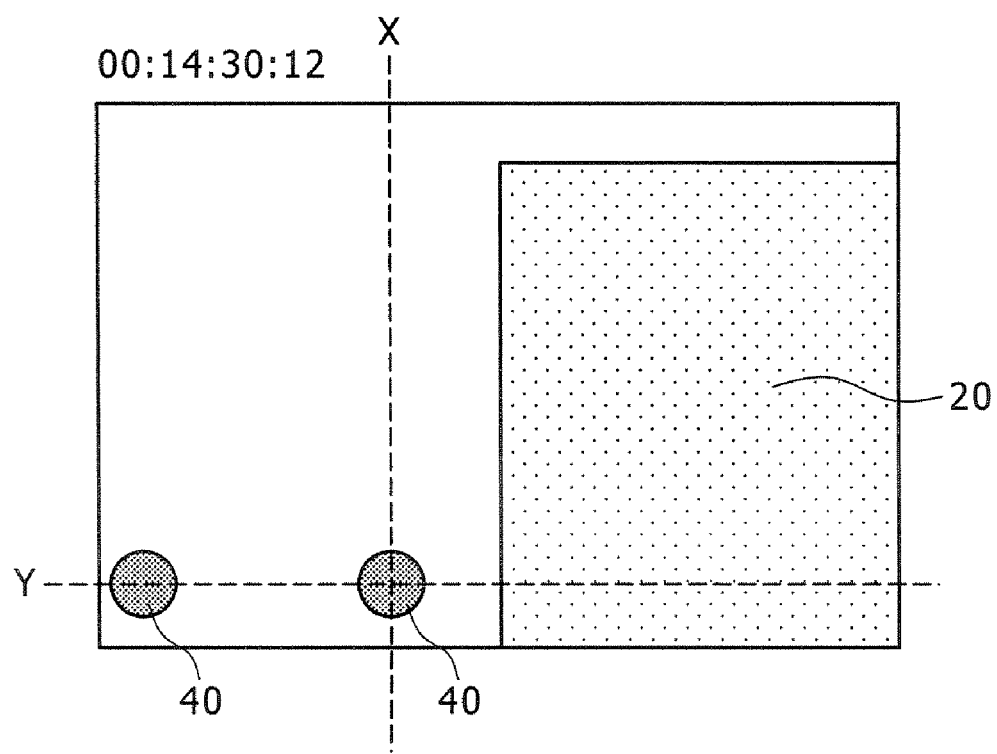

Then, the program decides whether or not the pointer position is within a key region (S25). In the decision process, the program refers to a key image at time same as that of the main image. FIG. 36B illustrates a key image paired with the main image. Again, the key image is for internal processing and is not actually displayed to the viewer.

FIGS. 36A and 36B show examples of an image set for the "00 hour: 14 minute: 30 second: 12 frame". In the examples, a key region (gray scale value=20) of a square shape is set at a position corresponding to a vehicle, and another key region (gray scale value=40) of a circular shape is set at a position corresponding to each of the shoes.

The decision process is executed depending upon whether or not the coordinates (X, Y) of the pointer are positioned in a key region.

If it is decided in the decision process that the pointer position is not within any key region (if a negative result is obtained), then the program returns to a state wherein movement of the pointer is accepted. This is because the pointer designates a region in which no tag information is embedded.

On the other hand, if it is decided in the decision process that the pointer position is in a key region (if an affirmative result is obtained), then the program accesses index information with link information based on the region identification information of the key region to read out link information coordinated with the corresponding region identification information with regard to the same time as that upon the operation (S26).

Thereafter, the program acquires related information given by the link information and controls the display apparatus 165 to display the related information on the screen (S27).

Figure 37:
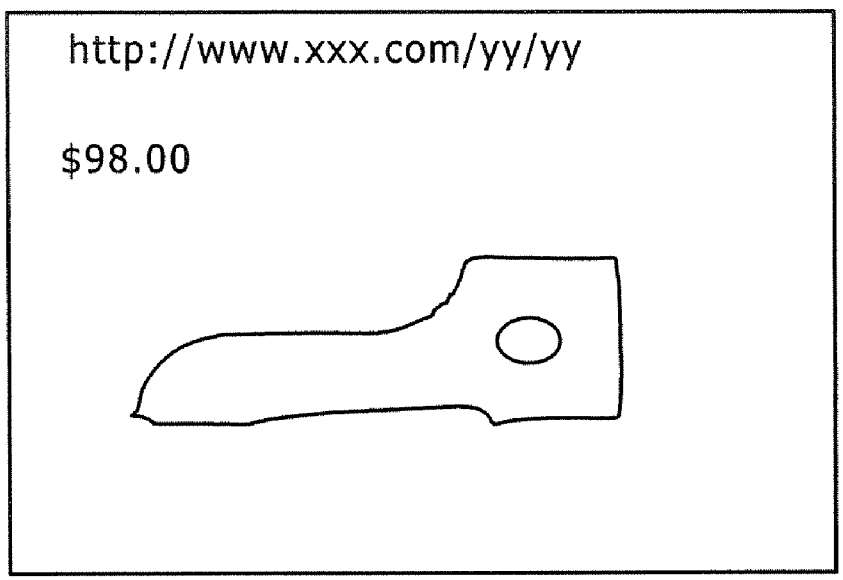
FIG. 37 is a schematic view showing an example of a display of related information.

FIG. 37 shows an example of the display of related information. In FIG. 37, a URL address (http://www.xxxx.com/yy/yy) representative of a source of the related information is displayed at an upper portion of the screen.

Meanwhile, at a central portion of the screen, the shoe designated with the pointer is displayed in a large screen size. Simultaneously, a price (in the example shown, "$98") is displayed at a left upper portion of the screen.

Naturally, the display window of the related information can be closed by an operation of the viewer.

Thereafter, the program decides whether or not reproduction of a main image comes to an end (S28). If reproduction continues (if a negative result is obtained), then the program returns to the input accepting state of a pointer position in preparation for designation of a further key region.

On the other hand, if an end of reproduction is confirmed (if an affirmative result is obtained), then the program ends the display control function of tag information.

Such a processing program as described above is executed by the CPU 161 to execute a tag information display process.

C-3. Guiding Function

As described above, by reproducing image data with tag information, related information embedded at a pointer position can be confirmed on the screen as a result of a subjective operation of the viewer.

Here, a display function suitable to assist the viewer to designate a key region is described.

a. Guiding Function 1

While a key image is originally prepared only for a decision process, it can be utilized also to assist the viewer in a screen operation.

For example, a function (key region display control section) of displaying, when a key region is included in a key image reproduced synchronously with a main image, a partial region of the main image corresponding to the key region in such a display mode that the viewer can recognize the partial region can be incorporated as a function of the tag information display control apparatus 131.

Figure 38:
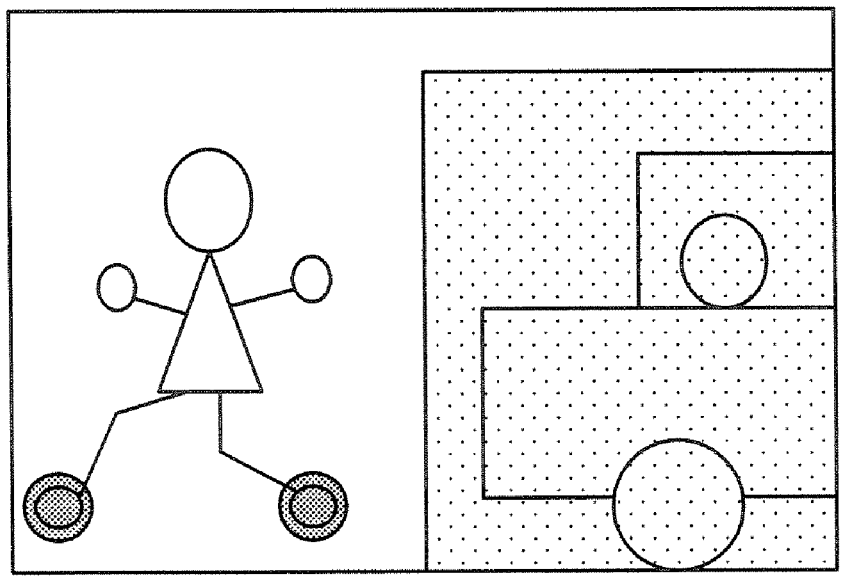
FIGS. 38 to 41B are schematic views showing different display examples by a guiding function.

FIG. 38 shows a display example where this display function is adopted. In FIG. 38, a main image and a key image are displayed in an integrated state.

In this instance, the partial region of the main image in which tag information is embedded may be displayed with the luminance thereof changed. Where a luminance different from the original luminance of the main image is provided to the key image, the partial region in which tag information is embedded can be discriminated readily.

It is to be noted that the luminance change may be provided in response to region identification information (gray scale value or hue value) provided to each key region which forms a key image.

Alternatively, the same luminance change may be provided to all of the key regions without depending upon the difference in region identification information provided to the key regions. This is because what is necessary to the viewer is to identify a partial region in which tag information is embedded but not to identify the difference between regions.

Incidentally, the luminance change may be performed not only by raising the luminance with respect to the original luminance level but also by lowering the luminance or by periodically turning on and off the luminance. Here, the luminance change may be provided by a level of several percent of the luminance of the main image.

It is to be noted that the method of uniformly changing the luminance in a partial region in which tag information is embedded deteriorates the picture quality of the main image and makes an obstruction to the enjoyment.

Accordingly, the display mode which relies upon the luminance change is preferably executed only when the display mode in which the luminance of a partial region is changed is selected by the viewer. Naturally, the luminance of a region in which tag information is embedded may alternatively be changed normally.

Meanwhile, as a technique of changing the display mode of a partial region in which tag information is embedded to notify the viewer, also a method may be available wherein the hue of a partial region to be used for display is changed.

For example, the change of the hue may be provided in response to region identification information (hue value or gray scale value) provided to each key region which forms the key image.

Alternatively, the same hue change may be provided to all key regions without depending upon the difference of the region identification information provided to the key regions. For example, a red color may be provided or a framework of red may be displayed for all of entire partial regions in which tag information is embedded. Naturally, an arbitrary color may be used for the display.

Also the display mode which relies upon the change in hue is preferably executed only when the display mode in which the luminance of a partial region is changed is selected by the viewer. Naturally, the luminance of a region in which tag information is embedded may alternatively be changed normally.

b. Guiding Function 2

The guiding function 1 described above changes the display mode of a partial region in which tag information is embedded without depending upon the position of the pointer. However, they may possibly disturb enjoyment of a main image.

Therefore, a function (tag region position notification section) of displaying, where it is decided that the pointer position is within a range of a key region or approaches a key region, a partial region of a main image in which tag information is embedded in such a display mode that the viewer can recognize the partial region may be incorporated as a function of the tag information display control apparatus 131.

Figure 39A:
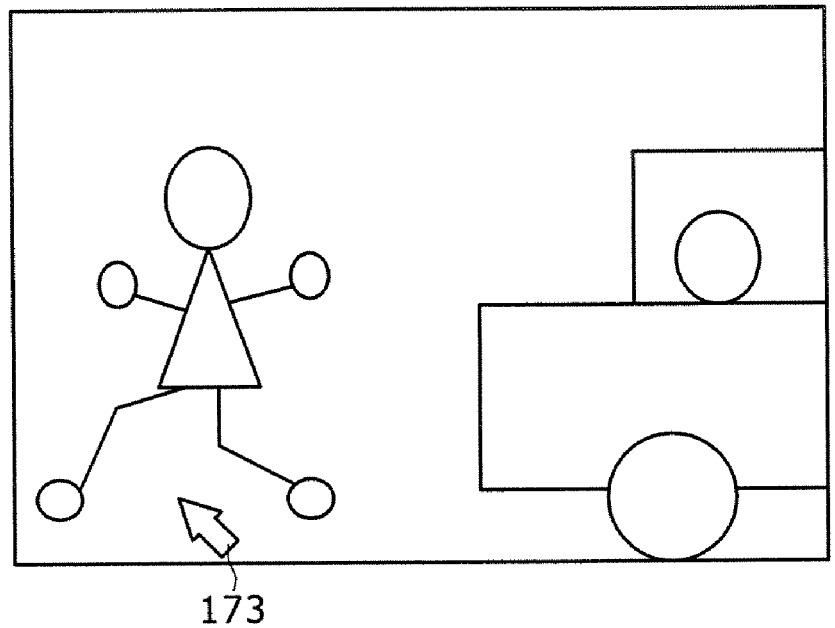
Figure 39B:
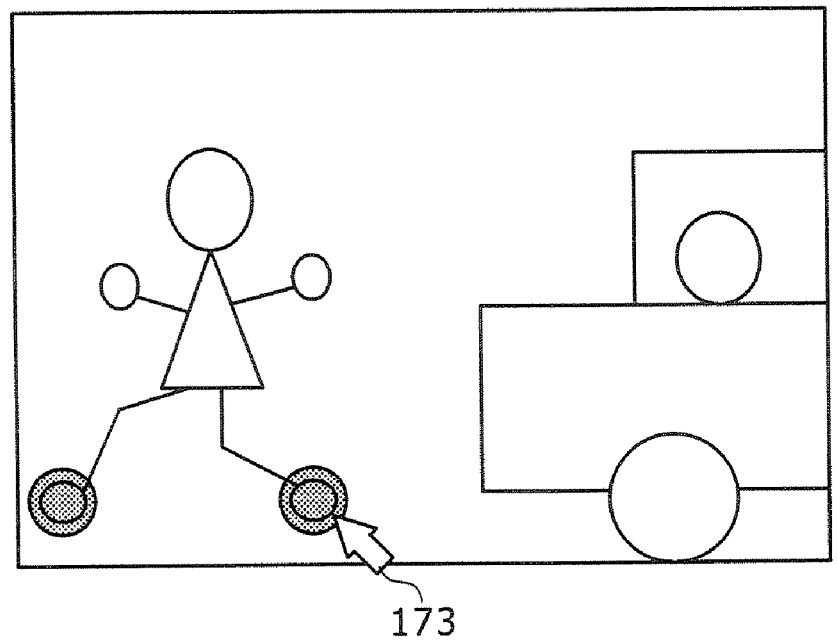

FIGS. 39A and 39B show display examples where this display function is adopted. Also in the case of FIGS. 39A and 39B, tag information is embedded in shoes of a subject image similarly as in the other examples described hereinabove.

In particular, FIG. 39A shows a display example wherein a pointer 173 is not positioned in any key region set on a key screen. At this time, no change is found on the display screen.

Accordingly, the viewer can determine that no tag information is embedded at the current pointer position. Further, no obstacle is made to enjoyment of the main image.

FIG. 39B shows a display example wherein the pointer 173 is positioned in a key region set on a key image. In this instance, the display mode of the key region corresponding to the shoe changes. For example, the luminance changes or the hue changes similarly as in the case of the guiding function 1.

Depending upon the change, the viewer can visually confirm that tag information is embedded at the current pointer position.

It is to be noted that, in the present display example, the change of the display mode of the main image is performed only in the key regions corresponding to the shoes, but does not occur in the key region corresponding to the vehicle.

Therefore, deterioration of the picture quality of the main image when tag information is displayed can be minimized. The present display example is effective particularly where tag information is embedded in a large number of regions.

c. Guiding Function 3

In the two guiding functions described above, the display mode of a main image is changed. However, this may possibly deteriorate the enjoyment of the main image by the viewer.

Therefore, a technique of incorporating a function (pointer shape changing section) of changing the display mode of the pointer to be positioned in a partial region of a main image in which tag information is embedded when it is decided that the pointer position is within a range of a key region as a function of the tag information display control apparatus 131 is described.

FIGS. 40A, 40B and 41A, 41B show different display examples where the display function just described is adopted.

Figure 40A:
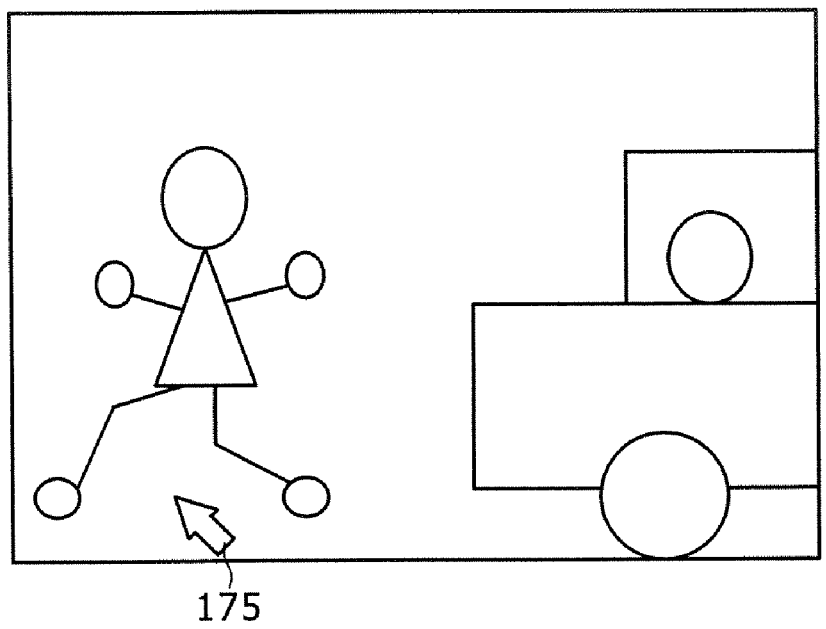
Figure 41A:
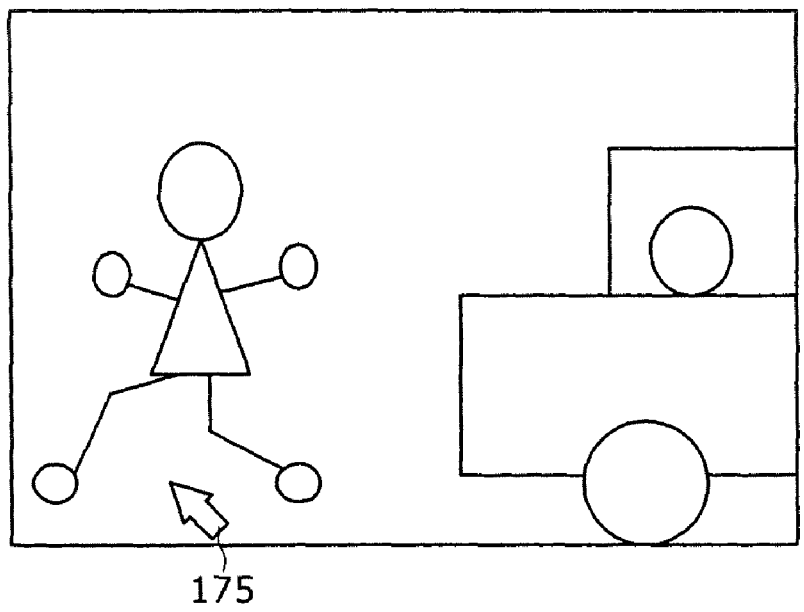

In particular, FIGS. 40A and 41A shows display examples where a pointer 175 is not positioned in any key region set on a key screen. In this instance, the pointer 175 is displayed in a basic size and a basic shape.

Figure 40B:
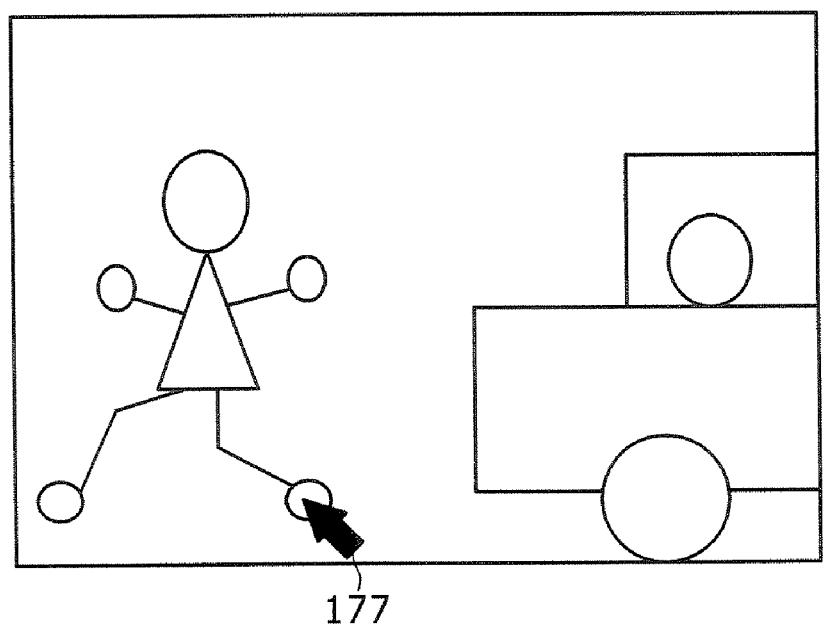
Figure 41B:
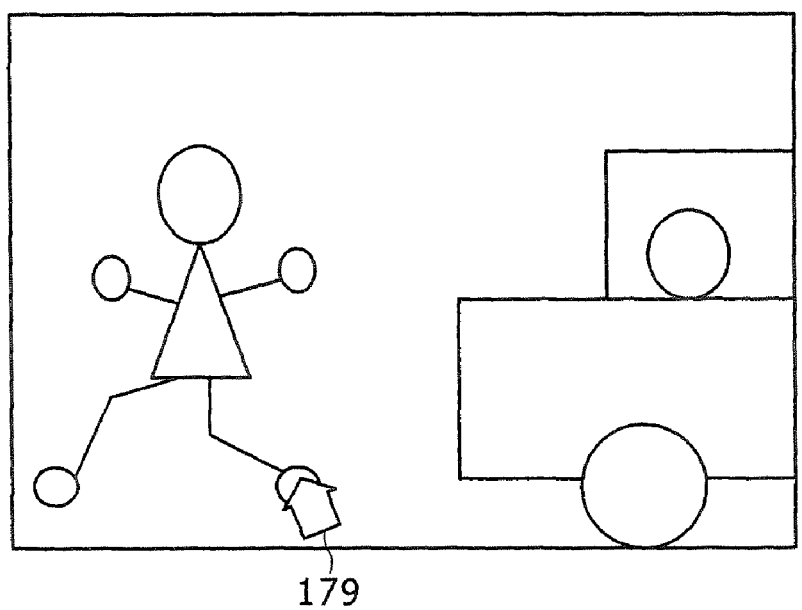

FIGS. 40B and 41B show display examples where the pointer 175 is positioned in a key region set on a key screen.

In FIG. 40B, a pointer 177 is displayed in an equal size but in a different display mode such as a luminance or a hue.

In FIG. 41B, a pointer 179 is displayed in the same luminance and the same hue but in a changed display mode.

In this display function, since only the display mode of the pointer is changed, there is no influence on the picture quality of the main image.

Further, since only the display mode of the pointer is changed, also the amount of arithmetic operation is small. Furthermore, since the display mode of the pointer which attracts attention of the viewer is changed, the viewer can confirm the key region readily.

D. Other Embodiments a. Programs corresponding to the functions described hereinabove may be distributed through a network or stored in or on and distributed together with a storage medium. The storage medium for distribution may be a magnetic storage medium, an optical recording medium, a semiconductor storage medium or any other storage medium.

b. Various modifications can be made to the embodiment described hereinabove within the spirit and scope of the present invention. Also various alterations and applications can be made by creation or combination based on the disclosure of the present invention.

What is claimed is:

1. A production apparatus for index information with link information, comprising:

a key information unit which determines an initial key region in a first frame of a plurality of frames, which is a partial image of an entire image in the first frame, based on an input from an operator and applies region identification information to the initial key region in the first frame, wherein the region identification information corresponds to at least one pixel value of the initial key region in the first frame and the plurality of frames are each associated with a respective time code, and determines a final key region in a final frame of the plurality of frames, which is a partial image of an entire image in the final frame based on an input from the operator, the time code associated with the final frame being subsequent to the time code associated with the first frame;

a follow-up unit which automatically determines whether a key region in a second frame of the plurality of frames includes at least one pixel value similar to the initial key region in the first frame, determines a position of the key region in the second frame based on an initial position of the initial key region in the first frame and a final position of the final key region in the final frame, and applies region identification information to the key region in the second frame when the key region in the second frame is determined to include the at least one pixel value similar to the initial key region in the first frame, wherein the time code associated with the second frame is subsequent to the time code associated with the first frame and prior to the time code associated with the final frame;

a database which stores a corresponding relationship between region identification information applied to at least one of the key regions of the plurality of frames received from the key information unit or the follow-up unit and link information which provides access to information related to the at least one of the key regions; and an information embedding section configured to refer to said database to embed the link information corresponding to the at least one of the key regions into index information which associates the region identification information applied to the at least one of the key regions and time information.

2. The production apparatus for index information with link information according to claim 1, wherein said database records the index information.

3. A production apparatus for index information with link information, comprising:

a key information unit which determines an initial key region in a first frame of a plurality of frames, which is a partial image of an entire image in the first frame, based on an input from an operator, applies region identification information to the initial key region in the first frame, wherein the region identification information corresponds to at least one pixel value of the initial key region in the first frame, applies object identification information to the key region in the first frame, and determines a final key region in a final frame of the plurality of frames, which is a partial image of an entire image in the final frame based on an input from the operator, wherein the plurality of frames are each associated with a respective time code and the time code associated with the final frame is subsequent to the time code associated with the first frame;

a follow-up unit which automatically determines whether a key region in a second frame of the plurality of frames includes at least one pixel value similar to the key region in the first frame, determines a position of the key region in the second frame based on an initial position of the initial key region in the first frame and a final position of the final key region in the final frame, and applies region identification information to the key region in the second frame when the key region in the second frame is determined to include the at least one pixel value similar to the initial key region in the first frame, wherein the time code associated with the second frame is subsequent to the time code associated with the first frame and prior to the time code associated with the final frame;

a database which stores a corresponding relationship between region identification information received from the key information unit or the follow-up unit, object identification information applied to at least one of the key regions of the plurality of frames, and link information which provides access to information related to the at least one of the key regions; and an information embedding section configured to refer to said database to embed the link information corresponding to the at least one of the key regions into index information which associates the region identification information applied to the at least one of the key regions, the object identification information applied to the at least one of the key regions, and time information.

4. The production apparatus for index information with link information according to claim 3, wherein said database records the index information.

5. A production apparatus for image data with tag information, comprising:

a key information unit which determines an initial key region in a first frame of a plurality of frames, which is a partial image of an entire image in the first frame, based on an input from an operator and applies region identification information to the initial key region in the first frame, wherein the region identification information corresponds to at least one pixel value of the initial key region in the first frame and the plurality of frames are each associated with a respective time code, and determines a final key region in a final frame of the plurality of frames, which is a partial image of an entire image in the final frame based on an input from the operator, the time code associated with the final frame being subsequent to the time code associated with the first frame;

a follow-up unit which automatically determines whether a key region in a second frame of the plurality of frames includes at least one pixel value similar to the key region in the first frame, determines a position of the key region in the second frame based on an initial position of the initial key region in the first frame and a final position of the final key region in the final frame, and applies region identification information to the key region in the second frame when the key region in the second frame is determined to include the at least one pixel value similar to the initial key region in the first frame, wherein the time code associated with the second frame is subsequent to the time code associated with the first frame and prior to the time code associated with the final frame;

a database which stores a corresponding relationship between region identification information applied to at least one of the key regions of the plurality of frames received from the key information unit or the follow-up unit and link information which provides access to information related to the at least one of the key regions;

an information embedding section configured to refer to said database to embed the link information corresponding to the at least one of the key regions into index information which associates the region identification information applied to the at least one of the key regions and time information; and a data outputting section configured to output the index information with link information in which the link information is embedded, the plurality of frames, and a key image to which the region identification information which specifies the key region in combination with the time information is applied in a mutually associated relationship.

6. The production apparatus for image data with tag information according to claim 5, wherein the outputting destination of said data outputting section is a transmission line.

7. The production apparatus for image data with tag information according to claim 5, wherein said data outputting section outputs the index information with link information, the plurality of frames, and the key image in a broadcasting form.

8. The production apparatus for image data with tag information according to claim 5, wherein said data outputting section outputs the index information with link information, the plurality of frames, and the key image in a distribution form.

9. The production apparatus for image data with tag information according to claim 5, wherein the outputting destination of said data outputting section is a recording medium.

10. The production apparatus for image data with tag information according to claim 5, wherein the plurality of frames is a live image.

11. The production apparatus for image data with tag information according to claim 5, wherein said data outputting section outputs the index information with link information, the plurality of frames, and the key image collectively as a file.

12. The production apparatus for image data with tag information according to claim 5, wherein said data outputting section applies the index information with link information to two compression coded data obtained by compression coding the plurality of frames and the key image to produce a file.

13. The production apparatus for image data with tag information according to claim 5, wherein said data outputting section applies the index information with link information to single compression coded data obtained by compression coding image data wherein three of four data channels are allocated to the plurality of frames and the remaining one data channel is allocated to the key image to produce a file.

14. The production apparatus for image data with tag information according to claim 5, wherein said data outputting section applies the index information with link information to compression coded data obtained by compression coding image data wherein three of four data channels are allocated to the plurality of frames and the remaining one data channel is allocated to the key image in which the index information with link information is embedded as incidental information to produce a file.

15. The production apparatus for image data with tag information according to claim 5, wherein said data outputting section outputs the plurality of frames to a main channel and simultaneously outputs the key image to a sub channel while the index information with link information image is placed in a meta data area of the plurality of frames or the key image.

16. The production apparatus for image data with tag information according to claim 5, wherein said data outputting section outputs the plurality of frames to a main channel while the key image and the index information with link information are placed in a meta data area of the plurality of frames.

17. The production apparatus for image data with tag information according to claim 5, wherein said data outputting section outputs a body of related information which makes a destination of linking of the link information embedded in the index information with link information in an associated relationship with the index information with link information, the plurality of frames, and the key image.

18. A production apparatus for image data with tag information, comprising:
a key information unit which determines an initial key region in a first frame of a plurality of frames, which is a partial image of an entire image in the first frame, based on an input from an operator, applies region identification information to the initial key region in the first frame, wherein the region identification information corresponds to at least one pixel value of the initial key region in the first frame, applies object identification information to the initial key region in the first frame, and determines a final key region in a final frame of the plurality of frames, which is a partial image of an entire image in the final frame based on an input from the operator,
wherein the plurality of frames are each associated with a respective time code and the time code associated with the final frame is subsequent to the time code associated with the first frame;
a follow-up unit which automatically determines whether a key region in a second frame of the plurality of frames includes at least one pixel value similar to the key region in the first frame, determines a position of the key region in the second frame based on an initial position of the initial key region in the first frame and a final position of the final key region in the final frame, and applies region identification information to the key region in the second frame when the key region in the second frame is determined to include the at least one pixel value similar to the initial key region in the first frame, wherein the time code associated with the second frame is subsequent to the time code associated with the first frame and prior to the time code associated with the final frame;
a database which stores a corresponding relationship between region identification information received from the key information unit or the follow-up unit, object identification information applied to at least one of the key regions of the plurality of frames, and link information which provides access to information related to the at least one of the key regions;
an information embedding section configured to refer to said database to embed the link information corresponding to the at least one of the key regions into index information which associates the region identification information applied to the at least one of the key regions, the object identification information applied to the at least one of the key regions, and time information; and
a data outputting section configured to output the index information with link information in which the link information is embedded, the plurality of frames, and a key image to which the region identification information which specifies the key region in combination with the time information is applied in a mutually associated relationship.

19. The production apparatus for image data with tag information according to claim 18, wherein the outputting destination of said data outputting section is a transmission line.

20. The production apparatus for image data with tag information according to claim 18, wherein said data outputting section outputs the index information with link information, the plurality of frames, and the key image in a broadcasting form.

21. The production apparatus for image data with tag information according to claim 18, wherein said data outputting section outputs the index information with link information, the plurality of frames, and the key image in a distribution form.

22. The production apparatus for image data with tag information according to claim 18, wherein the outputting destination of said data outputting section is a recording medium.

23. The production apparatus for image data with tag information according to claim 18, wherein the plurality of frames is a live image.

24. The production apparatus for image data with tag information according to claim 18, wherein said data outputting section outputs the index information with link information, the plurality of frames, and the key image collectively as a file.

25. The production apparatus for image data with tag information according to claim 18, wherein said data outputting section applies the index information with link information to two compression coded data obtained by compression coding the plurality of frames and the key image to produce a file.

26. The production apparatus for image data with tag information according to claim 18, wherein said data outputting section applies the index information with link information to single compression coded data obtained by compression coding image data wherein three of four data channels are allocated to the plurality of frames and the remaining one data channel is allocated to the key image to produce a file.

27. The production apparatus for image data with tag information according to claim 18, wherein said data outputting section applies the index information with link information to compression coded data obtained by compression coding image data wherein three of four data channels are allocated to the plurality of frames and the remaining one data channel is allocated to the key image in which the index information with link information is embedded as incidental information to produce a file.

28. The production apparatus for image data with tag information according to claim 18, wherein said data outputting section outputs the plurality of frames to a main channel and simultaneously outputs the key image to a sub channel while the index information with link information image is placed in a meta data area of the plurality of frames or the key image.

29. The production apparatus for image data with tag information according to claim 18, wherein said data outputting section outputs the plurality of frames to a main channel while the key image and the index information with link information are placed in a meta data area of the plurality of frames.

30. The production apparatus for image data with tag information according to claim 18, wherein said data outputting section outputs a body of related information which makes a destination of linking of the link information embedded in the index information with link information in an associated relationship with the index information with link information, the plurality of frames, and the key image.

31. A production method, implemented on a production apparatus, for index information with link information, comprising:
    determining, at a key information unit of the production apparatus, an initial key region in a first frame of a plurality of frames, which is a partial image of an entire image in the frame, based on an input from an operator, determining a final key region in a final frame of the plurality of frames, which is a partial image of an entire image in the final frame based on an input from the operator, and applying region identification information to the initial key region in the first frame, wherein the region identification information corresponds to at least one pixel value of the initial key region in the first frame the plurality of frames are each associated with a respective time code, and the time code associated with the final frame is subsequent to the time code associated with the first frame;
    determining automatically, at a follow-up unit, whether a key region in a second frame of the plurality of frames includes at least one pixel value similar to the key region in the first frame, determining a position of the key region in the second frame based on a position of the initial key region in the first frame and a position of the final key region in the final frame, and applying region identification information to the key region in the second frame when the key region in the second frame is determined to include the at least one pixel value similar to the key region in the first frame, wherein the time code associated with the second frame is subsequent to the time code associated with the first frame and prior to the time code associated with the final frame; and
    referring to a database which stores a corresponding relationship between region identification information applied to at least one of the key regions of the plurality of frames received from the key information unit or the follow-up unit and link information which provides access to information related to the at least one of the key regions to embed the link information corresponding to the at least one of the key regions into index information which associates the region identification information applied to the at least one of the key regions and time information.

32. A production method, implemented on a production apparatus, for index information with link information, comprising:
    determining, at a key information unit of the production apparatus, an initial key region in a first frame of a plurality of frames, which is a partial image of an entire image in the frame, based on an input from an operator, applying region identification information to the initial key region in the first frame, wherein the region identification information corresponds to at least one pixel value of the initial key region in the first frame, applying object identification information to the initial key region in the first frame, and determining a final key region in a final frame of the plurality of frames, which is a partial image of an entire image in the final frame based on an input from the operator,
    wherein the plurality of frames are each associated with a respective time code and the time code associated with the final frame is subsequent to the time code associated with the first frame;
    determining automatically, at a follow-up unit, whether a key region in a second frame of the plurality of frames includes at least one pixel value similar to the key region in the first frame, determining a position of the key region in the second frame based on an initial position of the initial key region in the first frame and a final position of the final key region in the final frame, and applying region identification information to the key region in the second frame when the key region in the second frame is determined to include the at least one pixel value similar to the key region in the first frame, wherein the time code associated with the second frame is subsequent to the time code associated with the first frame and prior to the time code associated with the final frame; and
    referring to a database which stores a corresponding relationship between region identification information received from the key information unit or the follow-up unit, object identification information applied to at least one of the key regions of the plurality of frames, and link information which provides access to information related to the at least one of the key regions and to embed the link information corresponding to the at least one of the key regions into index information which associates the region identification information applied to the at least one of the key regions, the object identification information applied to the at least one of the key regions, and time information.

33. A production method, implemented on a production apparatus, for image data with tag information, comprising:
    determining, at a key information unit of the production apparatus, an initial key region in a first frame of a plurality of frames, which is a partial image of an entire image in the frame, based on an input from an operator, applying region identification information to the initial key region in the first frame, and determining a final key region in a final frame of the plurality of frames, which is a partial image of an entire image in the final frame based on an input from the operator, wherein the region identification information corresponds to at least one pixel value of the initial key region in the first frame, the plurality of frames are each associated with a respective time code, and the time code associated with the final frame is subsequent to the time code associated with the first frame;
    determining automatically, at a follow-up unit, whether a key region in a second frame of the plurality of frames includes at least one pixel value similar to the initial key region in the first frame, determining a position of the key region in the second frame based on an initial position of the initial key region in the first frame and a final position of the final key region in the final frame, and applying region identification information to the key region in the second frame when the key region in the second frame is determined to include the at least one pixel value similar to the initial key region in the first frame, wherein the time code associated with the second frame is subsequent to the time code associated with the first frame and prior to the time code associated with the final frame;

referring to a database which stores a corresponding relationship between region identification information applied to at least one of the key regions of the plurality of frames received from the key information unit or the follow-up unit and link information which provides access to information related to the at least one of the key regions to embed the link information corresponding to the at least one of the key regions into index information which associates the region identification information applied to the at least one of the key regions and time information; and outputting, at an outputting section, the index information with link information in which the link information is embedded, the plurality of frames and a key image to which the region identification information which specifies the key region in combination with the time information is applied in a mutually associated relationship.

34. A production method, implemented on a production apparatus, for image data with tag information, comprising:

determining, at a key information unit of the production apparatus, an initial key region in a first frame of a plurality of frames, which is a partial image of an entire image in the frame, based on an input from an operator, applying region identification information to the initial key region in the first frame, wherein the region identification information corresponds to at least one pixel value of the initial key region in the first frame, applying object identification information to the initial key region in the first frame, and determining a final key region in a final frame of the plurality of frames, which is a partial image of an entire image in the final frame based on an input from the operator, wherein the plurality of frames are each associated with a respective time code and the time code associated with the final frame is subsequent to the time code associated with the first frame;

determining automatically, at a follow-up unit, whether a key region in a second frame of the plurality of frames includes at least one pixel value similar to the key region in the first frame, determining a position of the key region in the second frame based on a position of the initial key region in the first frame and a position of the final key region in the final frame, and applying region identification information to the key region in the second frame when the key region in the second frame is determined to include the at least one pixel value similar to the initial key region in the first frame object identification information to the key region in the first frame, wherein the time code associated with the second frame is subsequent to the time code associated with the first frame and prior to the time code associated with the final frame;

referring to a database which stores a corresponding relationship between region identification information received from the key information unit or the follow-up unit, object identification information applied to at least one of the key regions of the plurality of frames, and link information which provides access to information related to the at least one of the key regions to embed the link information corresponding to the at least one of the key regions into index information which associates the region identification information applied to the at least one of the key regions, the object identification information applied to the at least one of the key regions, and time information; and outputting, at an outputting section, the index information with link information in which the link information is embedded, the plurality of frames, and a key image to which the region identification information which specifies the key region in combination with the time information is applied in a mutually associated relationship.

35. A non-transitory computer-readable recording medium for storing therein a computer program that includes instructions which when executed on a computer causes the computer to execute a method comprising:

determining, at a key information unit, an initial key region in a first frame of a plurality of frames, which is a partial image of an entire image in the frame, based on an input from an operator, applying region identification information to the initial key region in the first frame, and determining a final key region in a final frame of the plurality of frames, which is a partial image of an entire image in the final frame based on an input from the operator, wherein the region identification information corresponds to at least one pixel value of the initial key region in the first frame, the plurality of frames are each associated with a respective time code, and the time code associated with the final frame is subsequent to the time code associated with the first frame;

determining automatically, at a follow-up unit, whether a key region in a second frame of the plurality of frames includes at least one pixel value similar to the initial key region in the first frame, determining a position of the key region in the second frame based on a position of the initial key region in the first frame and a position of the final key region in the final frame, and applying region identification information to the key region in the second frame when the key region in the second frame is determined to include the at least one pixel value similar to the initial key region in the first frame, wherein the time code associated with the second frame is subsequent to the time code associated with the first frame and prior to the time code associated with the final frame; and referring to a database which stores a corresponding relationship between region identification information applied to at least one of the key regions of the plurality of frames received from the key information unit or the follow-up unit and link information which provides a link to information related to the at least one of the key regions to embed the link information corresponding to the at least one of the key regions into index information which associates the region identification information applied to the at least one of the key regions and time information.

36. A non-transitory computer-readable recording medium for storing therein a computer program that includes instructions which when executed on a computer causes the computer to execute a method comprising:

determining, at a key information unit, an initial key region in a first frame of a plurality of frames, which is a partial image of an entire image in the frame, based on an input from an operator, applying region identification information to the initial key region in the first frame, wherein the region identification information corresponds to at least one pixel value of the initial key region in the first frame, applying object identification information to the initial key region in the first frame, and determining a final key region in a final frame of the plurality of frames, which is a partial image of an entire image in the final frame based on an input from the operator, wherein the plurality of frames are each associated with a respective time code and the time code associated with the final frame is subsequent to the time code associated with the first frame;

determining automatically, at a follow-up unit, whether a key region in a second frame of the plurality of frames includes at least one pixel value similar to the initial key region in the first frame, determining a position of the key region in the second frame based on a position of the initial key region in the first frame and a position of the final key region in the final frame, and applying region identification information to the key region in the second frame when the key region in the second frame is determined to include the at least one pixel value similar to the initial key region in the first frame, wherein the time code associated with the second frame is subsequent to the time code associated with the first frame and prior to the time code associated with the final frame; and referring to a database which stores a corresponding relationship between region identification information received from the key information unit or the follow-up unit, object identification information applied to at least one of the key regions of the plurality of frames, and link information which provides access to information related to the at least one of the key regions to embed the link information corresponding to the at least one of the key regions into index information which associates the region identification information applied to the at least one of the key regions, the object identification information applied to the at least one of the key regions, and time information.

37. A non-transitory computer-readable recording medium for storing therein a computer program that includes instructions which when executed on a computer causes the computer to execute a method comprising:

determining, at a key information unit, an initial key region in a first frame of a plurality of frames, which is a partial image of an entire image in the frame, based on an input from an operator, applying region identification information to the initial key region in the first frame, and determining a final key region in a final frame of the plurality of frames, which is a partial image of an entire image in the final frame based on an input from the operator, wherein the region identification information corresponds to at least one pixel value of the initial key region in the first frame, the plurality of frames are each associated with a respective time code, and the time code associated with the final frame is subsequent to the time code associated with the first frame;

determining automatically, at a follow-up unit, whether a key region in a second frame of the plurality of frames includes at least one pixel value similar to the initial key region in the first frame, determining a position of the key region in the second frame based on a position of the initial key region in the first frame and a position of the final key region in the final frame, and applying region identification information to the key region in the second frame when the key region in the second frame is determined to include the at least one pixel value similar to the initial key region in the first frame, wherein the time code associated with the second frame is subsequent to the time code associated with the first frame and prior to the time code associated with the final frame;

referring to a database which stores a corresponding relationship between region identification information applied to at least one of the key regions of the plurality of frames received from the key information unit or the follow-up unit and link information which provides access to information related to the at least one of the key regions to embed the link information corresponding to the at least one of the key regions into index information which associates the region identification information applied to the at least one of the key regions and time information; and outputting the index information with link information in which the link information is embedded, the plurality of frames, and a key image to which the region identification information which specifies the key region in combination with the time information is applied in a mutually associated relationship.

38. A non-transitory computer-readable recording medium for storing therein a computer program that includes instructions which when executed on a computer causes the computer to execute a method comprising:

determining, at a key information unit, an initial key region in a first frame of a plurality of frames, which is a partial image of an entire image in the frame, based on an input from an operator, applying region identification information to the initial key region in the first frame, wherein the region identification information corresponds to at least one pixel value of the initial key region in the first frame, applying object identification information to the initial key region in the first frame, and determining a final key region in a final frame of the plurality of frames, which is a partial image of an entire image in the final frame based on an input from the operator, wherein the plurality of frames are each associated with a respective time code and the time code associated with the final frame is subsequent to the time code associated with the first frame;

determining automatically, at a follow-up unit, whether a key region in a second frame of the plurality of frames includes at least one pixel value similar to the key region in the first frame, determining a position of the key region in the second frame based on a position of the initial key region in the first frame and a position of the final key region in the final frame, and applying region identification information to the key region in the second frame when the key region in the second frame is determined to include the at least one pixel value similar to the key region in the first frame, wherein the time code associated with the second frame is subsequent to the time code associated with the first frame and prior to the time code associated with the final frame;

referring to a database which stores a corresponding relationship between region identification information received from the key information unit or the follow-up unit, object identification information applied to at least one of the key regions of the plurality of frames, and link information which provides a link to information related to the at least one of the key regions to embed the link information corresponding to the at least one of the key regions into index information which associates the region identification information applied to the at least one of the key regions, the object identification information applied to the at least one of the key regions, and time information; and outputting the index information with link information in which the link information is embedded, the plurality of frames, and a key image to which the region identification information which specifies the key region in combination with the time information is applied in a mutually associated relationship.

39. The production apparatus for index information with link information according to claim 1, wherein the link information includes one of a Uniform Resource Locator (URL) and a commercial message (CM) identifier (local address).

40. The production apparatus for index information with link information according to claim 1, wherein a numerical value representing the region identification information is a gray scale value of the key region.

41. The production apparatus for index information with link information according to claim 1, wherein the key information unit determines the initial key region as a start point and the final key region as an end point, and the follow-up unit estimates a plurality of estimated key regions between the initial key region and the final key region, based on time information associated with the initial key region and time information associated with the final key region.

42. The production apparatus for index information with link information according to claim 3, wherein the object identification information is at least one character which describes a feature of the key region.

43. The production apparatus for index information with link information according to claim 1, further comprising:

a key image production unit that generates and stores a key image for each key region determined by the key information unit or the follow-up unit, wherein the key image includes the determined key region, the applied region identification information, and time information indicating the time code of the respective frame.

44. The production apparatus for index information with link information according to claim 1, wherein the time code associated with the second frame is sequential to the time code associated with the first frame.

* * * * *